US012103003B2

(12) United States Patent
Henley et al.

(10) Patent No.: US 12,103,003 B2
(45) Date of Patent: Oct. 1, 2024

(54) ANALYSIS SYSTEMS WITH MICROFLUIDIC DEVICES, MICROFLUIDIC DEVICES AND RELATED METHODS

(71) Applicant: The University of North Carolina at Chapel Hill, Chapel Hill, NC (US)

(72) Inventors: William Hampton Henley, Chapel Hill, NC (US); Adam D. Pfefferle, Durham, NC (US); John Michael Ramsey, Chapel Hill, NC (US); Ellen Foot Perkowski, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 868 days.

(21) Appl. No.: 17/048,153

(22) PCT Filed: Nov. 5, 2019

(86) PCT No.: PCT/US2019/059773
§ 371 (c)(1),
(2) Date: Oct. 16, 2020

(87) PCT Pub. No.: WO2020/162996
PCT Pub. Date: Aug. 13, 2020

(65) Prior Publication Data

US 2021/0154673 A1 May 27, 2021

Related U.S. Application Data

(60) Provisional application No. 62/825,523, filed on Mar. 28, 2019, provisional application No. 62/760,604, filed on Nov. 13, 2018.

(51) Int. Cl.
*B01L 3/00* (2006.01)

(52) U.S. Cl.
CPC . *B01L 3/502761* (2013.01); *B01L 2200/0668* (2013.01); *B01L 2300/0816* (2013.01);
(Continued)

(58) Field of Classification Search
CPC ....... B01L 3/502761; B01L 2200/0668; B01L 2300/0816; B01L 2300/0819;
(Continued)

(56) References Cited

U.S. PATENT DOCUMENTS 4,683,195 A 7/1987 Mullis et al.
4,683,202 A 7/1987 Mullis et al.
(Continued)

FOREIGN PATENT DOCUMENTS

CN 101278295 A 10/2008
CN 106795473 A 5/2017
(Continued)

OTHER PUBLICATIONS

Arya et al. "Basic principles of real-time quantitative PCR" Expert Review of Molecular Diagnostics, 5(2):209-219 (2005).
(Continued)

*Primary Examiner* — Robert J Eom
(74) *Attorney, Agent, or Firm* — Myers Bigel, P.A.

(57) ABSTRACT

Analysis systems with a housing having a chamber sized and configured to receive at least one microfluidic device. The systems also include an optic system coupled to the housing in optical communication with the at least one microfluidic device, a controller coupled to the optic system, a heat source coupled to the optic system and thermally coupled to the at least one microfluidic device held in the housing, and a sub-array selection module in communication with the controller. The sub-array selection module is configured to select a sub-set of sets of microwells of at least one fluid channel of the microfluidic device for imaging by the optic
(Continued)

system after a reaction step (e.g., one thermocycle) during an assay.

22 Claims, 28 Drawing Sheets

Specification includes a Sequence Listing.

(52) U.S. Cl.
CPC .................. *B01L 2300/0819* (2013.01); *B01L 2300/0829* (2013.01); *B01L 2300/1827* (2013.01); *B01L 2400/043* (2013.01)

(58) Field of Classification Search
CPC ..... B01L 2300/0829; B01L 2300/1827; B01L 2400/043
See application file for complete search history.

(56) References Cited

U.S. PATENT DOCUMENTS

| | | | |
|---|---|---|---|
| 4,800,159 | A | 1/1989 | Mullis et al. |
| 4,965,188 | A | 10/1990 | Mullis et al. |
| 6,074,827 | A | 6/2000 | Nelson et al. |
| 9,617,589 | B2 | 4/2017 | Ramsey et al. |
| 2005/0042639 | A1 | 2/2005 | Knapp et al. |
| 2005/0221373 | A1 | 10/2005 | Enzelberger et al. |
| 2006/0040297 | A1 | 2/2006 | Leamon et al. |
| 2008/0124726 | A1 * | 5/2008 | Monforte ......... G01N 33/56966 435/7.1 |
| 2011/0036992 | A1 | 2/2011 | Fukumoto et al. |
| 2012/0088691 | A1 | 4/2012 | Chen et al. |
| 2014/0272958 | A1 | 9/2014 | Ramsey et al. |
| 2015/0211048 | A1 | 7/2015 | Ramsey et al. |
| 2015/0224499 | A1 | 8/2015 | Wang et al. |
| 2016/0253584 | A1 | 9/2016 | Fodor et al. |
| 2017/0113221 | A1 | 4/2017 | Hoffman et al. |
| 2017/0292948 | A1 | 10/2017 | Banerjee et al. |
| 2019/0054470 | A1 | 2/2019 | Ramsey et al. |

FOREIGN PATENT DOCUMENTS

| | | | |
|---|---|---|---|
| CN | 108025304 | A | 5/2018 |
| JP | 2011059095 | A | 3/2011 |
| JP | 2018525616 | A | 9/2018 |
| WO | 2013176767 | | 11/2013 |
| WO | 2014210207 | | 12/2014 |
| WO | 2017007954 | A1 | 1/2017 |
| WO | 2017015529 | | 1/2017 |
| WO | 2017065854 | | 4/2017 |
| WO | 2017112025 | | 6/2017 |
| WO | 2017185098 | | 10/2017 |
| WO | 2020068174 | | 4/2020 |
| WO | 2020131182 | | 6/2020 |

OTHER PUBLICATIONS

Extended European Search Report corresponding to European Patent Application No. 19914634.1 (8 pages) (dated Jul. 19, 2022).
International Search Report and the Written Opinion of the International Searching Authority corresponding to International Patent Application No. PCT/US2019/059773 (14 pages) (mailed Sep. 8, 2020).
Extended European Search Report corresponding to European Patent Application No. 24162498.0 (8 pages) (dated Jun. 7, 2024).

* cited by examiner

©UNC 2018

©UNC 2018

©UNC 2018

AATACAATCATAATAATACAATATACATGGARTGGCTAAAGACAAGACC

TATATTGTATTATTATGATTGTATT

```
                    SEQUENCE LISTING

<160> NUMBER OF SEQ ID NOS: 2

<210> SEQ ID NO 1
<211> LENGTH: 49
<212> TYPE: DNA
<213> ORGANISM: Artificial
<220> FEATURE:
<223> OTHER INFORMATION: primer

<400> SEQUENCE: 1

aatacaatca taataataca atatacatgg artggctaaa gacaagacc                49


<210> SEQ ID NO 2
<211> LENGTH: 25
<212> TYPE: DNA
<213> ORGANISM: Artificial
<220> FEATURE:
<223> OTHER INFORMATION: primer

<400> SEQUENCE: 2

tatattgtat tattatgatt gtatt                                          25
```

ANALYSIS SYSTEMS WITH MICROFLUIDIC DEVICES, MICROFLUIDIC DEVICES AND RELATED METHODS

RELATED APPLICATIONS

This application claims the benefit of and priority to U.S. Provisional Patent Application Ser. No. 62/760,604 filed Nov. 13, 2018 and U.S. Provisional Patent Application Ser. No. 62/825,523, filed Mar. 28, 2019, the contents of which are hereby incorporated by reference as if recited in full herein.

STATEMENT OF FEDERAL SUPPORT

This invention was made with government support under Grant No. HR0011-12-2-0001 awarded by the United States Department of Defense (DARPA). The government has certain rights in the invention.

STATEMENT REGARDING ELECTRONIC FILING OF A SEQUENCE LISTING

A Sequence Listing in ASCII text format, submitted under 37 C.F.R. § 1.821, entitled 5470-860 WO_ST25.txt, 817 bytes in size, generated on Oct. 29, 2019 and filed via EFS-Web, is provided in lieu of a paper copy. This Sequence Listing is hereby incorporated by reference into the specification for its disclosures.

RESERVATION OF COPYRIGHT

A portion of the disclosure of this patent document contains material which is subject to copyright protection. The copyright owner, The University of North Carolina at Chapel Hill, N.C., has no objection to the reproduction by anyone of the patent document or the patent disclosure, as it appears in the United States Patent and Trademark Office patent file or records, but otherwise reserves all copyright rights whatsoever.

FIELD

The present invention is directed to systems, fluidic devices (e.g., high throughput microfluidic devices) and methods of using the same such as, for example, suitable to obtain polymerase chain reaction (PCR) data from an encoded bead microwell array.

BACKGROUND

The polymerase chain reaction (PCR) is a highly sensitive method for the amplification of segments of genomic DNA (gDNA) or complementary DNA (cDNA). PCR has many applications, for example, the detection of trace amounts of nucleic acids to determine the presence of disease causing organisms, gene expression, genotyping, genetic engineering or modification, and forensic science applications. PCR amplification provides outstanding target identification and quantification over a large range of analyte concentrations. However, simultaneous and quantitative analysis of many analytes by PCR has proven to be extremely challenging. Intercalating dye fluorescence-based detection is only capable of determining total dsDNA concentration and therefore concurrent analysis of multiple templates in a single reaction vessel is not possible using this detection method. Fluorescent probe technologies (i.e., TaqMan, molecular beacons, or other chemistries) can be used for low-level multiplexing of reactions as each target can be amplified using a different color fluorescence probe as a signaling reporter. Probes are also sequence specific, reducing false positives from primer-dimer formation or nonspecific amplification. A typical method for multiplexing with either conventional microtiter plate or microfluidic real-time-PCR (rt-PCR) is to use a small number of reaction wells, each containing three different color probes. However, it is generally considered challenging to design multiplexed primer and probe sets as they require an additional level of careful design and optimization to insure compatibility with each other. Although multiplexing with at least six dyes has been demonstrated, multiplexing by this method is ultimately limited, by instrumentation and spectral overlap between dyes, to about four-color detection, with one color typically reserved for an internal standard dye.

SUMMARY OF EMBODIMENTS OF THE INVENTION

Embodiments of the invention provide methods of limiting photobleaching in an encoded bead array, optionally while obtaining real-time PCR data.

Embodiments of the present invention provide formulations of PCR master mixes and magnetic particle chemistries that are particularly suited for use with an encoded bead array.

Embodiments of the invention are directed to sample analysis devices for assays, systems for analyzing signal from arrays of microwells of fluidic devices and assay methods.

Embodiments of the invention are directed to analysis systems. The systems include: a housing comprising a chamber sized and configured to receive at least one microfluidic device; an optic system coupled to the housing in optical communication with the at least one microfluidic device; a controller coupled to the optic system; a heat source coupled to the optic system and thermally coupled to the at least one microfluidic device held in the housing; and a sub-array selection module in communication with the controller. The sub-array selection module is configured to select a sub-set of sets of microwells of at least one fluid channel of the microfluidic device for imaging by the optic system after a reaction step (e.g., one thermocycle) during an assay.

The system can include at least one magnet held in the housing adjacent to at least one microfluidic device. The magnet can be configured to translate along at least one fluid channel to magnetically couple to beads during a loading operation of beads to direct beads to travel along the fluid channel and into bead retention segments of the microwells.

The microfluidic device can include a plurality of fluid channels, each with a plurality of sets of microwells positioned along a length dimension associated with a direction between a sample input port and a second opposing port. The selected sub-set of the sets of microwells can be associated with a single row of a laterally aligned first sub-set of microwells of a plurality of the fluid channels, optionally one sub-set of aligned microwells from each fluid channel of the plurality of fluid channels.

Prior to an initial image acquisition and/or an optical excitation, the sub-array selection module identifies sub-sets of the sets of microwells to define positions of others of the sets of microwells of the microfluidic device.

The sub-array selection module can selects different sub-sets of the sets of microwells of the microfluidic device at different reaction steps of the assay (e.g., different thermocycles of the assay) and directs the optic system to excite only a currently selected sub-set of the sets of microwells in the different fluid channels, then directs a camera of the optic system to serially or in parallel acquire images of different sub-sets of the sets of microwells in the currently selected sub-set.

The sub-array selection module can select the same sub-set of microwells at, at least some, different successive reaction steps of the assay (e.g., different thermocycles of the assay) and directs the optic system to transmit light to only a currently selected sub-set of the sets of microwells, then directs a camera of the optic system to serially or in parallel acquire images of different sub-sets of the sets of microwells, optionally pairs of adjacent sets of microwells, in the currently selected sub-set of microwells.

The optic system can have at least first and/or second filters (optionally more than two such as between 3-100) defining respective first and/or second wavelengths of excitation light corresponding to first and second target encoded beads for decoding a bead set held in one or more of the sets of microwells of at least one fluid channel of the microfluidic device.

The system can have a signal analysis module integrated in and/or coupled to the controller. The signal analysis module can be configured to obtain an analog signal for each microwell in the selected sub-set of the sets of microwells. The analog signal can provide PCR data as amplitude changes with cycles of the assay and the concentration of target molecules for a reaction associated with a defined bead type is determined by the analog signal.

The signal analysis module can be further configured to obtain a digital PCR signal(s) of the sets of microwells.

The analog signal can provides real-time PCR data as amplitude change over PCR cycle number for an input material in the one or more of the sets of microwells of the fluid channel and concentration of molecules of a defined bead type is about, equal to, or greater than 1 molecule per microwell. The analog signal can define a threshold cycle or cycle threshold, Ct, that identifies a microwell reaction as positive and a number of target molecules/a concentration of the target molecules for a target species and/or type of molecule when fluorescence signal intensity (Si) is greater than a threshold value or negative if the fluorescence signal intensity (Si) is always less than the threshold value for a given number of PCR cycles. Ct is the cycle number where Si>>Bs, where >> is at least a 5-10% greater, optionally a factor of two greater, than Bs and/or 5-10 times a standard deviation of Bs, and where Bs is background fluorescence signal optionally as measured at a PCR negative reaction.

The analog signal can be obtained for only a single sub-set of the sets of microwells in each fluid channel after every other or each of a plurality of different reaction steps of the assay (e.g., different thermocycles of the assay).

The analog signal can be an average (optionally with outlier data excluded), median, mode, or weighted value of Si as the analog signal corresponding to each defined type of bead and is provided as an estimate of a real time PCR curve for like reactions in microwells of other sets of microwells for a respective fluid channel of the microfluidic device, thereby allowing a single-cycle resolution even though not all sets of microwells of each fluid channel are imaged after different or each of the reaction cycles.

The optic system can have a camera with a field of view (FOV) that covers only a sub-set of microwells in at least two, optionally all, adjacent fluid channels of the microfluidic device.

The defined FOV can optionally cover between 2-10 or more adjacent fluid channels and/or between 10-50% an overall number of fluid channels of the microfluidic device, in some particular embodiments.

The controller and/or the signal analysis module can be configured to direct the optic system to obtain pre and post PCR images and compare the signal intensity between them, optionally along with analog data obtained using the selected sub-sets of sets of microwells at different reaction steps of the assay, to determine positive and negative PCR reactions, optionally determining concentration(s) of a target species and/or molecule concentration(s) in an original sample provided to the fluid channel.

The system can further include a holder configured to hold a plurality of microfluidic devices in an aligned grid in the housing.

The holder can be formed of a thermally insulating material that provides a thermal barrier between adjacent microfluidic devices, optionally the holder can hold the plurality of microfluidic devices with (sample/bead) input ports to the fluid channels facing outward.

The microfluidic device can further include a dye uniformity agent, optionally the dye uniformity agent comprises an oligonucleotide.

The dye uniformity agent can include a non-extendable oligonucleotide and/or a partially double stranded DNA.

The dye uniformity agent can include a partially double stranded DNA that comprises biotin and/or a C1-C20 hydrocarbon chain.

The dye uniformity agent can be present in a master mix present in the microfluidic device and/or the dye uniformity agent can be attached to a bead present in the microfluidic device.

Other embodiments are directed to methods of analyzing a sample such as for identifying a target species and/or a target molecule. The methods include: providing a fluidic analysis device with a first fluid channel with a plurality of sets of microwells positioned along the first fluid channel; obtaining signal intensity data from only a defined subset of the plurality of sets of microwells (optionally in response to the transmitting an optical excitation signal); and identifying PCR reactions that are positive for a target species and/or type of molecule associated with bead types and/or a target molecule based, at least in part, on the obtained signal intensity data.

The method can include, loading (with a bead slurry pre-treated with a sample(s)), then sealing the plurality of sets of microwells along the first fluid channel before the obtaining step so that after sealing each set of microwells is in fluid isolation from the others. The plurality of sets of microwells along the first fluid channel can be in fluid communication only during the loading, prior to the sealing step.

The method can include changing the defined subset of the plurality of sets of microwells to a different defined subset after each of a plurality of successive reaction steps of an assay (e.g., after each of a plurality of successive thermocycles of the assay) whereby some sets of microwells are not imaged after each reaction step The defined subset can remains the same over a plurality of successive reaction steps of an assay (e.g., after each of a plurality of successive thermocycles of the assay) whereby some sets of microwells are not imaged after each reaction step.

The fluidic analysis device can include a multiplicity of fluid channels with respective microwells, optionally between 2-100 including, without limitation: a second fluid channel with a plurality of sets of microwells spaced apart along the second fluid channel; a third fluid channel with a plurality of sets of microwells spaced apart along the third fluid channel; and a fourth second fluid channel with a plurality of sets of microwells spaced apart along the fourth fluid channel. A first set of microwells of the plurality of sets of microwells of each of the first, second, third and fourth fluids channels can be aligned in a first row. A second set of microwells of the plurality of sets of microwells of each of the first, second, third and fourth fluid channels can be aligned in a second row. A third set of microwells of the plurality of sets of microwells each of the first, second, third and fourth fluid channels can be aligned in a third row. A fourth set of microwells of the plurality of sets of microwells of each of the first, second, third and fourth fluid channels can be aligned in a fourth row. The defined subset can be a single (partial or entire) one of the first, second, third and fourth rows.

The first, second, third and fourth fluid channels can have straight or arcuate segments that are substantially parallel with each other and provide the first, second, third and fourth sets of microwells.

The method can further include: transmitting an optical excitation signal to only the defined subset before the obtaining step; digitally scanning the defined subset of the plurality of sets of microwells after, before, or before and after the transmitting and obtaining steps to obtain images of the sets of microwells for identifying positive and negative PCR reactions associated with digital PCR; and electronically identifying microwells in the sets of microwells that are positive for one or more target analyte molecules while the microwells are at an imaging temperature.

The exciting and obtaining can be carried out to scan only one defined sub-set of sets of microwells after each of a plurality of successive reaction steps (e.g., thermocycles) of an assay, wherein successive ones of the one defined sub-set can be different from each other.

The obtaining the signal intensity from only the defined sub-set can be carried out using a camera with a field of view (FOV) that covers only one set of microwells or only sub-sets of the sets of microwells in all or a sub-set of adjacent ones of the fluid channels by successively or in parallel obtaining images of different defined neighboring sets of microwells in different fluid channels of the defined sub-set of sets of microwells.

Each of the sets of microwells can have microwell arrays with microwells in a range of 1 thousand and 1 million.

The fluidic analysis device can have a plurality of spaced apart fluid channels, each with the sets of microwells with the microwell arrays. The fluid channels can be in fluid isolation during an assay. At least some of the microwells of the microwell arrays can contain a single bead, optionally some or all of the microwells can be beadless or contain more than one bead.

The method can include electronically identifying a location of one or more sets of microwells residing in one or more positions in the microfluidic device before the transmitting and obtaining steps and defining positions of others of the sets of microwells based at least in part of the locations of the identified location.

The method of claim 20, further comprising transmitting an optical excitation signal to only the defined subset before the obtaining step, and before the transmitting, selecting a filter to provide an encoding wavelength for the transmitting step.

The obtaining signal intensity can include obtaining an analog signal that can provide real-time PCR data as amplitude changes versus a PCR cycle number for an input material in the sets of microwells and concentration of molecules of a defined bead type is about, equal to, or greater than 1 molecule per microwell. The analog signal can define a threshold cycle or cycle threshold, Ct, that identifies a microwell reaction as positive and a number of target molecules/concentration of the target molecule for a target species and/or type of molecule when fluorescence signal intensity (Si) is greater than a threshold value or negative if the fluorescence signal intensity (Si) is always less than the threshold value for a given number of PCR cycles.

Ct can be a cycle number where Si>>Bs, where >> is at least a 5-10% greater, optionally a factor of two greater, than Bs and/or 5-10 times a standard deviation of Bs, and where Bs is background fluorescence signal optionally as measured at a PCR negative reaction.

The analog signal can be obtained for only a single sub-set of the sets of microwells in one or more fluid channel after every other or each of a plurality of different reaction steps of the assay (e.g., different thermocycles of the assay).

The analog signal can be an average, median, mode, or weighted value of Si (optionally with outlier data discarded) as the analog signal corresponding to each defined type of bead and can be provided as an estimate of a real time PCR curve for like reactions in microwells of other sets of microwells for a respective fluid channel of the microfluidic device, thereby allowing a single-cycle resolution even though not all sets of microwells of each fluid channel are imaged after different reaction steps.

The obtained signal intensity can be carried out by using a camera with a field of view (FOV) that covers only a sub-set of the sets of microwells in at least two, optionally all, adjacent fluid channels of the microfluidic device.

The analog signal can be obtained for only a single set of the sets of microwells in each fluid channel after a plurality of different reaction steps of the assay (e.g., different thermocycles of the assay), and wherein the analog signal comprises an average, median, mode, or weighted value of Si as the analog signal corresponding to each defined type of bead and is provided as an estimate of a real time PCR curve for like reactions in microwells of other sets of microwells for a respective fluid channel of the microfluidic device, thereby allowing a single-cycle resolution even though not all sets of microwells of each fluid channel are imaged after different reaction steps.

The fluidic analysis device with the first fluid channel with the plurality of sets of microwells spaced apart along the first fluid channel can include a plurality of additional fluid channels, each with a respective plurality of sets of microwells spaced apart along its respective length. The fluidic analysis device can have a separate material input port for each of the first and the plurality of additional fluid channels and at least some of the fluid channels share a common opposing second port. The method can further include before the obtaining step: fluidly loading a bead slurry pre-exposed to a respective sample for analysis into the respective input ports; magnetically directing the bead slurries to enter into different sets of microwells along the fluid channels; flowing a fluid master mix comprising a dye from the second port into the fluid channels toward the first ports; and then flowing a sealing oil from the second port into the fluid channels toward the first ports thereby sealing the sets of microwells and the fluid channels from each other.

The master mix can optionally include a dye uniformity agent. The dye uniformity agent can optionally be or comprises an oligonucleotide (e.g., a non-extendable oligonucleotide and/or a partially double stranded DNA (e.g., a partially double stranded DNA that comprises biotin and/or a C1-C20 hydrocarbon chain)).

The method can include placing a magnet adjacent the fluidic analysis chip and translating the magnet toward the second port before flowing the fluid master mix and sealing oil.

The fluidic analysis device (optionally the first fluid channel and/or the plurality of sets of microwells) can include a dye uniformity agent, optionally wherein the dye uniformity agent comprise an oligonucleotide (e.g., non-extendable oligonucleotide and/or a partially double stranded DNA (e.g., a partially double stranded DNA that comprises biotin and/or a C1-C20 hydrocarbon chain))

The dye uniformity agent can be present in a master mix present in the fluidic analysis device (e.g., present in the first fluid channel and/or the plurality of sets of microwells) and/or the dye uniformity agent can be attached to a bead present in the fluidic analysis device (e.g., present in the first fluid channel and/or the plurality of sets of microwells).

Still other embodiments are directed to microfluidic devices. The devices include a plurality of fluid channels. Each of the plurality of fluid channels has a length dimension corresponding to a direction between a first port and an opposing second port, with at least a portion of the length dimension configured as a straight or arcuate length segment. Each of the fluid channels include a plurality of sets of microwells positioned along the straight or arcuate length segment of the length dimension.

The plurality of sets of microwells in the plurality of fluid channels can be arranged in rows, columns, or rows and columns. The rows or the columns correspond to the straight or arcuate length segment.

At least some of the plurality of fluid channels can be substantially parallel over the straight or arcuate length segment.

At least some of the plurality of fluid channels can be arcuate substantially parallel channels and can provide the arcuate length segment.

At least some of the plurality of fluid channels can be substantially parallel and extend radially between an outer perimeter portion of the device and a center of the device.

The plurality of fluid channels can have a first set of fluid channels and a second set of fluid channels spaced apart from the first set. The first set of fluid channels can terminate at a first master mix port as the second port and the second set of fluid channels can terminate at a second master mix port as the second port.

The first and second sets of fluid channels can be circumferentially spaced apart.

The plurality of fluid channels can include at least two fluid channels defining a first neighboring set and at least two channels defining a second neighboring set adjacent the first neighboring set, each with spatially aligned sets of microwells.

The device can include a first gap space between each of first and second fluid channels of the first neighboring set and the second neighboring set. The device can further comprises a second gap space between the first neighboring set and the second neighboring set, and the second gap space can have a lateral extent that is greater than the first gap space.

The plurality of sets of microwells of each of the plurality of fluid channels can have a common configuration. The plurality of sets of microwells of each of the fluid channels can be aligned with each other in rows and/or columns. The plurality of fluid channels can hold respective input material in fluid isolation from each other.

At least a plurality of the sets of microwells for a respective fluid channel can each comprise microwells with a quantity that is in a range of 1,000-1,000,000. The microwells of the sets of microwells can be sized and configured to hold and retain a single bead thereby allowing for 1,000-1 billion reactions in the microfluidic device.

Sets, optionally pairs, of first and second sets of microwells from at least first and second fluid channels define a first set of adjacent subsets of microwells. The device can include a transparent substrate extending over the plurality of sets of microwells of the fluid channels.

Each fluid channel of the plurality of fluid channels can have a separate first port at a first end as the first port and alternating ones of the first ports can reside at a first longitudinal position on the device and alternating other ones can reside at a second longitudinal position on the device, spaced apart in the length dimension from the first longitudinal position.

The first port can be a material input port and can reside at a first end of a respective fluid channel. The device can further include a fluid manifold that connects an opposing second end of at least some of the fluid channels with the second port.

The fluid channels can extend radially across the device. The inlet port of a respective fluid channel can reside at an outer perimeter portion of the device. The second port can be a single second port residing at a center of the device connected to each of the fluid channels.

At least some of the fluid channels can be provided as concentric sets of fluid channels that each have the arcuate length segment.

Concentric sets of fluid channels having the arcuate length segment can be provided as a plurality of circumferentially spaced apart concentric sets of fluid channels.

The microfluidic device can further include a dye uniformity agent.

The dye uniformity agent can optionally include an oligonucleotide.

The dye uniformity agent can include an oligonucleotide. (e.g., a non-extendable oligonucleotide and/or a partially double stranded DNA (e.g., a partially double stranded DNA that comprises biotin and/or a C1-C20 hydrocarbon chain)).

The dye uniformity agent can be present in a master mix present in the microfluidic device and/or the dye uniformity agent can be attached to a bead present in the microfluidic device.

Other embodiments are directed to a bead loading strategy and the use of isolated bead inputs and common reagent reservoir/input as shown and/or described.

Other embodiments are directed to a fully integrated fluidic analysis chip with raw (biological) sample input, sample preparation and processing, followed by loading of the beads (presaturated with a respective sample) into microwell arrays, associated kits and microfluidic chips with preloaded reagents as shown and/or described.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of the specification, illustrate embodiments of the invention and, together with the description, serve to explain principles of the invention.

DETAILED DESCRIPTION OF EXAMPLE EMBODIMENTS OF THE INVENTION

Figure 1A:
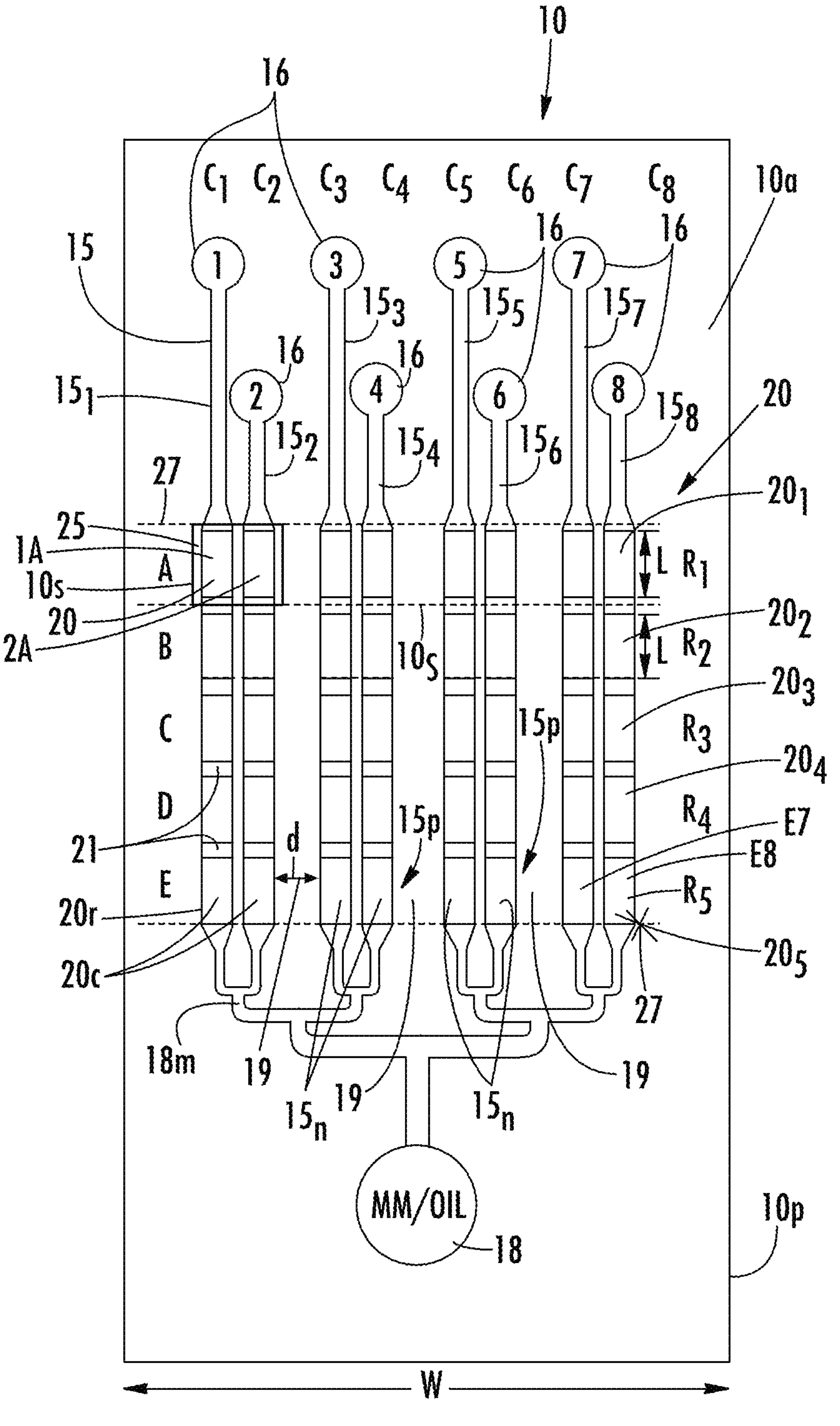
FIG. 1A is a schematic illustration of an example fluidic device according to embodiments of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. The abbreviations "FIG. and "Fig." for the word "Figure" can be used interchangeably in the text and figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also, as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, *In re Herz,* 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

It will also be understood that, as used herein, the terms "example," "exemplary," and grammatical variations thereof are intended to refer to non-limiting examples and/or variant embodiments discussed herein, and are not intended to indicate preference for one or more embodiments discussed herein compared to one or more other embodiments.

The term "about," as used herein when referring to a measurable value such as an amount or concentration and the like, is meant to encompass variations off 20%, ±10%, ±5%, ±1%, ±0.5%, or even ±0.1% of the specified value as well as the specified value. For example, "about X" where X is the measurable value, is meant to include X as well as variations of ±20%, ±10%, ±5%, ±1%, ±0.5%, or even ±0.1% of X. A range provided herein for a measurable value may include any other range and/or individual value therein.

As used herein, the terms "increase," "increases," "increased," "increasing," "enhance," and similar terms indicate an elevation in the specified parameter of at least about 2%, 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more unless otherwise specifically noted within the text.

As used herein, the terms "reduce," "reduces," "reduced," "reduction," "inhibit," and similar terms refer to a decrease in the specified parameter of at least about 2%, 5%, 10%, 15%, 20%, 25%, 30%, 35%, 40%, 45%, 50%, 55%, 60%, 65%, 70%, 75%, 80%, 85%, 90%, 95%, 97%, or 100% unless otherwise specifically noted within the text.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

Generally stated, embodiments of the present invention are directed to analysis systems, fluidic devices and methods of using the same. In some embodiments, the fluidic device can include a high throughput fluidic device. Fluidic devices 10 of the present invention may be used to obtain real-time and digital polymerase chain reaction (PCR) data from an encoded bead microwell array 120*a* (FIG. 3B) and/or sets or sub-sets of microwells 20 in different fluid channels 15. In some embodiments, a fluidic device 10, method and/or analysis system of the present invention may be used in an application such as, e.g., a non-PCR reaction, loop mediated isothermal amplification (LAMP), and/or enzymatic reaction for a protein assay. As is well known to those of skill in the art, real-time PCR is defined as a polymerase chain reaction in which a signal related to amplicon concentration is collected after each cycle of PCR, a cycle of PCR typically referring to a complete set of steps including denaturation of template DNA, annealing of primers to single stranded DNA template, and extension of the primer by polymerase. See Arya et al., Expert Rev. Mol. Diagn. 5(2), (2005) pp. 209-219. 0.1586/14737159.5.2.2, the contents of which are hereby incorporated by reference as if recited in full herein.

In some embodiments, the designs and methods described herein can reduce the data collection time for large arrays (e.g., encoded bead arrays, optionally including about 30,000 or more microwells) while also reducing the effect of photobleaching. Methods described herein may be applicable to other applications where a changing signal is collected at various time points.

In some embodiments, the present invention may include, but is not limited to, a substrate, device, design, solid support (e.g., encoded solid support), step and/or method as described in U.S. Provisional Application No. 62/673,343 entitled "Compositions, Devices, and Methods for Improving a Surface Property of a Substrate", U.S. Provisional Application No. 62/736,525 entitled "Compounds, Compositions, and Methods for Improving Assays", and/or as described in U.S. Pat. No. 9,617,589, U.S. Application Publication No. 2015/0211048, International Publication No. WO 2017/112025, International Application No. PCT/US2016/042913, International Application No. PCT/US2016/043463, and/or International Application No. PCT/US2016/055407, the contents of each of which are incorporated herein by reference in their entirety.

In some embodiments, methods of the present invention comprise a method of delivering reagents and/or targets into reaction wells using beads (e.g., superparamagnetic beads), such as described, for example, in U.S. Application Publication No. 2015/0211048 and International Application No. PCT/US2016/042913, the contents of each of which are incorporated herein by reference in their entirety.

The terms "microchip" and "microfluidic chip" are used interchangeably and refer to a substantially planar, thin device. The microfluidic chip can be rigid, semi-rigid or flexible. The term "thin" refers to a thickness dimension that is 10 mm or less such as between 10 mm and 0.1 mm, and can be about 3 mm, about 2.5 mm, about 2 mm, about 1.5 mm, about 1 mm, or about 0.5 mm. The microchip typically has a width and length that is less than about 6 inches, more typically between about 1 inch and 6 inches. However, in some embodiments, the microchip can be longer such as a foot or more in length and/or width. The microchip can have an outer perimeter that is polygonal, rectangular or circular or other desired shape. The microchip can optionally have a width dimension that is less than a length dimension. The microfluidic chip can have a diameter or width dimension that is about 2.13 inches (54 mm) and/or a diameter or a length dimension that is about 3.4 inches (85.5 mm), in some embodiments. The microchip can include millimeter-sized, micro-sized, and/or nano-sized fluidic channels.

The term "primary dimension" refers to a width and/or depth dimension of a fluid channel.

The terms "micro-sized" and "microfluidic" with respect to a fluid channel refer to a fluid flow channel that has a millimeter, sub-millimeter or smaller size width and/or depth (e.g., the term includes millimeter, micrometer and nanometer size channels including segments or chambers provided by the channels). The channels can have at least a segment having a width and/or depth in a size range of 10 millimeters or less, typically less than 900 microns and greater than 1 nm.

The term "microwell" refers to a reaction well sized and configured to have a small reaction volume of about 100 microliters or less, and, in some embodiments, can optionally hold a single bead as will be discussed further below.

The term "beads" refers to solid phase members such as particles, granules or microspheres, typically magnetic or superparamagnetic microspheres, that can be porous, superficially porous, or nonporous of material(s) such as polymers, photoresists, plastics, glass, silicon dioxide, metal or semimetal oxides (including but not limited to aluminum oxides, titanium oxides, zirconium oxides or other oxides), quantum dots, metal particles, and the like appropriate for use in the reaction wells.

The term "circuit" refers to an entirely hardware embodiment or an embodiment combining software and hardware. The term "module" refers to an embodiment comprising software and hardware or firmware.

The term "digitally scanning" and derivatives thereof refers to obtaining a digital image, typically via a camera, of a part or all of the microfluidic device.

Figure 1B:
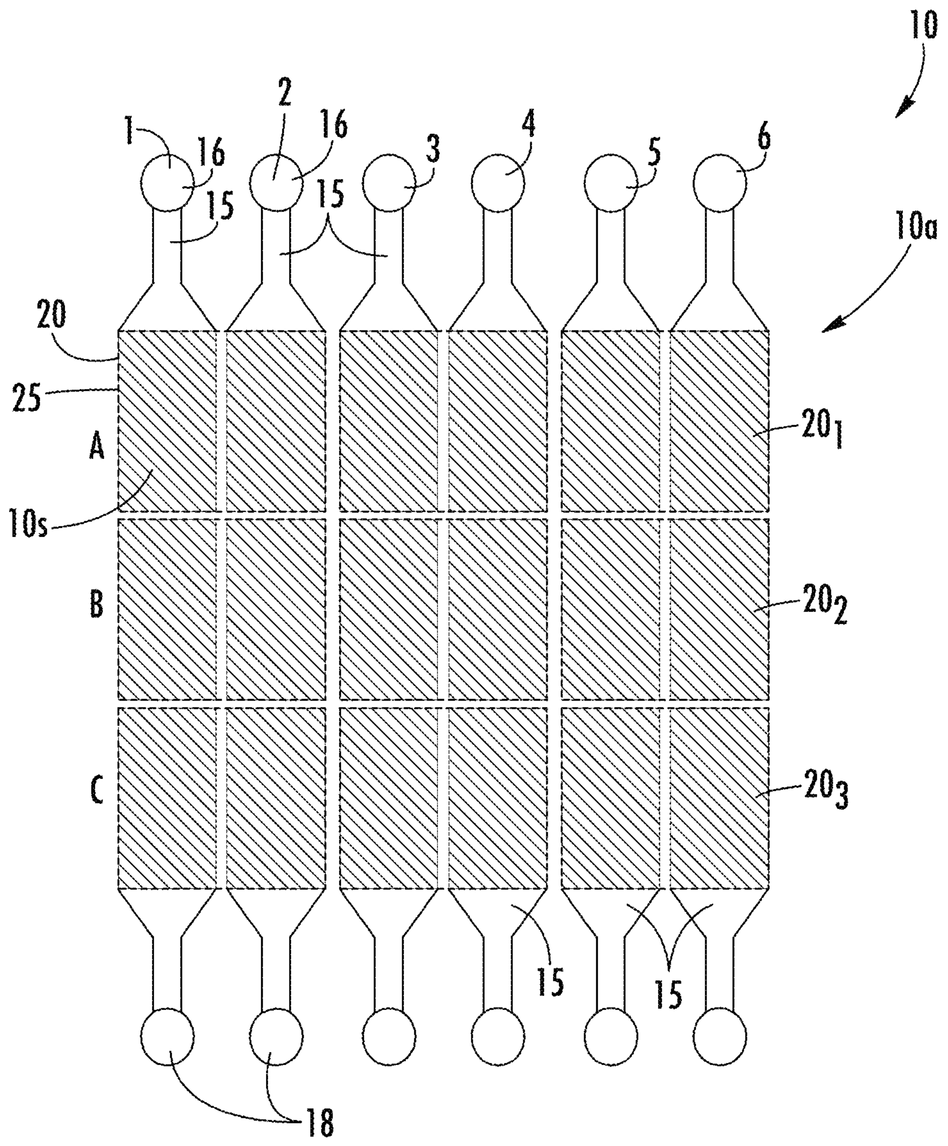
FIG. 1B is a schematic illustration of another example fluidic device according to embodiments of the present invention.
Figure 2:
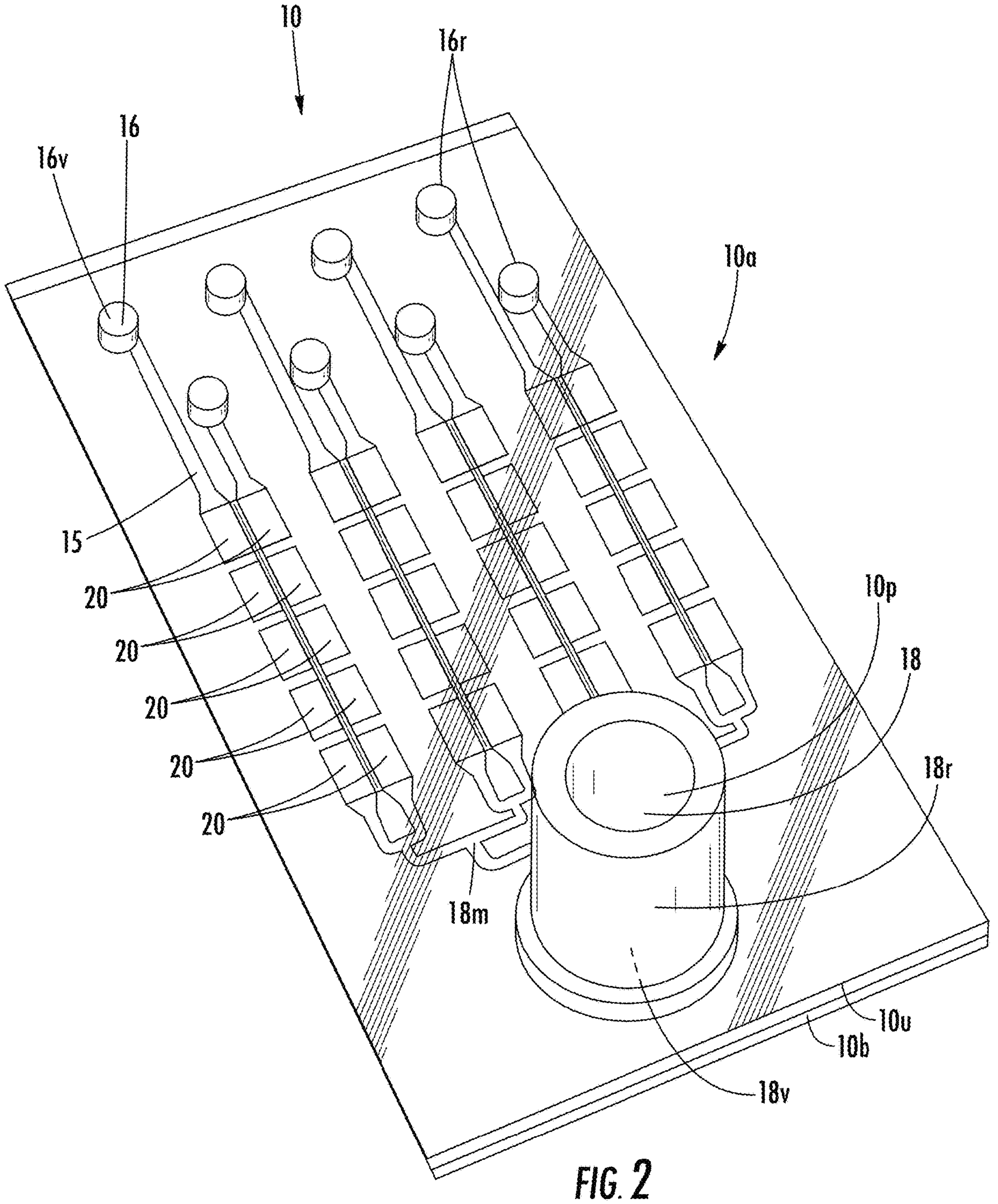
FIG. 2 is a top perspective view of the fluidic device shown in FIG. 1A.

Referring now to FIGS. 1A, 1B and 2, an example fluidic device 10 is shown. The fluidic device 10 comprises at least one elongate fluid channel 15 with a plurality of spaced apart sets of microwells 20 residing along a length of the respective elongate fluid channel 15. Each neighboring set of microwells 20 along a respective fluid channel 15 can be, but does not necessarily need to be, separated by a gap space 21 free of microwells. FIG. 1B illustrates the sets of microwells 20 can be arranged to be continuous along a respective fluid channel 15. FIG. 1B also illustrates that neighboring ones of the first ports 16 can be aligned rather than longitudinally (in the orientation shown) offset as shown in FIG. 1A.

One or more sets of microwells 20 along a respective fluid channel 15 can have a different geometric footprint. Where spaced apart microwells 20 are used such as shown in FIG. 1A, the gap space 21 can have a length that is less than a length L of a footprint of neighboring sets of microwells 20.

As shown in FIGS. 1A and 2, the at least one elongate fluid channel 15 comprises eight adjacent fluid channels $\mathbf{15}_1$, $\mathbf{15}_2$, $\mathbf{15}_3$, $\mathbf{15}_4$, $\mathbf{15}_5$, $\mathbf{15}_6$, $\mathbf{15}_7$, and $\mathbf{15}_8$. However, more or less numbers of channels 15 can be provided and more or less numbers of sets of microwells 20 can be provided for all or any one of the fluid channels 15. For example, in some particular embodiments, a fluidic device 10 can have between 2-2000 fluid channels 15, more typically 10-200 fluid channels 15.

As shown in FIG. 1A, each or some of the fluid channels 15 can configure the plurality of sets of microwells 20 to include a first set of microwells $\mathbf{20}_1$, a second set of microwells $\mathbf{20}_2$, a third set of microwells $\mathbf{20}_3$, a fourth set of microwells $\mathbf{20}_4$ and a fifth set of microwells $\mathbf{20}_5$. However, more or less numbers of sets of microwells 20 can be provided. FIG. 1B illustrates that the fluid channels 15 can each have three sets of microwells 20. In some embodiments, a fluid channel 15 of the fluidic device 10 can have between 2-100 sets of microwells 20, more typically 3-25.

The gap 21 between adjacent microwell sets 20 along a respective fluid channel 15 does not need to be provided by a physical gap or break in contiguous microwells 20, but can be determined by a field of view of an imaging system and/or an illumination window of a radiation source. The sets of microwells 20 may be provided as a continuous array of microwells 20 over a length of a respective fluid channel 15 such as shown in FIG. 1B.

Bubbles or constrictions for aligning beads may be provided in fluid channels 15. Bubbles or constrictions in between neighboring sets of the microwells 20 providing the respective arrays 120*a* of microwells 120 in a fluid channel 15 can be provided to either control fluid motion/sealing or to facilitate or control bead loading.

Referring again to FIGS. 1A and 2, the plurality of the sets of microwells 20 for the fluid channels 15 can be arranged in aligned substantially parallel rows, labeled with location indicia such as alpha-numeric indicia of rows, shown as alpha-indicia A-E for rows $R_1$-$R_8$ and aligned, parallel channels 15, optionally in columns, labeled as $C_1$-$C_8$ defining an array of microwells 10*a* of the device 10. However, other indicia formats may be used and the device 10 does not require human readable forms of indicia. More or less rows and more or less columns may be used. Neighboring channels 15*n*, shown as pairs 15*p* of channels 15, can reside closely spaced apart and separated from an adjacent other set of neighboring channels 15*n*, i.e., another pair 15*p* of channels 15, separated by a gap space 19 provided by a substrate of the device 10. The neighboring channels 15*n* can be separated by a distance that is less than the gap space 19 of the adjacent other neighboring channels 15*n*. Although the neighboring channels 15*n* are shown provided as pairs of channels 15*p*, three, four, five or even more adjacent channels, including an entire row, for example, can define a neighboring set of channels 15*n*.

Figures 3A, 3B, 3C:
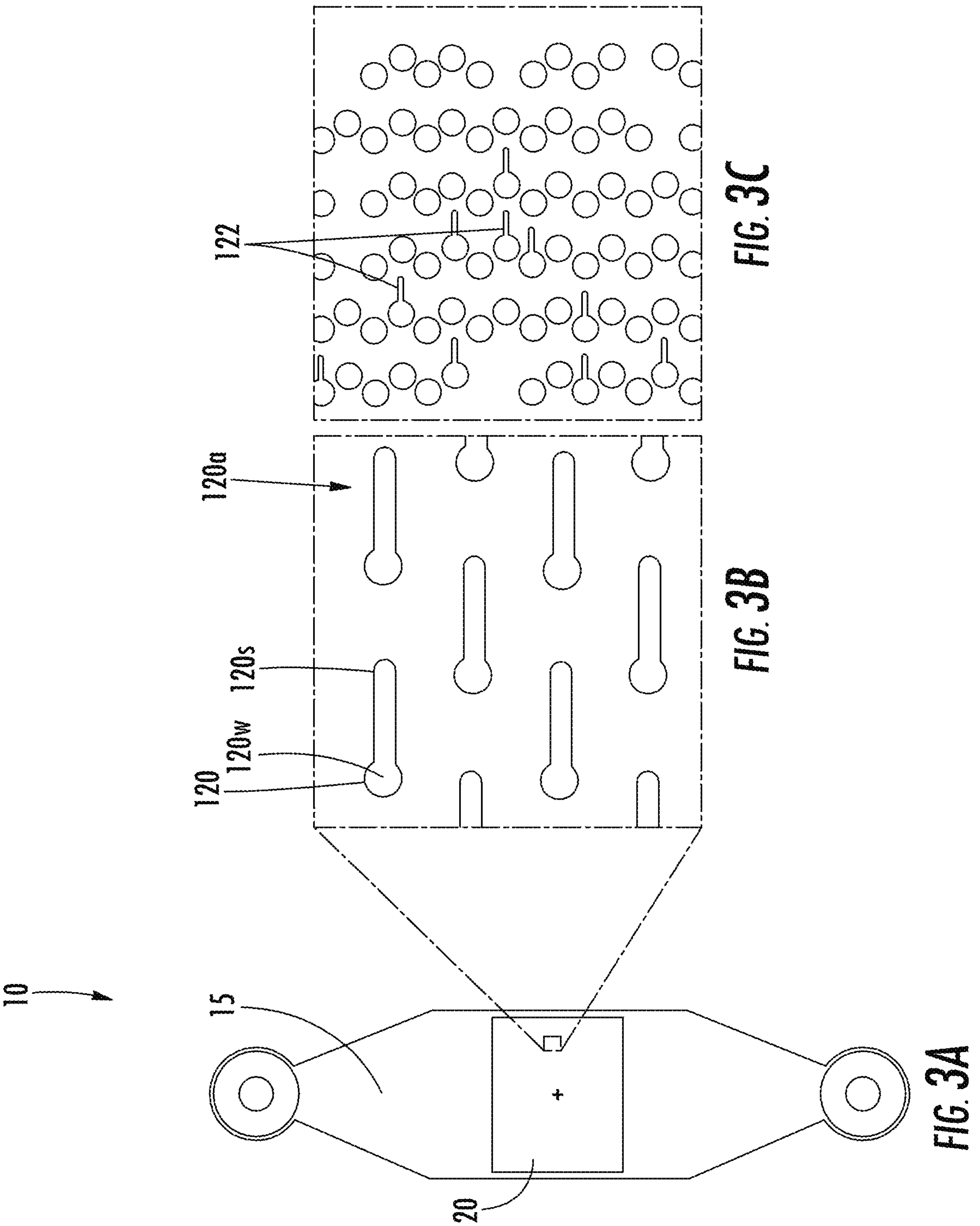
FIG. 3A is an example fluidic device with non-cylindrical microwells according to embodiments of the present invention.
FIG. 3B is a greatly enlarged view of a few microwells taken from a portion of the fluidic device shown in FIG. 3A according to embodiments of the present invention.
FIG. 3C is an example assay signal generated by the non-cylindrical microwells of the fluidic device shown in FIG. 3A illustrating that an assay signal that is separate from the bead background signal according to embodiments of the present invention.

The sets of microwells 20 can have a footprint with a rectangular outer perimeter 20*r* that encloses a respective set or array 120*a* of single-bead microwells 120 (FIG. 3B). However, other geometries may be used.

Each fluid channel 15 can comprise a separate, dedicated, fluid first port 16, which can be an input port, for introducing a desired input material, optionally comprising a sample. Referring to FIG. 2 the fluid port 16 can comprise a reservoir 16*r* with a via 16*v* through a cover substrate 10*u* to direct the input material from the reservoir 16*r* to the input port 16 of the fluid channel 15.

Figure 14:
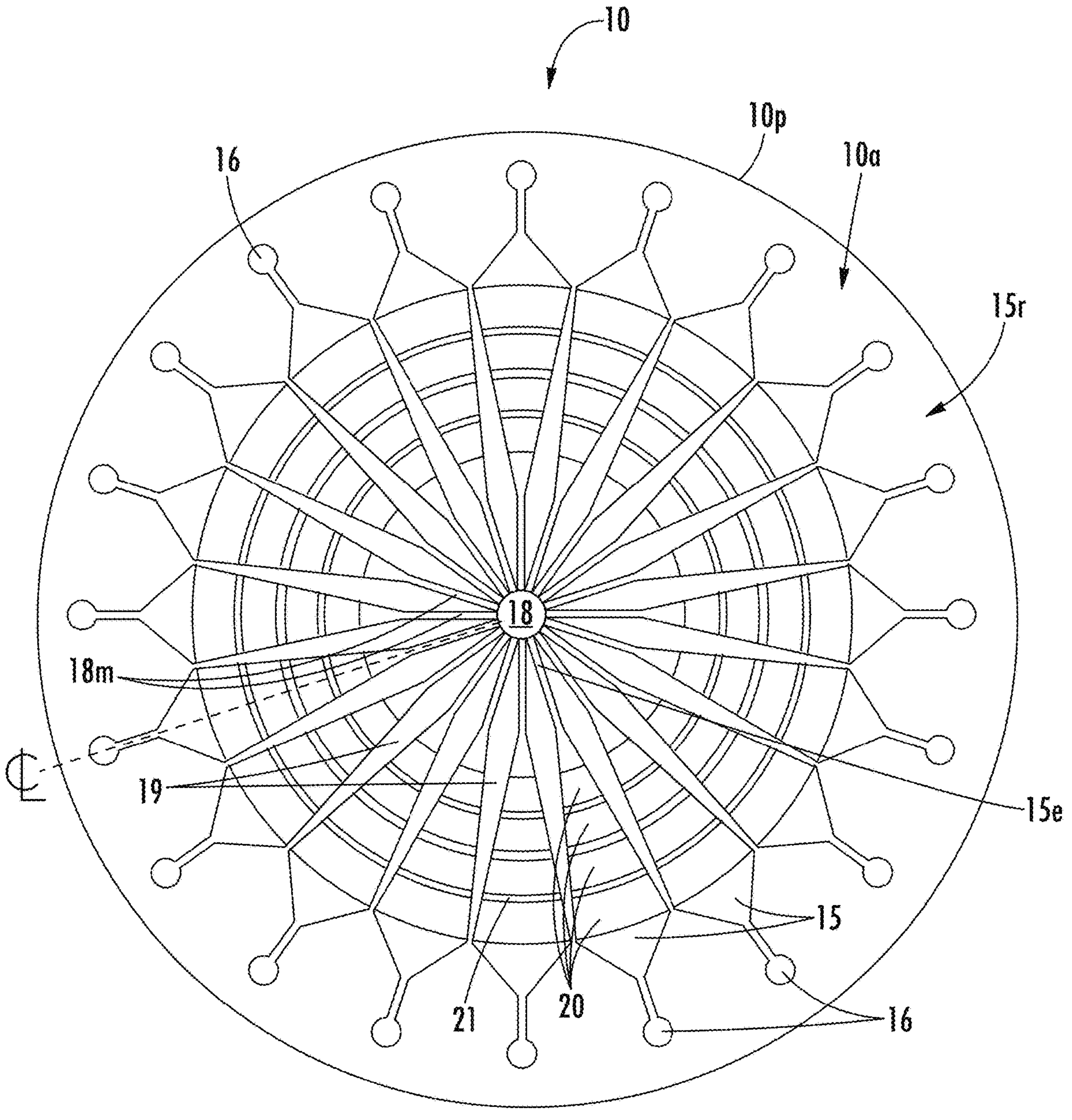
Figure 15:
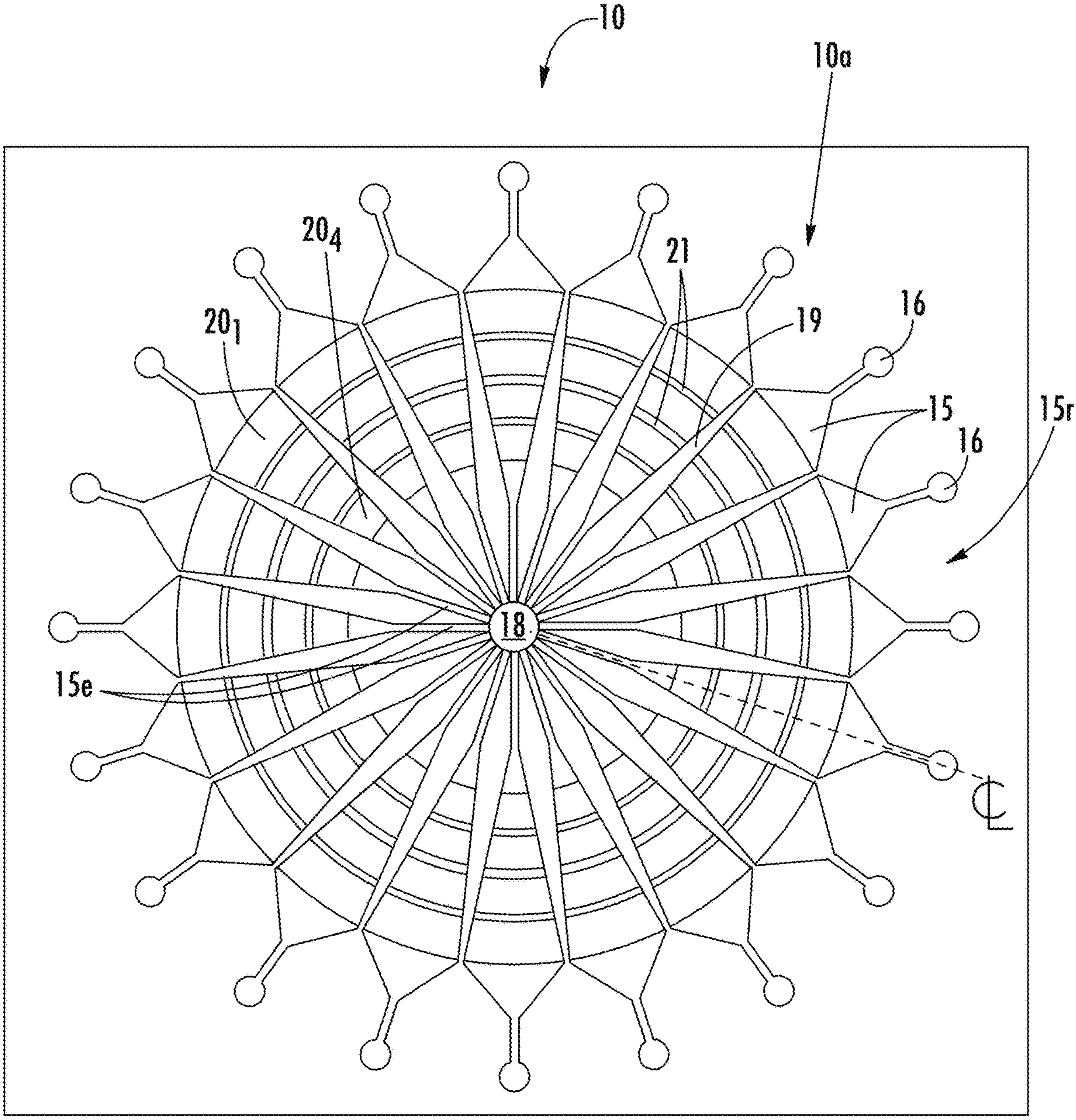

Each fluid channel 15 can merge at an end opposing the input port 16 to a second port 18 which can be a master mix/oil port 18. The second port 18 can also be connected to a reservoir 18*r* through a via 18*v*. The second port 18 can be in fluid communication with more than one fluid channel 15. The device 10 can comprise a fluid manifold 18*m* that is in fluid communication with all or some of the fluid channels 15. Thus, there can be a separate input port 16 for each fluid channel 15 and a lesser number of second ports 18 than input ports 16, as some or all of the fluid channels 15 can merge into a common second port 18 via a manifold 18*m* or directly from a fluid channel extension 15*e* (FIGS. 14, 15).

Figure 16:
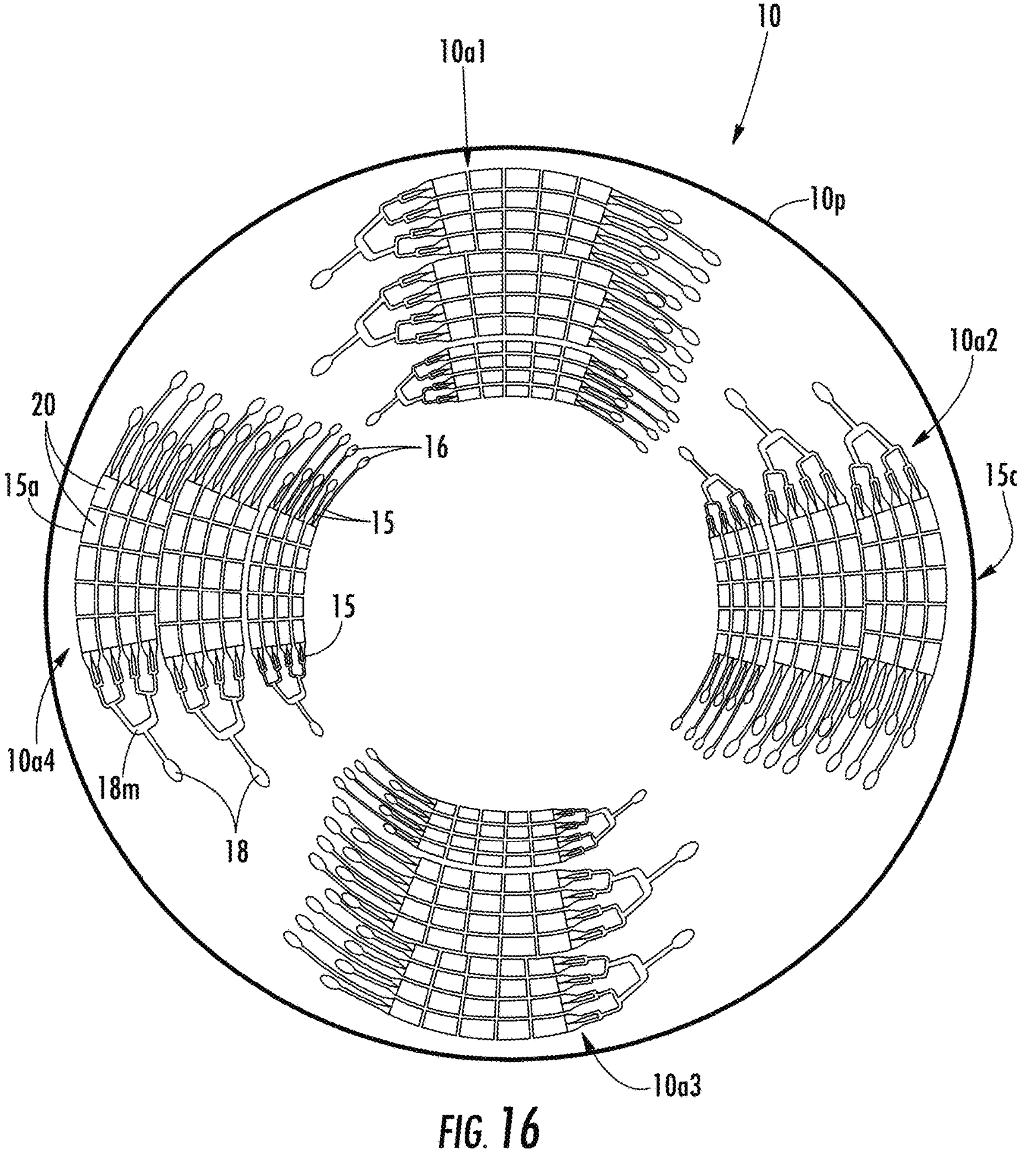

Although not shown, each fluid channel 15 can have its own separate second port 18. Sets of different fluid channels 15 can be in fluid communication with a respective different master mix/oil port 18 (FIG. 16). As will be discussed further below, once loaded with beads and sealed, each set of microwells 20 in a respective fluid channel 15 can be in fluid isolation from each other and each fluid channel 15 can be in fluid isolation from the other fluid channels 15.

As shown in FIGS. 1A, 1B and 2, for a respective channel array 10*a*, the fluid channels 15 can be substantially parallel over a straight length segment that includes a plurality of spaced apart sets of microwells 20. The term "substantially" when referring to "parallel" means that the fluid channels 15 in that array 10*a* are parallel or nominally parallel (i.e., can vary angularly slightly by 10% or less from adjacent centerlines C/L drawn through a respective longitudinally extending center of the fluid channels 15) over at least a portion of a length segment: shown as a straight length segment in FIGS. 1, 2, 9, 10-15 and shown as an arcuate length segment in FIG. 16.

Referring to FIGS. 3A-3C, each or some of the sets of microwells 20 can comprise a plurality of microwells 120 with a bead retention segment 120*w* and an assay signal segment 120*s*. The assay signal segment 120*s* can be in-line with the bead retention segment 120*w* and parallel to and/or in-line with a primary surface of a top or cover substrate 10*u* (FIG. 2) of the device 10. The assay signal segment 120*s* is in fluid communication with the bead retention segment 120*w* of a respective microwell 120. The assay signal segment 120*s* can generate the narrow tail assay signal 122 that allows separation of bead background signal at the well retention segment 120*w*. In some embodiments, the assay signal segment 120*s* can have a geometric shape into which a bead cannot physically enter. The segments 120*w*, 120*s* are fluidly connected so that reagents and/or analytes released from a bead held in the segment 120*w* can diffuse or otherwise mix throughout the common solution volume of the well 120*w*. By spatially separating the bead from the detection region 120*s*, the contribution of bead fluorescence to the signal can be reduced or eliminated, improving signal to noise ratio. The geometries of the wells 120 can allow high, typically single-bead-occupancy loading of reaction wells, while increasing a respective reaction volume, potentially improving reaction efficiency.

Figure 9:
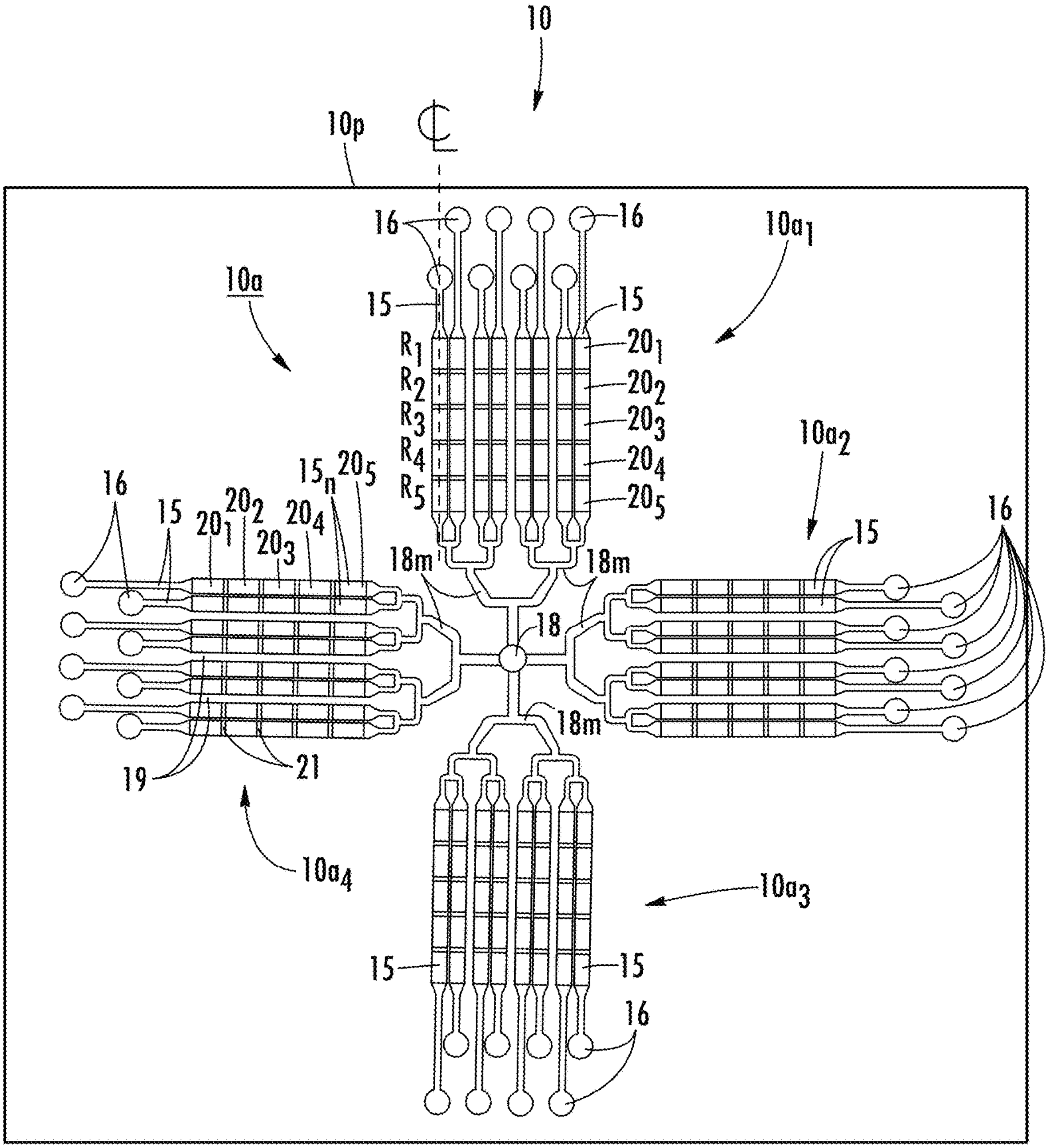
FIGS. 9-16 are schematic top views of different example devices having different configurations of fluid channels according to embodiments of the present invention.
Figure 10:
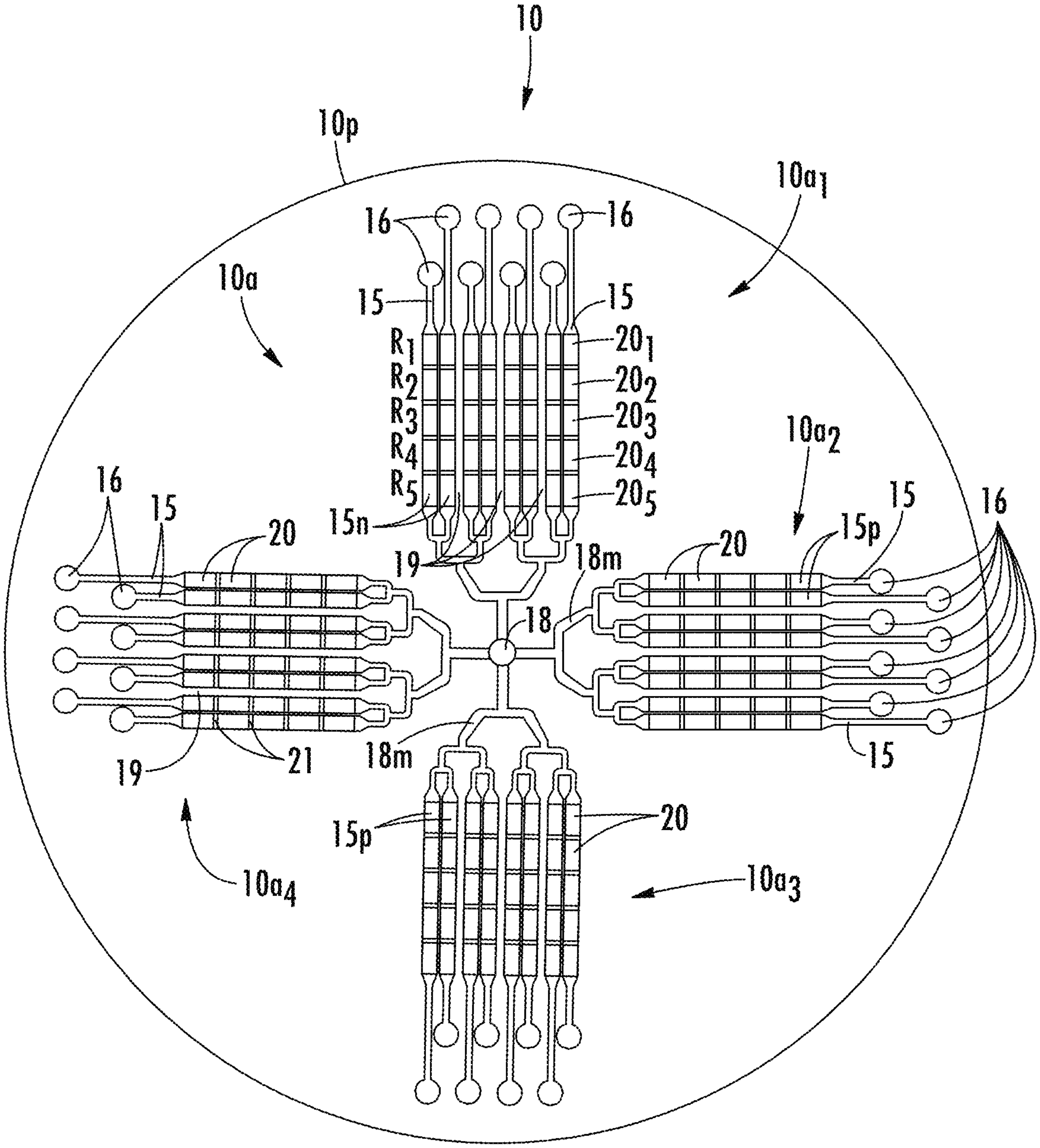
Figure 11:
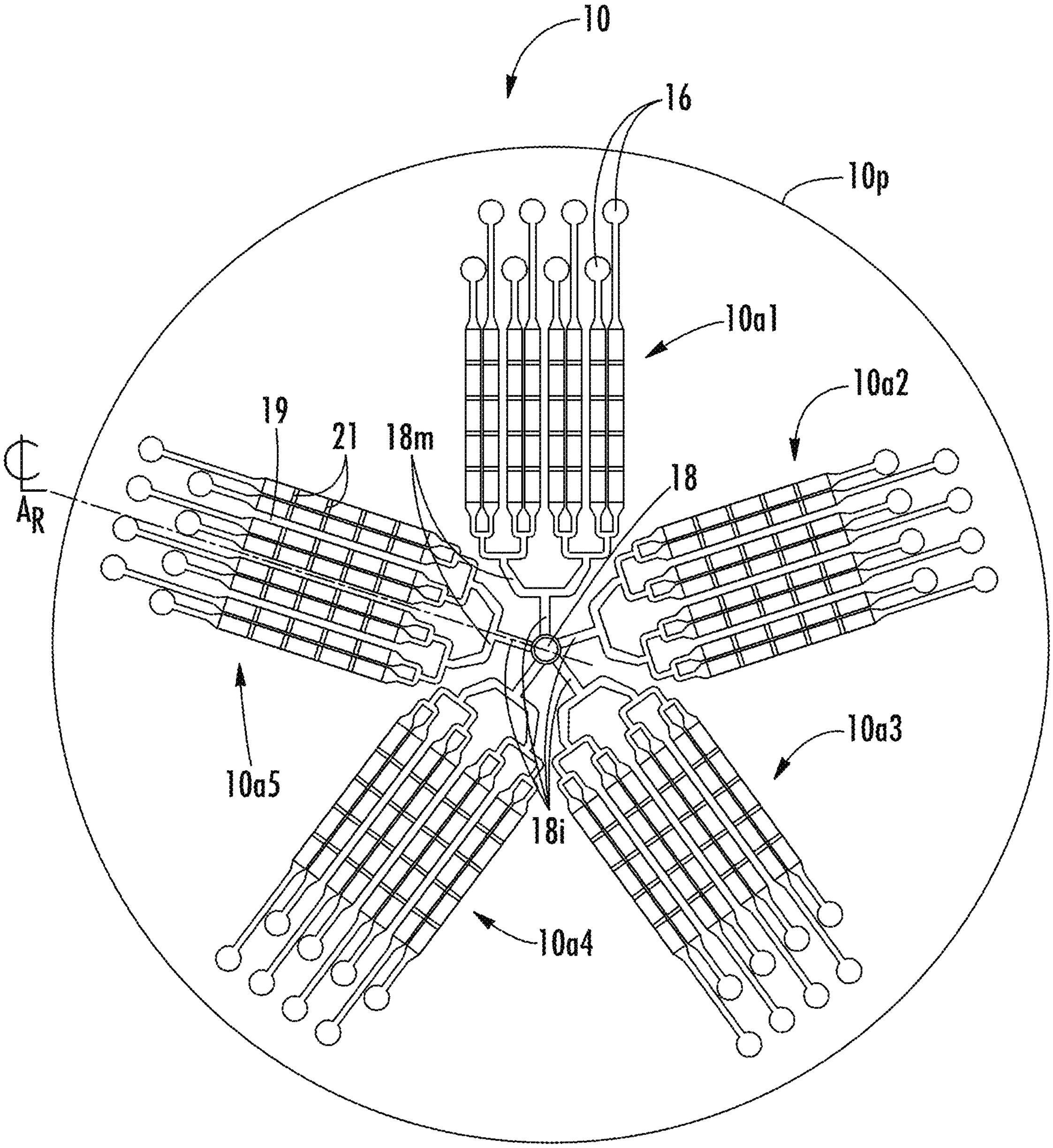
Figure 12:
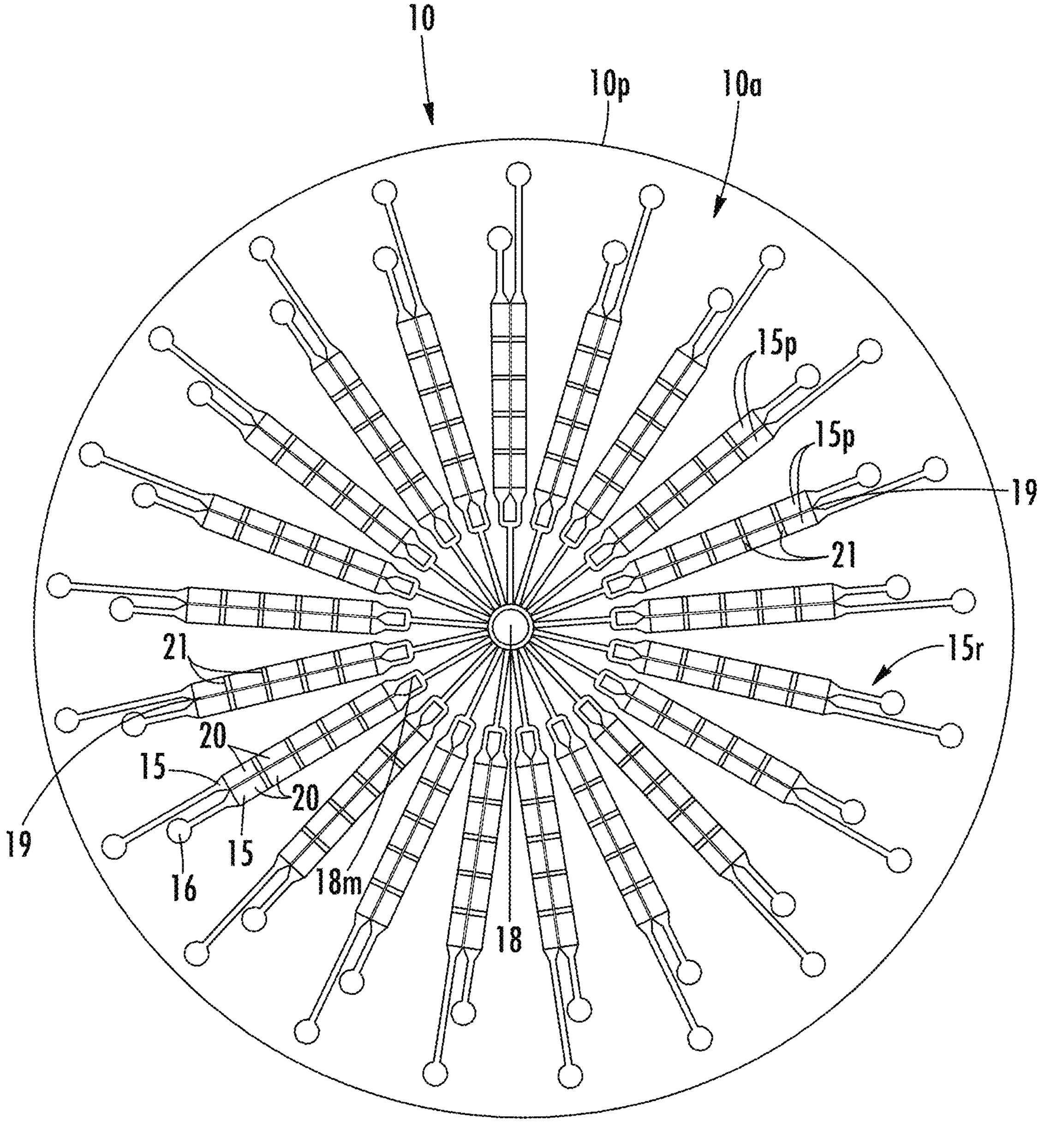
Figure 13:
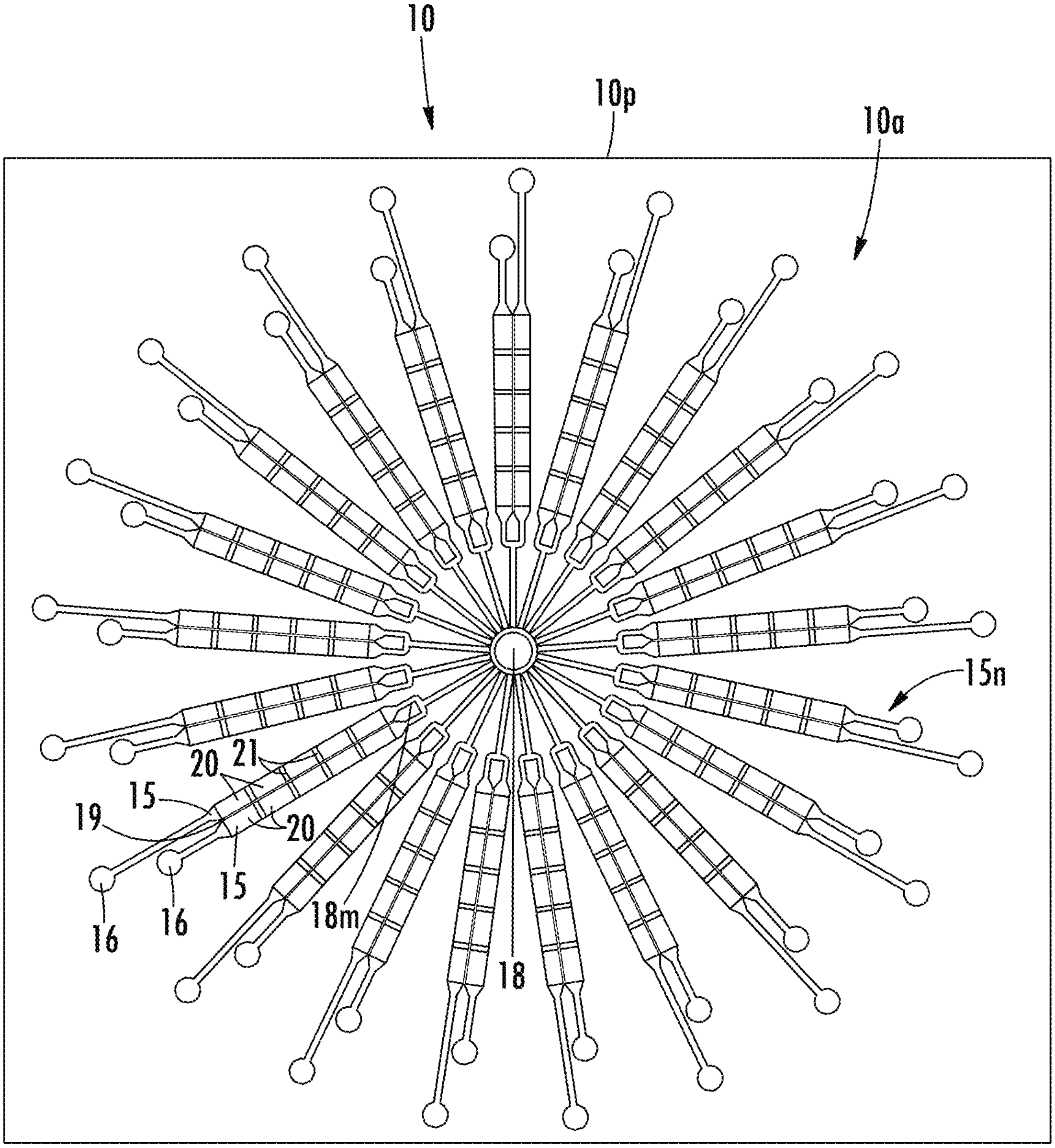

FIGS. 9-11 and 16 illustrate that the device 10 can comprise a plurality of spaced apart arrays of fluid channels, $\mathbf{10}a_1$, $\mathbf{10}a_2$, $\mathbf{10}a_3$, $\mathbf{10}a_4$ (and FIG. 11 also shows a fifth array $\mathbf{10}a_5$ of fluid channels 15). FIG. 16 illustrates three concentric sets of four circumferentially extending arrays $\mathbf{10}a_1$, $\mathbf{10}a_2$, $\mathbf{10}a_3$, $\mathbf{10}a_4$ for 12 array sets.

Each array 10*a* of fluid channels 10 can have a single common second port 18 for introducing loading buffer, sealing oil, and/or a master mix.

The term "master mix" refers to a PCR master mix and can be added to the fluid channels 15 to reach each set of microwells 20 before sealing the wells 120 (FIG. 3B) from each other, which, in some embodiments, may be sealed using an immiscible oil as the sealing oil. A master mix of the present invention may not contain primers. That is, a PCR master mix of the present invention may exclude primers for some particular embodiments, such as, for example, a SiRCA platform.

Alternatively or additionally, the top substrate 10*u* (FIG. 2) can comprise a flexible substrate such as a silicone (e.g., polydimethylsiloxane (PDMS)) and a seal can be achieved by pressing the flexible substrate flat against the array 10*a*.

FIG. 16 illustrates that the fluid channels 15 can be arcuate fluid channels 15*a* and circumferentially extend about at least a portion of a diameter of a circular geometric arrangement. The different arrays of fluid channels $\mathbf{10}a_1$-$\mathbf{10}a_4$, can be circumferentially spaced apart and each array 10*a* can have a common, single second port 18.

FIG. 11 shows the fluid channels 15 extending toward a center defining a position of the second port 18 with at least an inner leg 18*i* of the manifold 18*m*, radially extending toward the second port and a centerline C/L of a respective array $A_R$ radially extending across the device 10 toward the second port 18.

FIGS. 12-15 show the fluid channels 15 configured as radially inwardly extending channels 15*r*. The channels 15*r* extend radially inward from an outer perimeter portion of the device 10 with the first ports 16 toward a center of the device to the second port 18. FIGS. 14 and 15 show the fluid channels 15 decreasing in size along its length toward the center of the device 10 to the second port 18, with sets of microwells 20 decreasing in size from the first set of microwells $\mathbf{20}_1$ to another set $\mathbf{20}_2$, $\mathbf{20}_3$, $\mathbf{20}_4$ as they approach the second port 18. In this case, the sub-sets of microwells 20 that are imaged concurrently (together) can be arranged differently than the other configurations (not in parallel rectangles, etc.).

The microchip array 10*a* can define array locations for each set of microwells 20 of each fluid channel 15 corresponding to a positional address, such as a row and column address. For example, a row and associated position on that row, such as 1A (or A1), 2A (or A2), 7E (or E7) and 8E (or E8), for example. The array 10*a* can be configured to provide some of the sets of microwells 20 as corner microwells 20*c*. In the embodiment shown in FIGS. 1A and 2, the sets of microwells 20 in array locations A1, A2, A7, A8, E1, E2, E7 and E8 are neighboring corner (sub)sets 20*c* of sets of microwells 20. Again, more than two fluid channels 15 may be configured to provide adjacent sets of microwells to define the corner sets 20*c* of microwells 20.

It is noted that the device 10 shown in FIGS. 1A and 2 has a rectangular outer perimeter 10*p* with a length dimension that is greater than a width dimension ("W"), optionally with the width dimension being between 15-30 mm wide. The length dimension can be 2×-4× or more the width dimension. The width dimension of a fluid channel 15 can correspond to the direction of the width dimension W of the device 10. The channels 15 are shown as arranged to extend along a length dimension of the device 10. However, the fluid channels 15 may alternatively be oriented to extend across at least a portion of a width dimension of the device 10. In some embodiments, some fluid channels 15 can extend along the length dimension and some along the width dimension (FIGS. 9, 10). In some embodiments, the fluid channels 15 extend in a radial direction (FIGS. 11-14). In some embodiments, the fluid channels 15 extend circumferentially (FIG. 16).

Respective sets of microwells 20 in each channel 15 can be aligned to have the same longitudinal and lateral extent and position as shown in FIG. 1A, for example, or may be staggered with a first end of the set of microwells 20 above or below an adjacent first end of the adjacent and at least partially laterally aligned set of microwells in another fluid channel 15 (not shown).

The microwells 120 (FIG. 3A) of some or each of the sets of microwells 20 of a respective fluid channel 15 can be provided as a dense array of microwells having between 1000-1,000,000 or more microwells 120, more typically 1,000-100,000 or 1,000-50,000.

In some embodiments, the channels 15 of the microfluidic device 10 can analyze a respective sample with the sets of microwells 20 each providing an array 120*a* of microwells 120, which may be in a range of 1,000 to 1,000,000 or more, optionally 10,000-200,000. The microfluidic device 10 can comprise a plurality of fluid channels 15, typically between 10-100, providing up 20 million cumulative microwells 120 in the device 10.

In an example embodiment, each channel 15 can have between 2-10 sets (or more) of microwells 20 along its length, in fluid isolation after sealing. A set of microwells 20 may have any suitable number of microwells 120. In some embodiments, each set of microwells 20 has the same number of microwells 120. In some embodiments, one or more set(s) of microwells 20 (in some embodiments, each set) may comprise less than 12,000 microwells 120 (e.g., 1,000, 2,000, 5,000, 8,000, 10,000, or 12,000 microwells 120). In some embodiments, one or more sets(s) of microwells 20 (in some embodiments, each set) has at least 1,000 microwells 120 (e.g., 1,000, 10,000 or more, e.g., 12,000-50,000, 100,000, 200,000, 300,000, 400,000, 500,000, 600, 000, 700,000, 800, 000, 900,000, 1,000,000, 1,000,000,000, or more microwells 120). Each microwell 120 (FIG. 3B) typically holds a single bead (some may not be loaded, and some may have a load of two beads which can be undesirable in some applications).

In some embodiments, the microchips 10 can be configured to run assays with more than one bead in a microwell 120. See, e.g., example multi-bead assays described in U.S. Pat. No. 9,617,589 and PCT/US2016/042913 (also US 2019/0054470), the contents of which are hereby incorporated by reference as if recited in full herein.

The different sets of microwells 20 for a respective channel 15 can have the same or different numbers of microwells 120 (FIG. 3B). The different sets of microwells 20 for each channel 15 can have the same or different numbers of microwells 120 (FIG. 3B).

As shown by the virtual frame indicating a single Field of View (FOV) 25 at locations A1, A2 in FIG. 1A, the device 10 can be configured so that a sub-set or sub-array 10*s* of the overal microwell array 10*a*, shown as neighboring sets 15*n*, optionally pairs 15*p*, of channels 15 occupy an entire single FOV of an optical signal detector (220, FIG. 8), such as a camera. This permits the optical signal detector 220 (FIG. 8) such as at least one camera, to, at any one point in time, image different sub-sets 10*s* of sets of microwells 20, such as a single microwell array 120*a* of a plurality of different sample channels 15 covered by the FOV 25. The neighboring sets 15*n* can be arranged as a subset or all channels 15 with a respective set of microwells 20 (e.g., a partial or entire row).

As will be discussed further below, the optical excitation source 225 (FIG. 8) can be configured to transmit an excitation light with a defined wavelength range to a defined sub-array 10*s* of the overall array 10*a* of the sets of microwells 20 of the device 10 (FIG. 1A, 1B), which can be a subset of the sets of microwells 20 and that contains at least one set of microwells 20 from a plurality of adjacent ones of the sample channels 15, but less than all sets of microwells 20 of a microchip 10. The defined wavelength range can be associated with light for an assay signal and/or encoding fluorophores, for example.

As shown in FIG. 1A, the defined sub-array 10*s* can be associated with a single contiguous location, such as an entire single row, of the overall array 10*a* of microwells of the device 10. The defined sub-array 10*s* can then be imaged or optically analyzed, typically by serially imaging sub-sets of sets of microwells 20 in respective neighbors 15*n* of channels 15 in a single location after a first assay cycle. That is, the assay comprises a plurality of assay cycles associated with thermal cycling. The defined sub-array 10*s* that is excited and imaged can change after each assay cycle, i.e., at the end of the first assay cycle. In some embodiments, the analysis system 200 (FIG. 8) only excites and images the sub-sets 10*s* of the array 10*a* associated with sub-sets of microwells 20 in the first row R1 at the end of the first assay cycle, and, at the end of the of the second assay cycle, the analysis system 200 excites and images only subsets of microwells 20 in the second row R2.

The device 10 may comprise upper and lower substrates 10*u*, 10*b* (FIG. 2) that attach together. The upper substrate 10*u* may be the same or different from the lower substrate 10*b*. Either or both substrates 10*u*, 10*b* can be rigid and comprise glass, quartz, silicon, or a suitable metal for example. The cover substrate 10*u* can be visually transmissive, typically transparent. Either or both substrates 10*u*, 10*b* may be polymeric, such as silicone or other polymeric material (such as PMMA, COC, COP, PDMS, PP, PE, PTFE, or Kapton (polyamide), among many others), and it can provide the one or more array of microwells 10*a*. In some embodiments, either or both substrates 10*u*, 10*b* may comprise silicon (e.g., may be a silicon wafer) and/or may be functionalized (e.g., silanized) with a hydrophobic compound such as, e.g., an alkyl silane and/or alkyl thiol. In some embodiments, either or both substrates 10*u*, 10*b* comprise silicon that is silanized with an alkyl silane.

A fluid channel 15 with the plurality of spaced apart sets of microwells 20, with each set of microwells 20 providing a respective microwell array 120*a* can have sidewalls and a floor formed into one or more of the substrates 10*u*, 10*b* to have an open top surface and a closed bottom surface with the sidewalls extending therebetween. One or more spacers, top substrates, membranes or covers may be used. The top substrate, membrane or cover can seal, cover or otherwise close the upper surface of a fluidic channel(s) and/or array of reaction wells. In some embodiments, the channels 15 can be etched into the top substrate 10*u* and the bottom can provide the sets of microwells 20 and can form a closed surface of the channels 15.

The analyte in a material input can be any analyte of interest including, for example, various mixtures including synthetic and biological macromolecules, nanoparticles, small molecules, DNA, nucleic acids/polynucleic acids, peptides, proteins and the like. The analyte can be one or more analyte molecules.

The material input can comprise a sample or analyte of a sample and can include one or more polar metabolites such as amino acids or charged molecules, molecules, peptides, and proteins. The sample and/or analyte may also or alternatively include molecules extracted from biofluids, blood, serum, urine, dried blood, cell growth media, lysed cells, beverages or food. The sample may also or alternatively include environmental samples such as water, air or soil.

The term "oligonucleotide" refers to a nucleic acid sequence of at least about five nucleotides to about 500 nucleotides (e.g., 5, 6, 7, 8, 9, 10, 12, 15, 18, 20, 21, 22, 25, 30, 35, 40, 45, 50, 55, 60, 65, 70, 75, 80, 85, 90, 100, 125, 150, 175, 200, 250, 300, 350, 400, 450 or 500 nucleotides). In some embodiments, for example, an oligonucleotide can be from about 15 nucleotides to about 50 nucleotides, or about 20 nucleotides to about 25 nucleotides, which can be used, for example, as a primer in a polymerase chain reaction (PCR) amplification assay and/or as a probe in a hybridization assay or in a microarray. Oligonucleotides of this invention can be natural or synthetic, e.g., DNA, RNA, PNA, LNA, modified backbones, etc., or any combination thereof as are well known in the art. An oligonucleotide of the present invention may be single stranded, double stranded, or partially doubled stranded. In some embodiments, an oligonucleotide is non-extendable (e.g., by PCR).

Probes and primers, including those for either amplification and/or detection, are oligonucleotides (including naturally occurring oligonucleotides such as DNA and synthetic and/or modified oligonucleotides) of any suitable length, but are typically from 5, 6, or 8 nucleotides in length up to 40, 50 or 60 nucleotides in length, or more. Such probes and or primers may be immobilized on or coupled to a solid support such as a bead, chip, pin, or microtiter plate well, and/or coupled to or labeled with a detectable group such as a fluorescent compound, a chemiluminescent compound, a radioactive element, or an enzyme.

Polymerase chain reaction (PCR) may be carried out in accordance with known techniques. See, e.g., U.S. Pat. Nos. 4,683,195; 4,683,202; 4,800,159; and 4,965,188. In general, PCR involves, first, treating a nucleic acid sample (e.g., in the presence of a heat stable DNA polymerase) with one oligonucleotide primer for each strand of the specific sequence to be detected under hybridizing conditions so that an extension product of each primer is synthesized which is complementary to each nucleic acid strand, with the primers sufficiently complementary to each strand of the specific sequence to hybridize therewith so that the extension product synthesized from each primer, when it is separated from its complement, can serve as a template for synthesis of the extension product of the other primer, and then treating the sample under denaturing conditions to separate the primer extension products from their templates if the sequence or sequences to be detected are present. These steps are cyclically repeated until the desired degree of amplification is obtained. Detection of the amplified sequence may be carried out by adding to the reaction product an oligonucleotide probe capable of hybridizing to the reaction product (e.g., an oligonucleotide probe of the present invention), the probe carrying a detectable label, and then detecting the label in accordance with known techniques, or by direct visualization on a gel. The amplified sequence can also be detected by adding an intercalating dye to the reaction mixture and monitoring the fluorescence signal strength, which will be proportional to the total mass of double stranded DNA. Other dyes that are non-intercalating but yield a higher fluorescence signal in the presence of dsDNA can also be used. Although embodiments according to the present invention are described with respect to PCR reactions, it should be understood that other nucleic acid amplification methods can be used, such as reverse transcription PCR (RT-PCR) including isothermal amplification techniques such as rolling circle amplification or loop-mediated isothermal amplification (LAMP), and nucleic acid sequencing methods may also be used. Additionally, other processes such as enzymatic amplification reactions such as the enzyme-linked immunosorbent assay (ELISA) can be used. In such cases, microwell temperature control may be used to control the amplification reactions to optimize imaging of the microwell arrays, and some areas can be imaged using only before and after complete reaction images (digital signal) while other areas or subarrays may be imaged during the reaction to obtain an analog signal.

DNA amplification techniques such as the foregoing can involve the use of a probe, a pair or set of three, four, five, or six or more probes, or two pairs of probes which specifically bind to DNA containing a polymorphism or mutation of interest, but do not bind as strongly to DNA that does not contain the polymorphism of interest under the same hybridization conditions, and which may serve as the primer or primers for the amplification of the DNA or a portion thereof in the amplification reaction. Such probes are sometimes referred to as amplification probes or primers herein. In some embodiments, two or more probes may be used such as, e.g., in a competitive process for the detection of single nucleotide polymorphisms (SNPs) and/or other mutations and/or rare alleles such as indels.

The term "reagent" refers to any substance or compound, including primers, the nucleic acid template and the amplification enzyme, that is added to a system in order to bring about a chemical reaction, or added to see if a reaction occurs. Amplification reagents or reagent refer to those reagents (deoxyribonucleotide triphosphates, buffer, etc.) generally used for amplification except for primers, nucleic acid template and the amplification enzyme. Typically, amplification reagents along with other reaction components are placed and contained in a reaction vessel (test tube, microwell, etc.).

The term "magnetic" as used herein includes ferromagnetic, paramagnetic and super paramagnetic properties.

In general, an oligonucleotide probe which is used to detect DNA containing a polymorphism or mutation of interest is an oligonucleotide probe which binds to DNA encoding that mutation or polymorphism, but does not bind as well to DNA that does not contain the mutation or polymorphism under the same hybridization conditions. The oligonucleotide probe is labeled with a suitable detectable group, such as those set forth below. Such probes are sometimes referred to as detection probes or primers herein.

Embodiments of the invention can be used for Singleplex Reactions in a Compact Array (SiRCA), a platform for sensitive, highly multiplexed nucleic acid (NA) and protein quantification. SiRCA combines sample preparation with digital PCR precision in a massively parallel, highly multiplexed format. NA-SiRCA is a magnetic bead-based PCR variant where assay panels can be made from microbead sets uniquely encoded with fluorescent dyes. Each set can be functionalized with a different primer pair for a specific target NA before the sets are combined. During the assay, primers on the beads can hybridize to the NA targets, capturing, concentrating, and purifying them from the sample matrix. Beads can be washed and loaded into sets of microwells 20 each comprising an array 120*a* containing thousands of microwells 120, typically where one bead occupies one bead well 120*w*. The microwells 120 may have any suitable volumetric capacity. In some embodiments, the microwells 120 have a volumetric capacity in a range of about 10 microliters or less, such as 10 femtoliters to less than about 10 microliters or about 10, 50, or 100 femtoliters to about 200, 500, or 1,000 femtoliters. In some embodiments, the microwells 120 have a volumetric capacity of about 100 femtoliters.

PCR master mix (containing all reagents except primers) is added before sealing the wells from each other using an immiscible oil. Upon heating, the bead releases the primer set and captured target, forming a singleplex PCR in each microwell 120. Thousands of spatially multiplexed PCRs are rapidly generated, without interference between primer sets. Signal from dsDNA intercalating dye indicates target amplification, and target ID is determined from the bead's encoding. At low concentrations, single molecule counting (digital signal) allows precise analyte quantification. At higher concentrations, real-time PCR (analog signal) measured as an average of the fluorescence signal from all wells of the same reaction type extends the quantitative range above the digital signal saturation point.

Figure 4A:
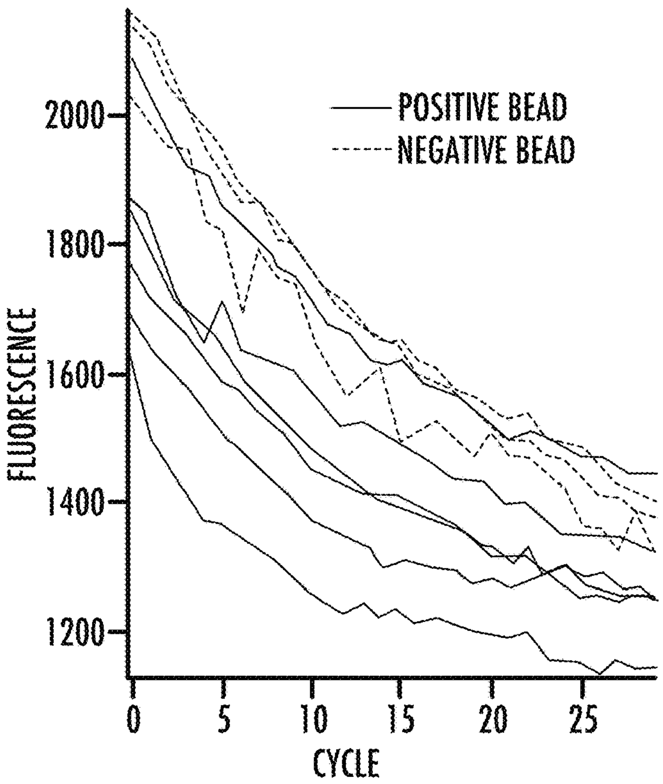
FIG. 4A is a graph of raw fluorescence versus cycle for negative and positive beads.
Figure 4B:
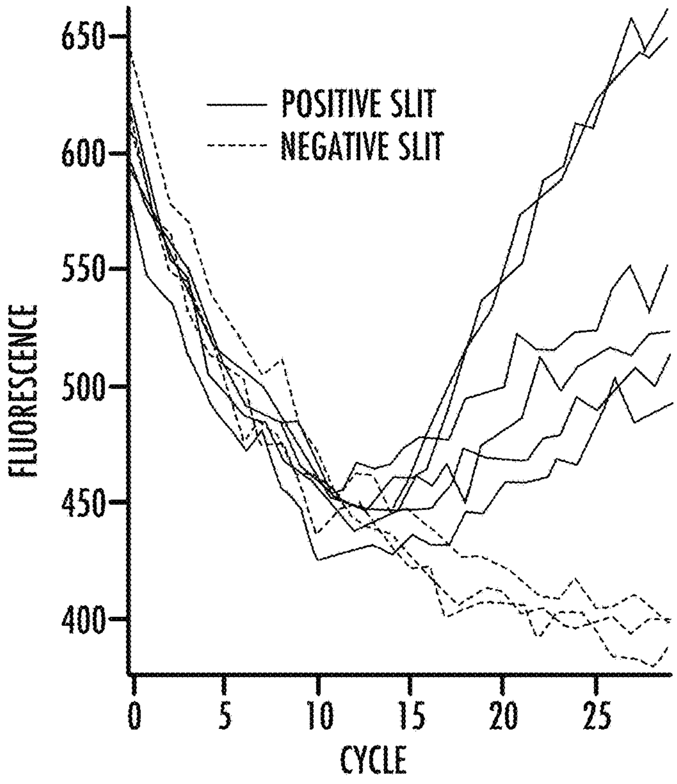
FIG. 4B is a graph of fluorescence versus cycle for positive and negative slits of microwells according to embodiments of the present invention.

The use of non-cylindrical microwell geometries can improve detection in microbead array-based technologies. These well geometries are fabricated such that one area of the well is optimized for magnetic loading and bead retention, and another region of the well is used for detection of a signal. After loading the beads in the bead regions of the wells, a small volume of reagent fluid is isolated in the wells using a method such as immiscible fluid sealing. An example single-array chip with insets showing the microwells 120 is shown in FIG. 3A. Other embodiments may include variations of the designs. In particular embodiments, it is preferable that one area has a pocket or receptacle 120*w* (FIG. 3B) with a diameter from about 100 to about 150% of the diameter of the bead with a depth from about 50% to about 185% of the bead diameter and a fluidically connected region consisting of a narrow pocket or slit 120*s* (FIG. 3B) or other geometric shape into which a standard bead cannot physically fit. Both regions are fluidically connected so that reagents or analytes released from the bead can diffuse or otherwise mix throughout the common solution volume. By spatially separating the bead from the detection region, the contribution of bead background fluorescence to the signal can be reduced or eliminated, improving signal to noise ratio (FIG. 4B). Additionally, these geometries permit high single occupancy loading of reaction wells while increasing their reaction volume, potentially improving reaction efficiency.

NA-SiRCA can be carried out using beads with a microtube format and/or microwell array 120*a* on chips 10 allowing about 35,000 or even more reactions such as up to about 1 billion reactions.

We have developed a 12-plex respiratory panel using synthetic targets. Excellent linearity was observed using combined digital and analog signal over the entire range of 10 copies/4 to 10,000,000 copies/4. Digital quantification at low concentrations (50-150 copies/4) displayed high precision with low variance, permitting discrimination between small copy number variations. We have shown that RNA can be assayed using reverse transcriptase. Additional assays under development include multiplex protein assays (cytokines) using immuno-PCR with sub pg/mL LODs.

Typically, digital assays do not require imaging of the assay signal after each cycle of amplification. However, analog assays rely upon the detection of a threshold cycle (Ct) in order to determine how many NA molecules were initially bound to a bead. The Ct is typically determined to be the first cycle at which the signal is significantly above (5-10% or more above) the background signal. Differences in the Ct can be used to determine the initial concentration of the sample. A Ct from a target sample ($C_{tS}$) can be compared to a reference reaction ($C_{tR}$) with a known initial concentration to determine the concentration in the target sample, assuming amplification efficiency of 100% in PCR reaction:

$$[\text{Sample}]=2^{C_{tR}-C_{tS}}*[\text{Reference}]$$

One of skill in the art will understand how to adjust for efficiencies under 100%.

The resolution of the concentration measurement (i.e. the precision with which concentration can be determined) is dependent on how often the fluorescence is measured. The maximum resolution is obtained by imaging after each cycle of amplification (i.e. each doubling of amplicon concentration). However, frequent imaging results in photobleaching of the dye in a manner dependent on the exposure of the dye to the excitation source. This is particularly significant for the small volume PCR reactions used in SiRCA. FIG. 4A shows traces of real-time PCR plots where the effects of photobleaching are evident by the negative slope of the baseline signal.

Microfluidic devices of the present invention may provide for one or more (e.g., 1, 2, 3, 4, or more) samples to be tested, optionally in a high throughput application and/or manner. A microfluidic device of the present invention may have a single substrate including one or more arrays 10*a* with a plurality of sets of microwells 20 with associated microwell arrays 120*a* (e.g., 1, 2, 3, 4, 5, 6, 7, 8, 9, 10, 11, 12, 13, 14, 15, 16, 17, 18, 19, 20, or more) thereon. In some embodiments, two or more fluid channels 15 optionally provided in a single array 10*a* or a plurality of arrays 10*a*, the latter shown in FIGS. 9-11 and 16, may be assembled on a substrate to form an aggregated multi-sample device 10 for high throughput applications. In some embodiments, the one or more sets of microwells 20 in a plurality of fluid channels 15 in one or more arrays 10*a* of the microfluidic device 10 can be thermocycled concurrently.

Digital PCR in such a format may be accomplished as the arrays may be imaged once before PCR and once after PCR in order to obtain the digital PCR data. In some embodiments, an array (e.g., an array including about 40,000 wells) is imaged by a sensor with a pixel density high enough so that light from one well is collected by at least one pixel. In some embodiments, each microwell 120 of a device of the present invention can be imaged by about 4 to about 20 pixels, or about 4 to about 100, 150, or 200 pixels. In some embodiments, systems, devices and/or methods of the present invention provides for one or more aligned or partially aligned sets of microwells 20 in two or more adjacent fluid channels 15 to be imaged using a single sensor without custom optics and/or precision alignment.

Alternatives to custom optics is the use of a precision positioning stage to move either the camera and/or the microfluidic chip horizontally, vertically, and/or rotationally so that the arrays can be imaged in serial fashion after the extension step of each PCR cycle. This approach allows the imaging of many arrays at the expense of increased assay time. For channels 15 with sets of microwells 20 providing 30,000 to 40,000 or more, such as 62.5 k microwells 120 per sample channel 15, translation and imaging can typically add about 1 second to about 10 seconds to each cycle for each array added, although high performance hardware can decrease this time at significant expense. Increasing the imaging time effectively increases the extension time of the PCR cycle. Although PCR reaction rate is cycle dependent and not time dependent, long delays in thermocycling required for imaging large numbers of arrays can be problematic as active polymerase is prone to writing dimers and nonspecific products if given ample time to do so. This can lead to increased background signal and reduced assay specificity.

Some embodiments of the present invention provide solutions to these imaging and/or data collection problems such as, e.g., by exploiting the unique features of an encoded microbead microwell array 120*a* (FIG. 3B) according to embodiments of the present invention.

The nature of the encoded bead array can allow for a unique method of analog PCR data collection and analysis. If the concentration of target molecules is in the analog domain, the average number of molecules for each bead type will be approximately the same. Therefore, the Ct for each bead set will be independent of the beads' positions in the array, and different areas of the array can be imaged on different cycles of PCR while still attaining single-cycle resolution. That is, it is not necessary to image the entire array after each cycle of PCR, only a representative portion of the array needs to be imaged. In some embodiments, rather than using a typical, approximately square array, an elongated array can be used so that the arrays from each sample can be positioned in close proximity. This may permit the camera to image two or more sample arrays at once, and many arrays in a short period of time, without the need to translate long distances or through a complicated path.

One implementation of this method can be illustrated by the following example using the device 10 layout shown in FIG. 1A. In this design, fluid channels 15 are grouped in sets (shown as pairs 15*p*) so that sub-sets of the array 10*s* of the sets of microwells 20, each with respective wells 120 (FIG. 3B) from two or more fluid channels 15 (optionally with two or more different samples) can be imaged by the camera in a single frame (the field of view of the camera is denoted by the frame box 25 at 1A, 2A in FIGS. 1A, 1B). In this example, representative portions of the wells 120*w* from each set of microwells 20 across one row $R_1$ can be imaged in only four acquisitions across the width of the device (successive acquisitions of A1 (also referred to interchangeably as "1A"), A2 (also referred to interchangeably as "2A"), then A3 (also referred to interchangeably as "3A"), A4 (also referred to interchangeably as "4A"), then A5 (also referred to interchangeably as "5A"), A6 (also referred to interchangeably as "1A"), then A7 (also referred to interchangeably as "7A"), A8 (also referred to interchangeably as "8A")) with only a short lateral translation between frames. Accordingly, in some embodiments, a method of the present invention includes collecting analog data without imaging the entire array 10*a* of the different sets of microwells 20.

Figure 17:
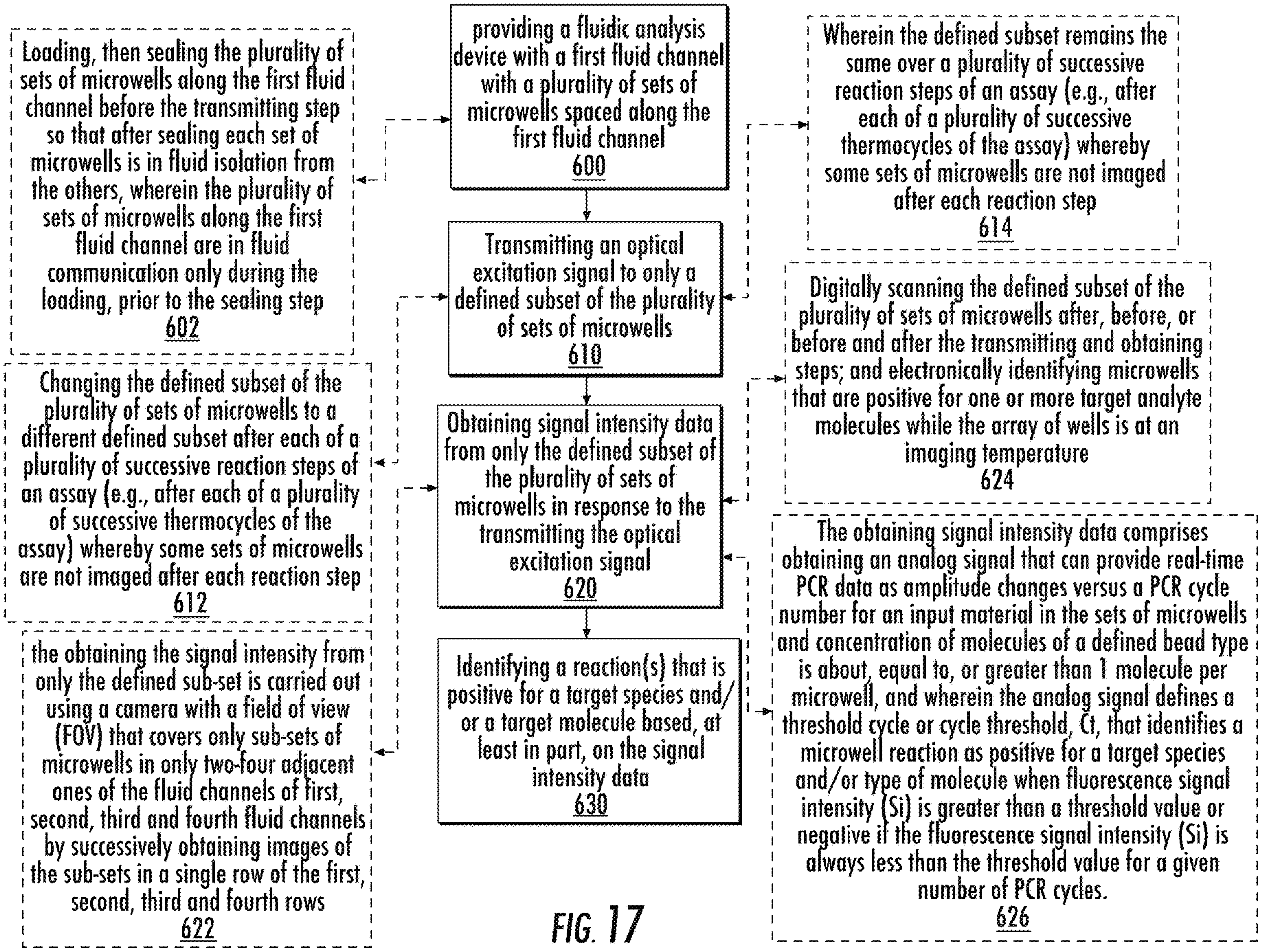
FIG. 17 is a flow chart of an example analysis method according to embodiments of the present invention.

FIG. 17 is a flow chart illustrating an example method of identifying a target species and/or a target molecule. A fluidic analysis device with a first fluid channel with a plurality of sets of microwells spaced along the first fluid channel is provided (block 600). An optical excitation signal is (optionally) transmitted to only a defined subset of the plurality of sets of microwells (block 610). Signal intensity data is obtained from only the defined subset of the plurality of sets of microwells (optionally) in response to the transmitting the optical excitation signal (block 620). Bead types that are positive for a target species and/or a target molecule are identified based, at least in part, on the signal intensity data (block 630). However, in some embodiments, optical excitation is not needed to obtain a signal. For example, in some embodiments, an assay (e.g. a protein assay) can generate a chemiluminescent signal that can be detected and/or imaged without optical excitation.

The method can optionally include loading, then sealing the plurality of sets of microwells along the first fluid channel before the transmitting step so that after sealing each set of microwells is in fluid isolation from the others. The plurality of sets of microwells along the first fluid channel are in fluid communication only during the loading, prior to the sealing step (block 602).

Optionally, the method can include changing the defined subset of the plurality of sets of microwells to a different defined subset after each of a plurality of successive reaction steps of an assay (e.g., after each of a plurality of successive thermocycles of the assay) whereby some sets of microwells are not imaged after each reaction step (block 612).

Optionally, the defined subset remains the same over a plurality of successive reaction steps of an assay (e.g., after each of a plurality of successive thermocycles of the assay) whereby some sets of microwells are not imaged after each reaction step (block 614).

Optionally, the method includes digitally scanning the defined subset of the plurality of sets of microwells after, before, or before and after the transmitting and obtaining steps; and electronically identifying wells that are positive for one or more target analyte molecules while the array of wells is at an imaging temperature (block 624).

Optionally, the obtaining the signal intensity from only the defined sub-set is carried out using a camera with a field of view (FOV) that covers only sub-sets of sets of microwells 20 in a respective sample channel 15 and only a sub-set of one or more neighboring, adjacent fluid channels 15, by way of example, two-ten or more, adjacent ones of the fluid channels of the first, second, third and fourth, or more fluid channels, by successively obtaining images of the sub-sets occupying a single physical location of the microchip 10, e.g., successively obtaining data from a different single row of the first, second, third and fourth or more respective rows (block 622).

Optionally, the obtaining the signal intensity comprises obtaining an analog signal. The analog signal can provide real-time PCR data as amplitude changes versus the number of PCR cycles for an input material in the sets of microwells of the fluid channel and concentration of target molecules for one or more defined bead type(s) is about, equal to, or greater than 1 molecule per microwell, and wherein the analog signal defines a threshold cycle or cycle threshold, Ct, that identifies a microwell reaction as positive when the fluorescence signal is greater than a threshold value or negative if the fluorescence signal is always less than a threshold value for a given number of PCR cycles, wherein the Ct is the cycle number where Si>>Bs, where >> is at least a 5-10% greater, optionally a factor of two greater, than Bs and/or 5-10 times a standard deviation of Bs, and where Si is fluorescence signal intensity and Bs is background fluorescence signal (block 626) as measured at a PCR negative reaction. The Ct can be compared to a reference reaction to determine the number of molecules of target at the beginning of the PCR reaction.

Optionally, the obtaining the signal intensity comprises obtaining an analog signal that can provide real-time PCR data as amplitude changes over a number of PCR cycles of an assay of an input material in the sets of microwells of the fluid channel and determine if the PCR reactions are positive for the target molecule when Si>>Bs is at least 10% greater, optionally a factor of two greater, than Bs and/or 5-10 times a standard deviation of Bs. Si can be calculated as an average, median, mode, or weighted value of the analog signal corresponding to each defined type of bead. In some embodiments, Si can be calculated by first throwing out outliers (typically at early PCR cycles) and then determining the average or median.

In some embodiments, referring to FIGS. 19 and 20A-20D, loading beads into the device 10 can be carried out as follows. The device 10 is wetted with loading buffer and positioned onto a holder 900 (FIG. 21) that is coupled to or cooperates with a linear magnet or an array of magnets 800 (block 700). The vias 16*v* of input ports 16 can optionally be positionally offset in two neighboring adjacent rows to allow for bead loading with minimal risk of cross-channel contamination (block 702). While the magnet 800 is held under the odd numbered channels (FIG. 20A), the bead slurries from the material input can be pipetted into the vias 16*v* (block 710). The magnet 800 is then moved so it rests underneath the even numbered vias (FIG. 20B), pulling the beads into the odd numbered channels (block 720). Of course, the steps shown in FIGS. 2A and 20B can be carried out in reverse order. After adding the bead slurries into the even numbered vias, the magnet 800 is used to pull the beads into the microwells (array chambers) (FIG. 20C) (block 730). The sets of microwells (array segments) are loaded with beads by sliding the magnets under each set of arrays 20 along the fluid channels 15, toward the manifold channel and/or master mix port 18, and the motion is controlled, optionally with a hard stop device 810 (FIG. 20C), such that the beads do not enter the common manifold channels (which could allow mixing of the beads between the samples) (block 740).

In each channel 15, there are segmented sets of, optionally physically spaced apart, microwells 20 (block 704), shown in FIG. 1A as five sets of microwells $20_1$-$20_5$ (with 12.5 k wells each) containing a total of thousands or millions of microwells 120, optionally about 62.5 k microwells 120, for each material input or fluid channel 15.

After microwells 120 (FIG. 3B) of each set of microwells 20 in a fluid channel 15 are loaded with the beads, the remaining beads are dragged magnetically back towards the vias 16*v* by translating the magnet 800 toward the vias 16*v*, input port 16 (FIG. 20D) (block 750). Master mix is flowed under pressure applied at the common reservoir 18 until it fills the channels 15 (block 760). Sealing oil is then pumped under pressure until it seals the sets of microwells 20 and displaces the excess master mix from the channels 15 (block 770).

Optionally, absorbent pads can be placed over the reservoirs 16*r* and/or vias 16*v* to collect the aqueous solutions as they are displaced from the device 10, or partial vacuum can be used to remove the liquid as it seeps from the vias 16*v* and/or reservoirs 16*r* (FIG. 2A) (block 772).

Optionally, a second microfluidic channel, channel network, or reservoir can be used to store the waste effluent instead of letting it seep from the vias. Such a waste reservoir, either microfluidic or as a separate, optionally attached reservoir or set of reservoirs, can be fluidically connected to the channels and/or vias by a wax or paraffin valve or a hydrophobic constriction in a manner that prevents it from filling before the master mix addition and/or the sealing step. In some embodiments, the vias can be sealed with a membrane after the bead addition such that the membrane block aqueous and/or oil flow, optionally allowing air to escape through the membrane. In some embodiments, the membrane can cover other vias or ports and act as a path for air to escape from the microfluidic channels, chambers, or vias.

The device 10 is then placed onto a thermocycling microscope stage of a test system 200*h* (FIG. 8) for thermocycling, PCR and imaging (block 780).

The array 10*a* of sets of microwells 20 of the fluid channels 15 is broken up into subarrays, i.e., A-E, referred to here by row and fluid channel number (i.e. A1 is the subset of microwells $\mathbf{20}_1$ in the upper left hand corner of the device and E8 is the sub-set of microwells $\mathbf{20}_5$ found in lower right hand corner of the device). A1-A2 can be imaged by a single image acquisition.

Example Data Collection and Processing Method 1 ("Method 1")

The camera (222, FIG. 8) may be initially aligned and focused on sub-sets of sets of microwells 20 at positions A1-A2, A7-A8, E7-E8, and then E1-E2. Locations of these corner 20*c* sub-sets of microwells 20 in X, Y, and Z (focal height) can be used to calculate the positions for all the interior sets of microwells 20. The focus can be collected while the array 10*a* is held at the imaging temperature (typically the extension temperature of about 60° C. to about 72° C.) to negate dimensional changes from thermal expansion. Every set of microwells 20 in each channel 15 is then imaged at the imaging temperature before PCR thermal cycling to obtain baseline "prePCR" images.

After the first cycle of PCR, sub-sets of sets of microwells 20 in the first row (A1-A2, A3-A4, A5-A6, and A7-A8) are sequentially imaged in a total of four frames. After the second cycle of PCR, the second row is imaged (B1-B2, B3-B4, B5-B6, and B7-B8). After imaging row E after the $5^{th}$ PCR cycle, the series is repeated and row A is imaged after the $6^{th}$ PCR cycle. If this process is continued for 30 PCR cycles, each row will be imaged six times. In order to reduce the time needed for stage translation, the stage will move to the location of the next row while the denaturation step is performed before the next annealing/extension/imaging step is performed.

After thermocycling is completed, "postPCR" images are taken of the entire array 10*a* at the imaging temperature. The array 10*a* is cooled (typically to about 20° C. to about 25° C.) and another set of postPCR images are taken (to elucidate problem areas of the chip where aqueous master mix may be connecting two or more wells due to a failure in the sealing technique). If desired, the array 10*a* can be imaged at a series of temperatures to determine the melting point and/or range of amplicons detected after PCR cycling. The filter set ($F_1$, $F_2$, FIG. 8) is changed to an encoding wavelength, and the first set of encoding images are taken for each sub-set of sets of microwells 20, followed by a second set of encoding images using a second filter set if needed and repeated as necessary for the decoding of the bead set.

Processing of the imaging data can be divided into two domains: digital and analog. The digital PCR signal can be determined by comparing the prePCR and postPCR images to determine if an increase in intercalating dye signal exceeded a set threshold for each well. In some embodiments, only a postPCR image may be needed to determine a digital positive or negative. Alternatively, the prePCR and postPCR images can be used, optionally along with the six thermocycle images, to determine if the fluorescence signal changed over the course of the images in a manner consistent with PCR amplification of the correct amplicon. For example, at low concentrations of target where some portion of the population of PCR reactions for that target is negative, an increase in signal would be expected at later cycles and outliers that show strong signal early in the cycling may be considered non-specific amplification products or misidentified beads.

Figures 5A, 5B, 5C, 5D:
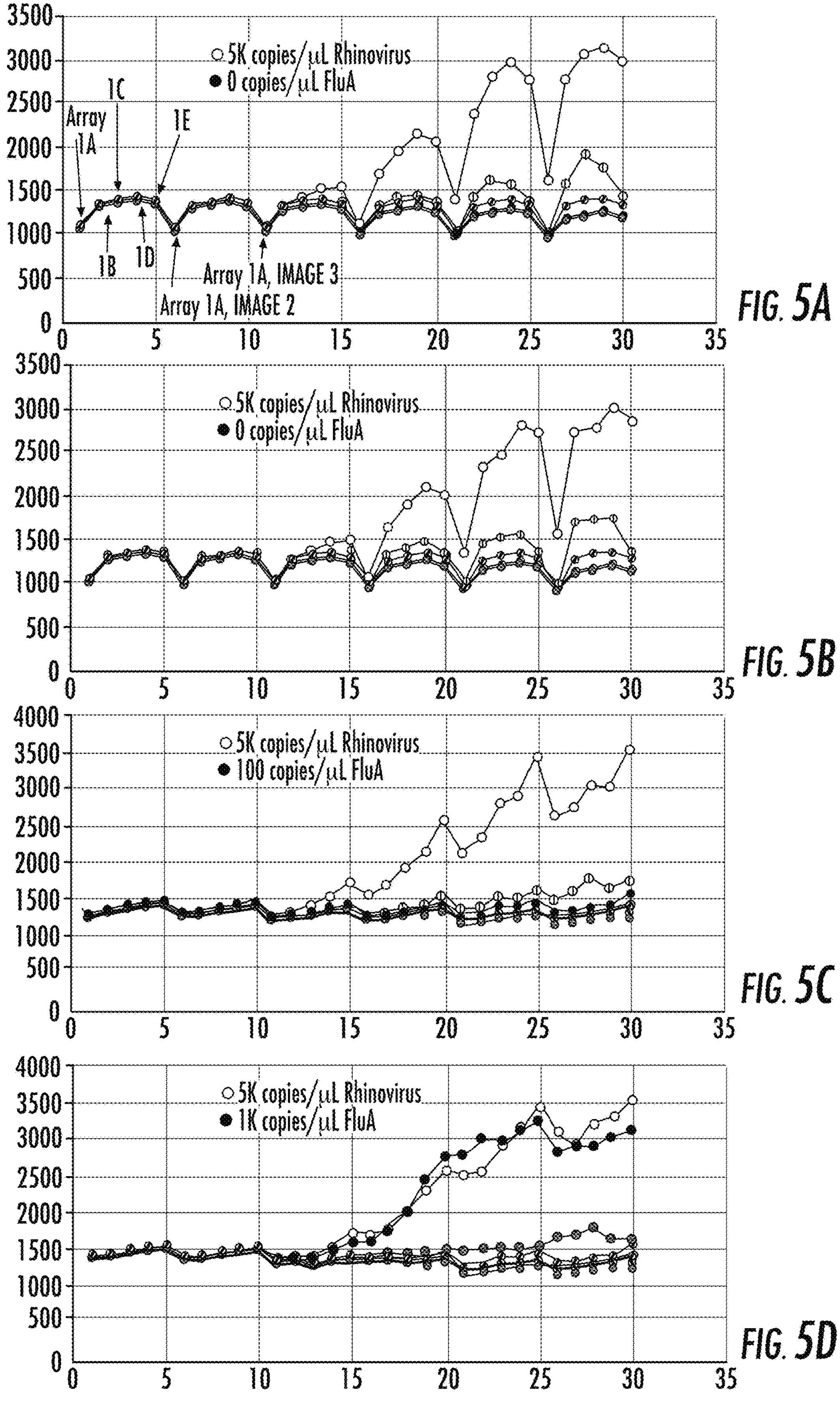
FIGS. 5A-5H are graphs of raw data over cycles obtained by combining real-time PCR data from different sub-sets of microwells from different fluid channels during PCR according to embodiments of the present invention.
Figure 5E:
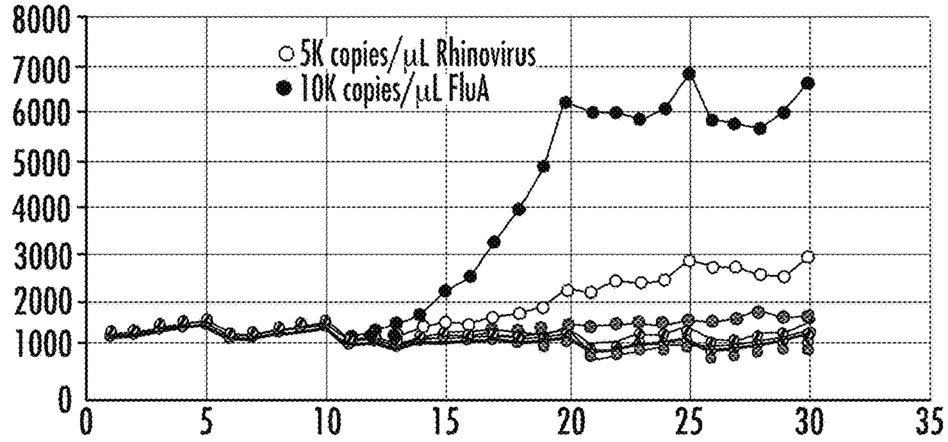
Figure 5F:
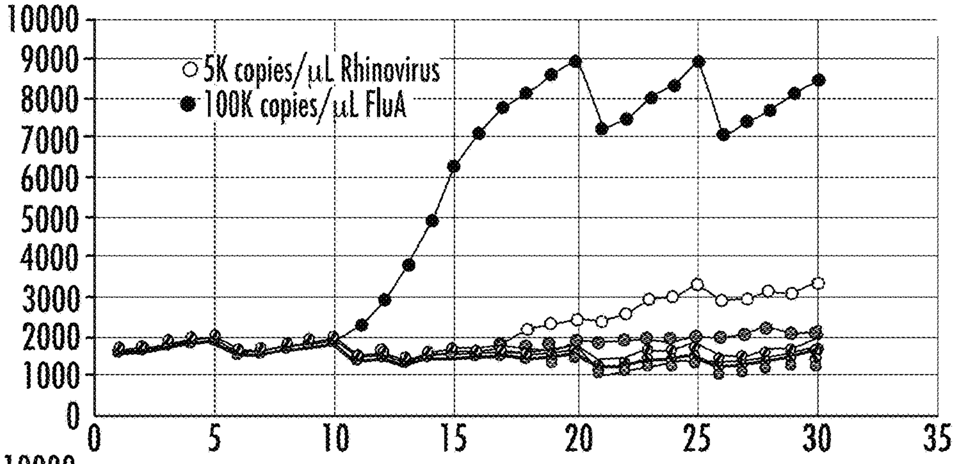
Figure 5G:
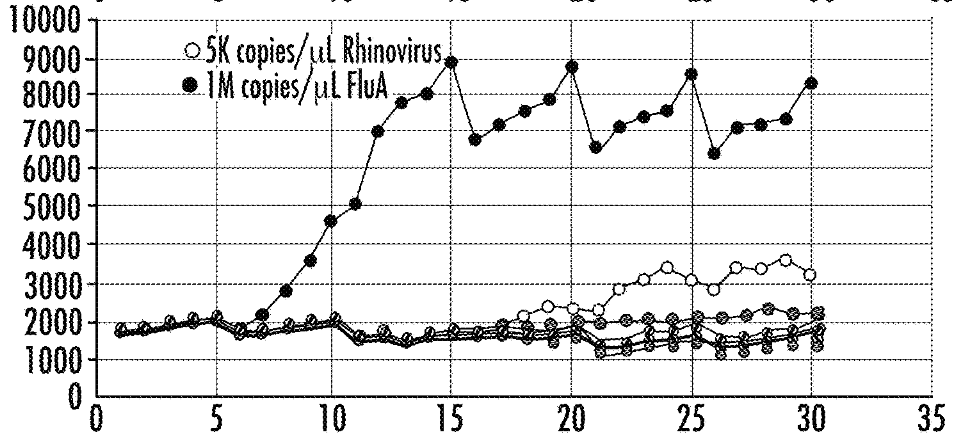
Figure 5H:
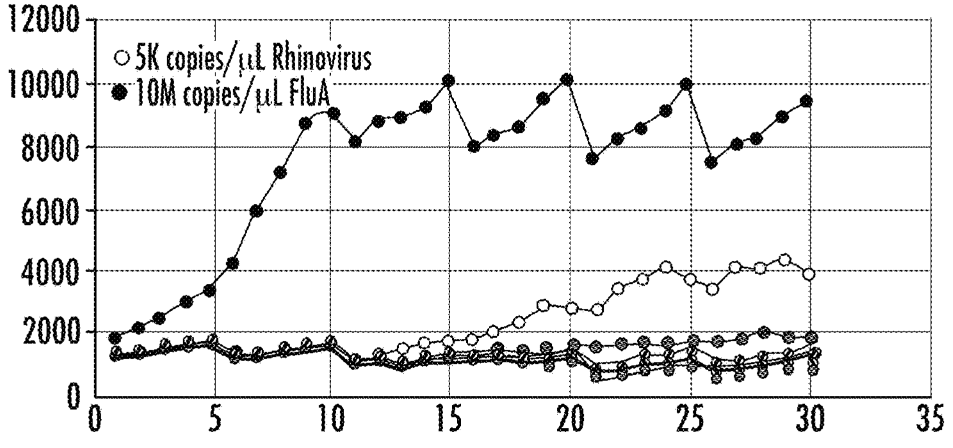
Figure 6A:
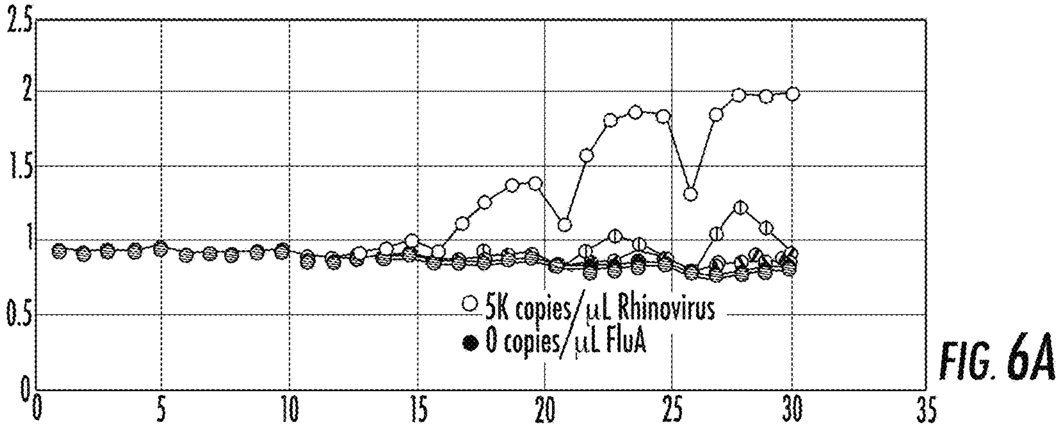
FIGS. 6A-H are graphs of normalized data of the data shown in FIGS. 5A-5H according to embodiments of the present invention.
Figure 6B:
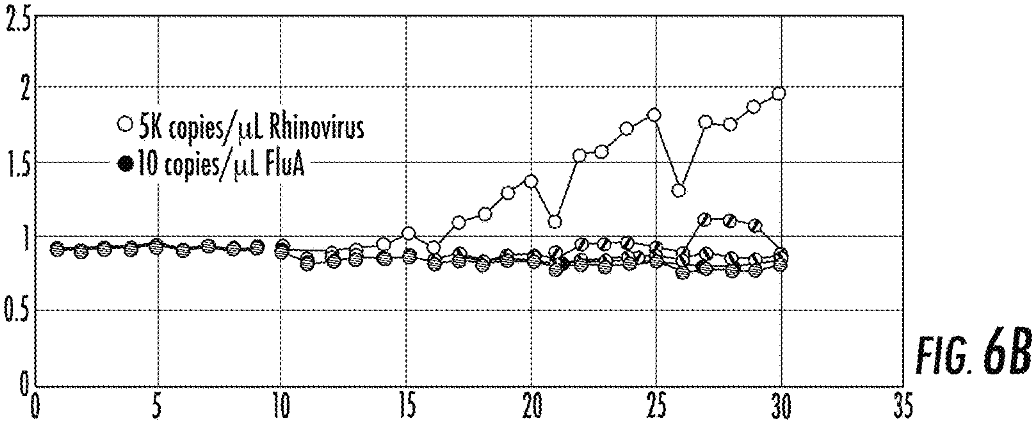
Figure 6C:
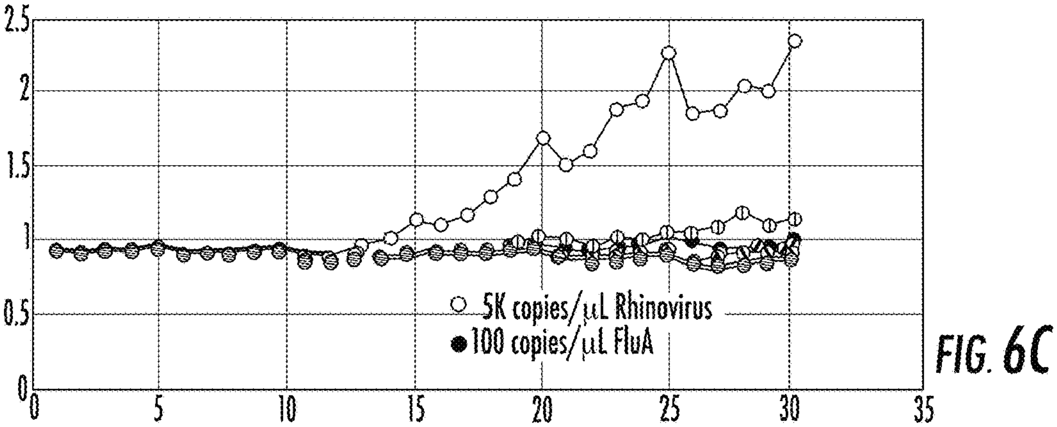
Figure 6D:
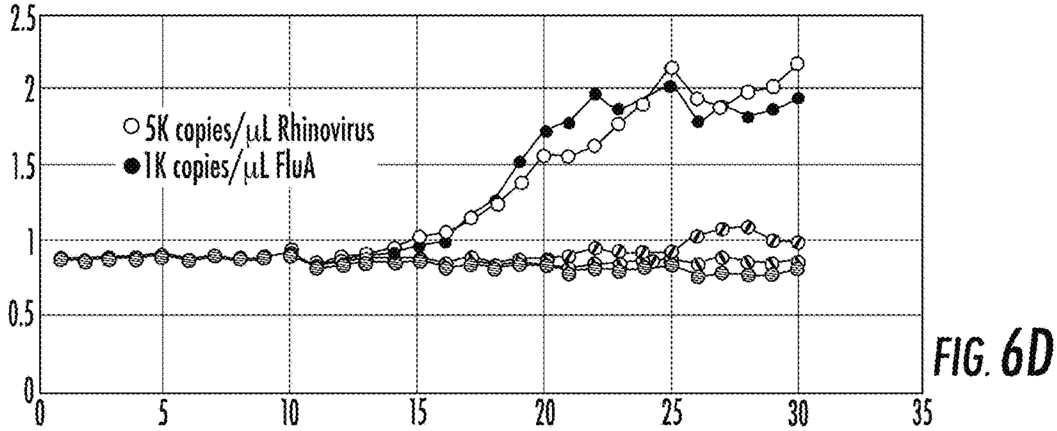
Figure 6E:
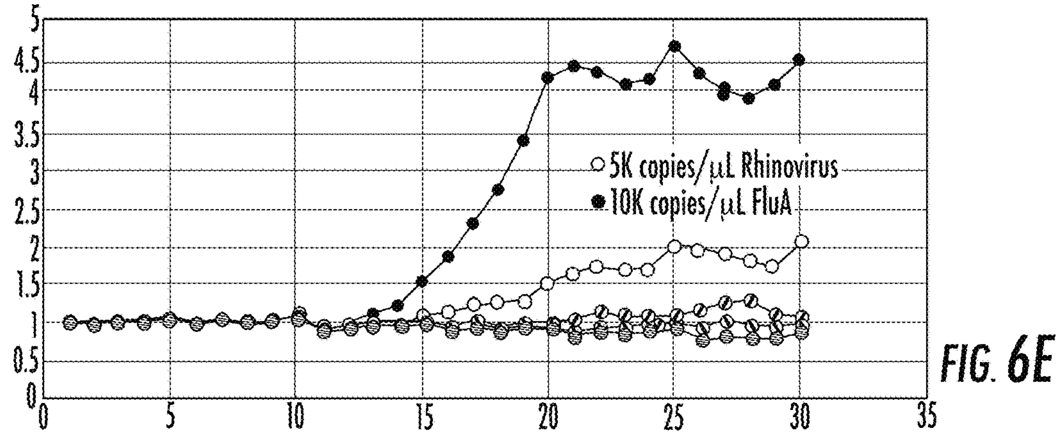
Figure 6F:
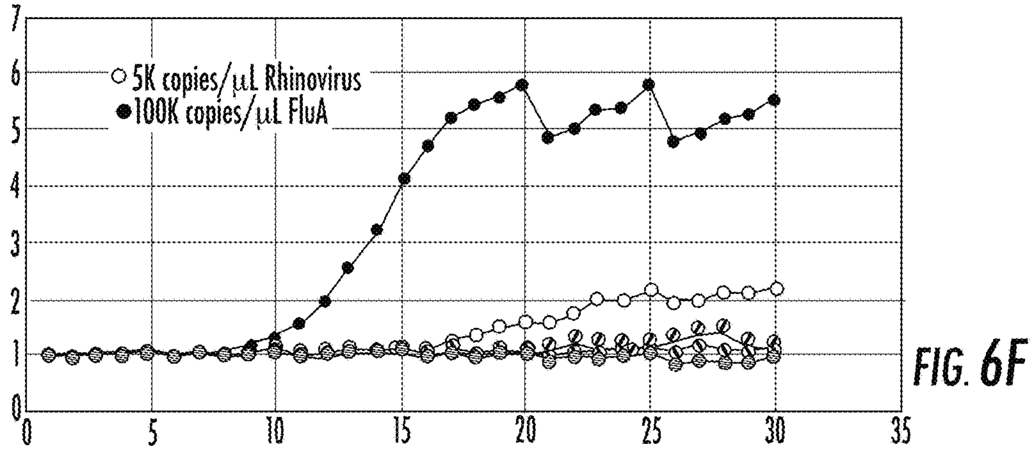
Figure 6G:
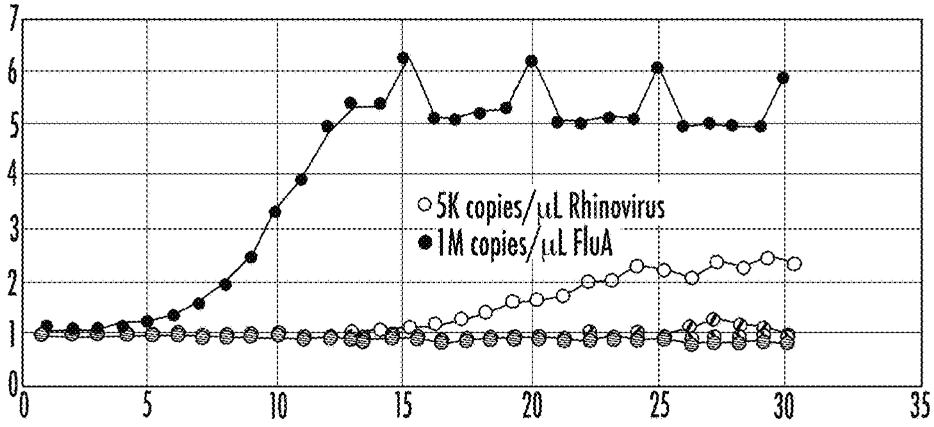
Figure 6H:
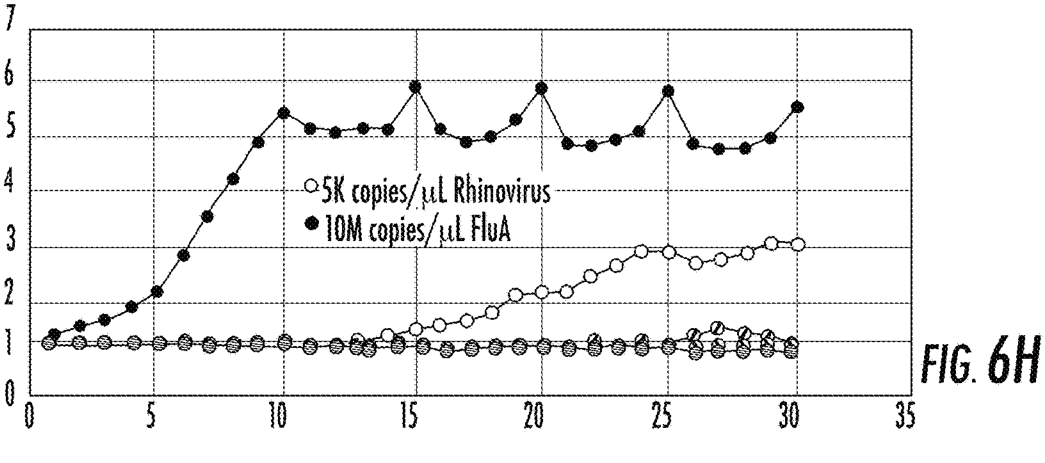
Figure 7A:
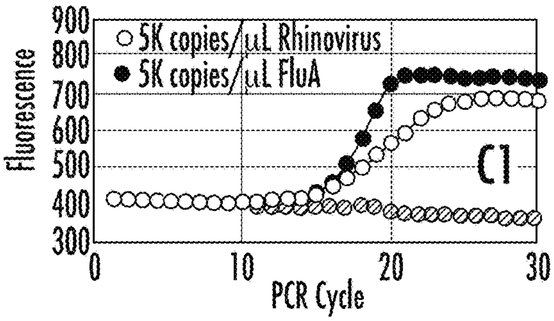
FIGS. 7A-7H are graphs of real-time PCR data collected from one row of sets of beadwells in different fluid channels according to embodiments of the present invention.
Figure 7B:
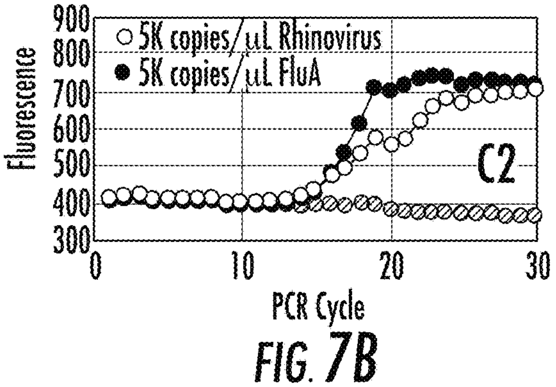
Figure 7C:
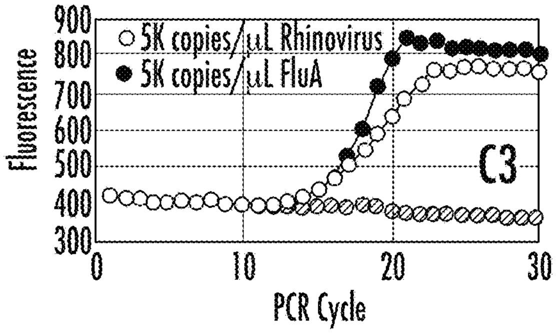
Figure 7D:
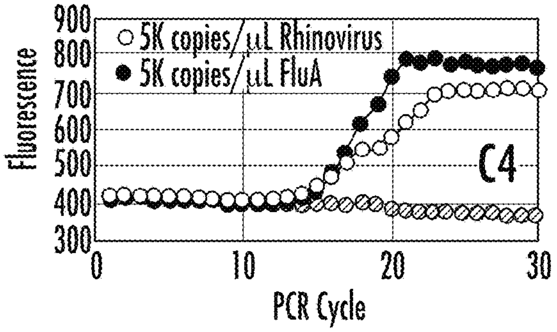
Figure 7E:
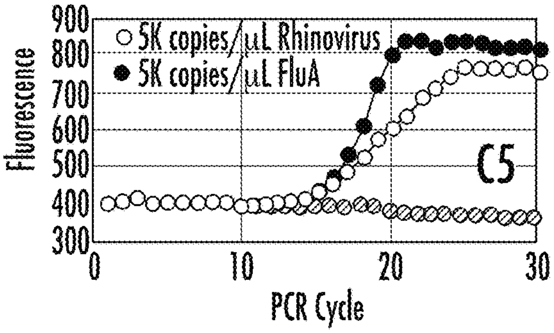
Figure 7F:
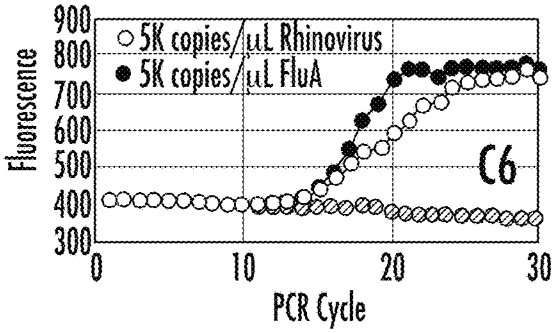
Figure 7G:
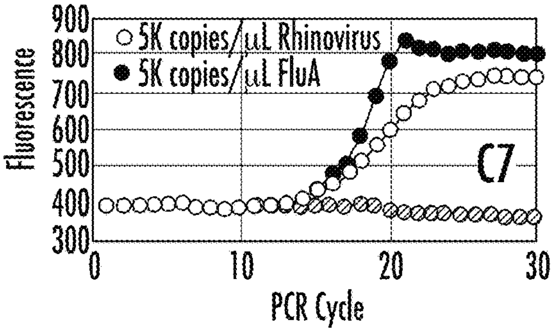
Figure 7H:
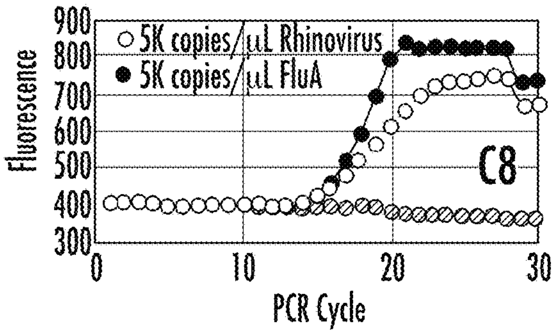

At high concentrations of target where most or all of the PCR reactions are positive, the real-time, analog signal is used. While the signal from each sub-set of microwells 20 in the array 10*a* has a resolution of five cycles (as each subarray is only imaged once every five PCR cycles), at least one sub-set of the microwells 20 of the channels 15 of the array 10*a* for each sample was imaged after each PCR cycle. Since target molecules should be equally distributed over a given population of beads, it is possible to combine the data from the images to reconstruct a Ct curve with single-cycle resolution, even though the same wells are not imaged after every cycle. This is achieved by averaging the signal intensity from each bead set for each sample for each image. The average signal for each bead type can then be plotted as a real-time PCR curve as shown in FIGS. 5A-5H. As can be seen in FIG. 5A, the real-time signal used for cycle 1 comes from the first image of the microwell 20 at position 1A, while the data for cycles 2, 3, 4, and 5 come from the first image of subarrays 1B, 1C, 1D, and 1E. At cycle 6, the data from the second image of subarray 1A is used; at cycle 11, the data from the third image of subarray 1A is used. This process is used for all eight fluid channels 15 (and each channel can have the same sample or different samples, i.e., eight samples) on each chip 10 to construct a real-time PCR curve.

As can be seen in FIGS. 5A-5H, the fluorescence intensity baseline is not completely uniform across subarrays (subsets of microwells 20) for a given fluid channel 15 and/or sample. This may be due to several factors including the effective concentration of the intercalating dye, the focus of the image, and/or the effect of different levels of silanization of the device. If the PCR image signals are normalized by dividing them by the prePCR image signal (FIGS. 6A-6H), the baseline is more linear and the calling of cycle thresholds may be more reproducible. Irregularities in the max PCR signal should have a low impact on quantification of the targets. A protocol to help control dye concentration and thus the intensity of the fluorescence signal across all the arrays is discussed later.

Example Data Collection and Processing Method 2 ("Method 2")

In some embodiments, data collection can be performed by imaging only a set of subarrays (a sub-set of the sets of microwells 20) for all PCR cycles, 30 cycles in this non-limiting example. In this approach, the camera may be aligned and focused using the locations of the corner subarrays as described in example method 1 above. Every set of microwells 20 (i.e., every subarray) is then imaged at the imaging temperature before PCR thermal cycling to obtain baseline "prePCR" images.

After the first cycle of PCR, one row of sets of microwells 20 (subarrays) is imaged, e.g. different sets of microwells 20 at row C. Sets of microwells 20 at positions C1 -C2, C3-C4, C5-C6, and C7-C8 are sequentially imaged in a total of four frames. After the second cycle of PCR, the same row is imaged again. This process is continued for 30 PCR cycles, and, in this example, the same row will be imaged thirty times for thirty PCR cycles as seen in FIGS. 7A-7H.

After thermocycling, "postPCR" images are taken of the entire array at the imaging temperature. The array is cooled (typically to about 20° C. to about 25° C.) and another set of postPCR images are taken. If desired, the array can be imaged at a series of temperatures to determine the melting point or range of amplicons detected after PCR cycling. The filter set (F1, $F_2$, FIG. 8) is changed, and the first set of encoding images are taken for each subarray, followed by a second set of encoding images using a second filter set.

Similar to example Method 1, processing of the imaging data can be divided into two domains: digital and real-time (analog). For this method, the digital PCR signal can only be determined by comparing the prePCR and postPCR images to determine if an increase in intercalating dye signal exceeded a set threshold for each well (Table 1). In some embodiments, the digital may be obtained from the postPCR image alone.

TABLE 1

Data was collected using a combination of real-time and digital processing as described by Method 2. Specifically, row C was collected as real-time traces and the other regions were analyzed digitally. Each sample contained 5,000 copies/μL of Rhinovirus and FluA synthetic DNA sequences spiked into the different sample channels. Table values represent the percent positive for the corresponding encoded bead set.

| a) | Rhinovirus | 1 | 2 | 3 | 4 | 5 | 6 | 7 | 8 |
|---|---|---|---|---|---|---|---|---|---|
| | A | 10.0% | 7.8% | 12.0% | 12.7% | 13.2% | 12.5% | 9.6% | 9.5% |
| | B | 9.7% | 10.2% | 10.9% | 9.9% | 15.8% | 12.1% | 10.2% | 9.6% |
| | C | 9.8% | 15.1% | 10.4% | 12.1% | 8.9% | 13.0% | 10.6% | 10.4% |
| | D | 8.7% | 5.6% | 11.9% | 13.8% | 11.8% | 6.3% | 14.6% | 9.6% |
| | E | 7.7% | 7.4% | 9.6% | 9.7% | 9.3% | 10.3% | 8.5% | 6.5% |
| | Total | 9.2% | 9.6% | 11.0% | 12.0% | 12.3% | 11.3% | 10.7% | 9.3% |
| **b)** | **FluA** | **1** | **2** | **3** | **4** | **5** | **6** | **7** | **8** |
| | A | 24.3% | 29.7% | 32.1% | 30.1% | 32.2% | 31.5% | 31.7% | 26.2% |
| | B | 27.2% | 29.1% | 28.2% | 30.6% | 31.6% | 31.4% | 32.7% | 25.3% |
| | C | 27.8% | 28.6% | 29.5% | 28.8% | 30.5% | 26.1% | 29.0% | 27.4% |
| | D | 26.0% | 27.7% | 29.2% | 29.9% | 32.0% | 30.3% | 29.7% | 25.3% |
| | E | 21.0% | 27.1% | 26.6% | 27.0% | 28.0% | 29.9% | 30.1% | 23.3% |
| | Total | 25.4% | 28.7% | 29.3% | 29.5% | 31.1% | 29.9% | 30.8% | 25.6% |

The sets of microwells 20 (i.e., subarrays) not imaged during PCR will have very little photobleaching while the imaged subarrays may show significant photobleaching. This may require a different threshold to distinguish a digital positive from a digital negative in some embodiments.

Analog signal processing of the imaged subarray is similar to the traditional, whole-array-imaging method. Signal is averaged for each bead population and plotted against the PCR cycle number (FIGS. 7A-7H). For analog signals where target molecules exceed one copy per bead, the average signal from a few hundred beads should suffice for accurate and precise Ct determination.

Methods of the present invention such as, e.g., example Method 1 and Method 2 described above, may have advantages over typical data collection protocols where all wells in an array are imaged every PCR cycle. In some embodiments, a method of the present invention reduces the data collection time while generating single-cycle real-time PCR resolution for analog quantification. The compact, narrow design of the well arrays may allow for imaging fluidically separated arrays from multiple samples in a single image.

Advantages of collecting the analog data across multiple subarrays (e.g., as described in regard to example method 1) may include reduced photobleaching. For example, example method 1 may provide significantly reduced photobleaching as each subarray is only exposed to 20% of the illumination used for a standard collection protocol. Data collected over several cycles, even at lower cycle resolution, may be more reliable for identifying false positive beads for digital quantification as comparing only the prePCR and postPCR images. Additionally, the lower degree of photobleaching may allow for adequate signal at lower intercalating dye (e.g. SYBR Green I) concentrations than those required for imaging all 30 cycles. As the intercalating dye can inhibit PCR, lower concentrations may improve PCR efficiency or melting point determination for some targets.

Advantages of collecting the analog data from a single row of sets of microwells 20 (i.e., subarrays or sub-sets of microwells as described in regard to example Method 2) may include less reliance on normalization of the data for Ct determination, making analysis more straightforward. Additionally, the prePCR images can be used to determine which row had the most optimum bead loading for analog, real-time PCR analysis. This may help ameliorate problems that could occur if one or a few of the subarrays do not load enough beads for analog analysis (although this problem can be addressed by other means such as tight control over the array size, geometry, location, bead population size, and bead size).

Example Methods 1 and 2 are merely illustrative examples of the device design and data collection methods of the present invention, and various combinations and/or modifications can be used. For example, a single row of sets of microwells 20 in different fluid channels 15 can be imaged every cycle or every other cycle in combination with imaging of the other subarrays at various different intervals. While some combinations may require more acquisition time, in some embodiments, the improved quality of the digital data or analog data may be worth such a tradeoff. In some embodiments, all or most sets of microwells 20 may be imaged at some PCR cycles (and typically not every and/or not each PCR cycle).

The devices 10 shown are merely demonstrative of the design concept (i.e., division of a bead/reaction well array into a series of subarrays, spaced and located such that they may be imaged in an advantageous manner), and other designs may be used in the practice of the invention. In some embodiments, a device 10 of the present invention may include one or more array 10*a* of fluid channels 15 for more than eight fluid channels 15, such as 9-1000 fluid channels 15, including 16, 32, 64, 96, 384, etc. . . . or more fluid channels 15 with respective sets of microwells 20 per device 10. In some embodiments, a device 10 of the present invention may be fabricated in silicon, glass, a polymer (e.g., injection-molded and/or hot embossed plastics), and/or a metal film. In some embodiments, a device 10 of the present invention may be a composite structure. In some embodiments, a device 10 of the present invention may contain only the bead/reaction well array and an array chamber, or may include other structures such as sample processing microfluidic circuits and/or labeling or amplification reagents needed to perform the assay.

Electrical and/or mechanical circuits, actuators, and/or sensors may be integrated, attached, and/or assembled into and/or on the device 10, optionally for the performance and/or readout of an assay.

Polystyrene beads can absorb both hydrophobic as well as charged molecules from aqueous solutions. The long and narrow geometry of microwell array 20 can result in depletion of certain components, such as the intercalating dye, from the master mix as it is flowed through the channels 15. The beads in the first subarrays to encounter the master mix may absorb a larger amount of a component (e.g., an intercalating dye) and the last arrays may absorb less from the partially depleted solution. When the component is a dye, this can result in a gradient in the dye concentration across the chip and therefore, the initial bead fluorescence, when comparing arrays in a channel (FIG. 20). These differences in dye absorption can lead to several complications for the assay, as too much dye can inhibit PCR and too little dye results in a weak amplification signal. Additionally, variations in the intercalating dye concentration can cause undesirable variance in the apparent fluorescence intensity of the encoding dyes which can make decoding the array more difficult. This effect may be one of the causes of the lower intensity signal in some subarrays observed in FIGS. 5 and 6.

Dye absorption by beads may be modified by including (e.g., adding) various reagents to cause more uniform dye (e.g., SYBR) absorption/partitioning across the whole array. These reagents (also referred to herein as "dye uniformity agent(s)") can include, but are not limited to, oligonucleotides of various lengths such as single stranded DNA, RNA, double stranded DNA (optionally with a low melting temperature so that the reagent is double stranded during addition to the channel and sealing of the wells but single stranded, and thus not associated with the intercalating dye during the imaging step of PCR), partially double stranded DNA, ionic or nonionic polymers such as dextran sulfate or polyamines, surfactants, detergents, phase-transfer catalysts, dextrans, cyclodextrans, silicones, polysilicones, fluorocarbons, polyfluorocarbons, fluorosilicones, hydrocarbons, alcohols, hydrofluorocarbons, biomolecules such as peptides, proteins, lipids, carbohydrates, glycans, composite molecules, nucleic acids and/or modified nucleic acids. Reagents and/or compounds with known PCR compatibility and low fluorescence signal when associated with the intercalating dye are particularly well-suited for this purpose. A dye uniformity agent may be miscible with a master mix. In some embodiments, a dye uniformity agent is present in and/or added to a master mix. A dye uniformity agent (e.g., a partially double stranded DNA) may be present in a master mix at a concentration in a range of about 100 nM to about 100 μM or any range and/or value therein (e.g., about 1, 5, or 10 μM to about 15, 25, 50, or 100 μM). In some embodiments, a dye uniformity agent may be attached (e.g., covalently and/or non-covalently) to a portion of a bead. In some embodiments, a bead may comprise a dye uniformity agent in an amount in a range of about 300 pM, 1 nM, or 3 nM to about 300 μM or 3 mM.

Figure 22:
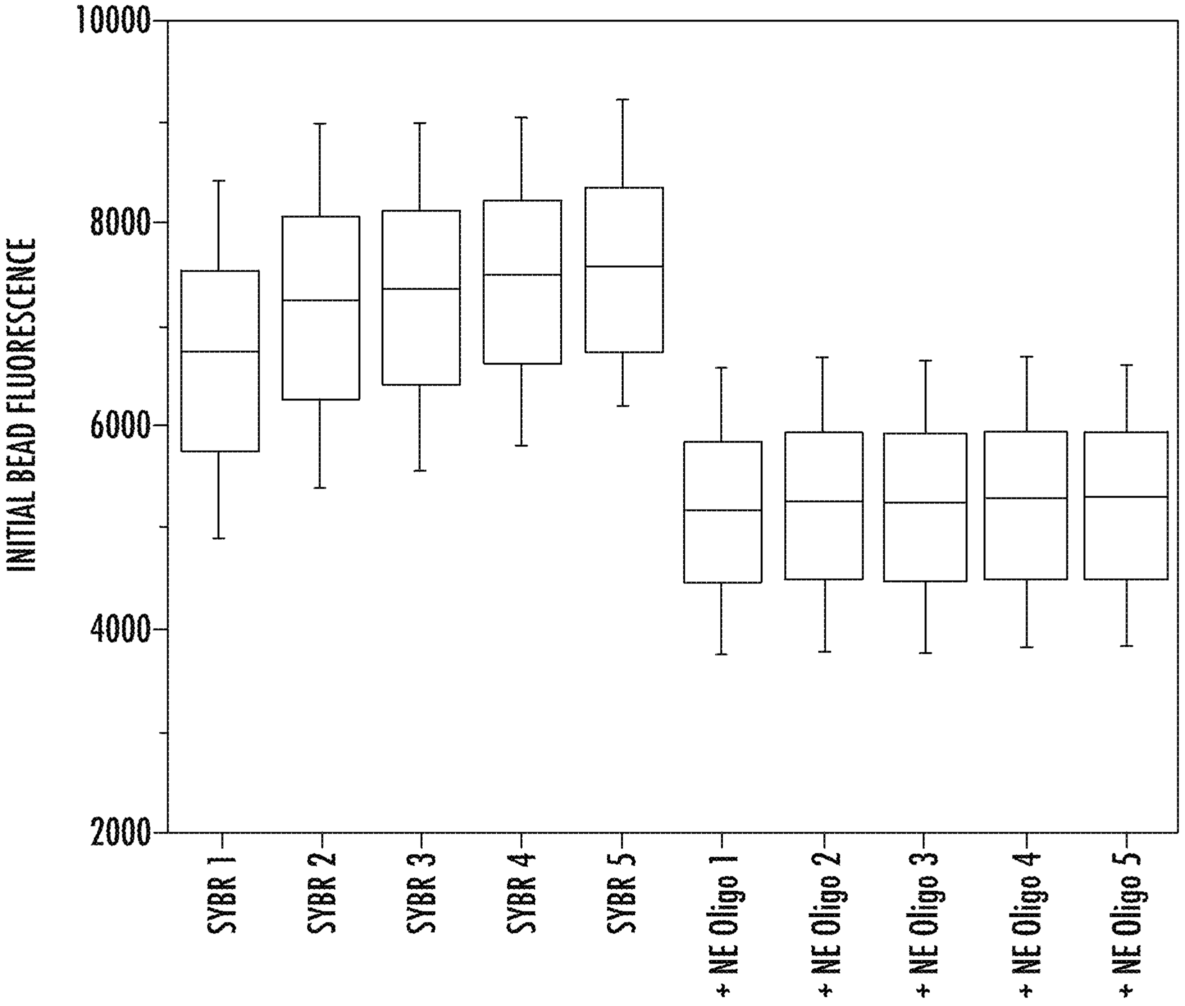
FIG. 22 is a box plot of initial bead fluorescence of each bead in five arrays from one lane of two eight channel microchips, one microchip treated with a master mix with 10×SYBR and the other microchip treated with a master mix with 20×SYBR plus 5 μM non-extendable oligo according to embodiments of the present invention.
Figure 23:
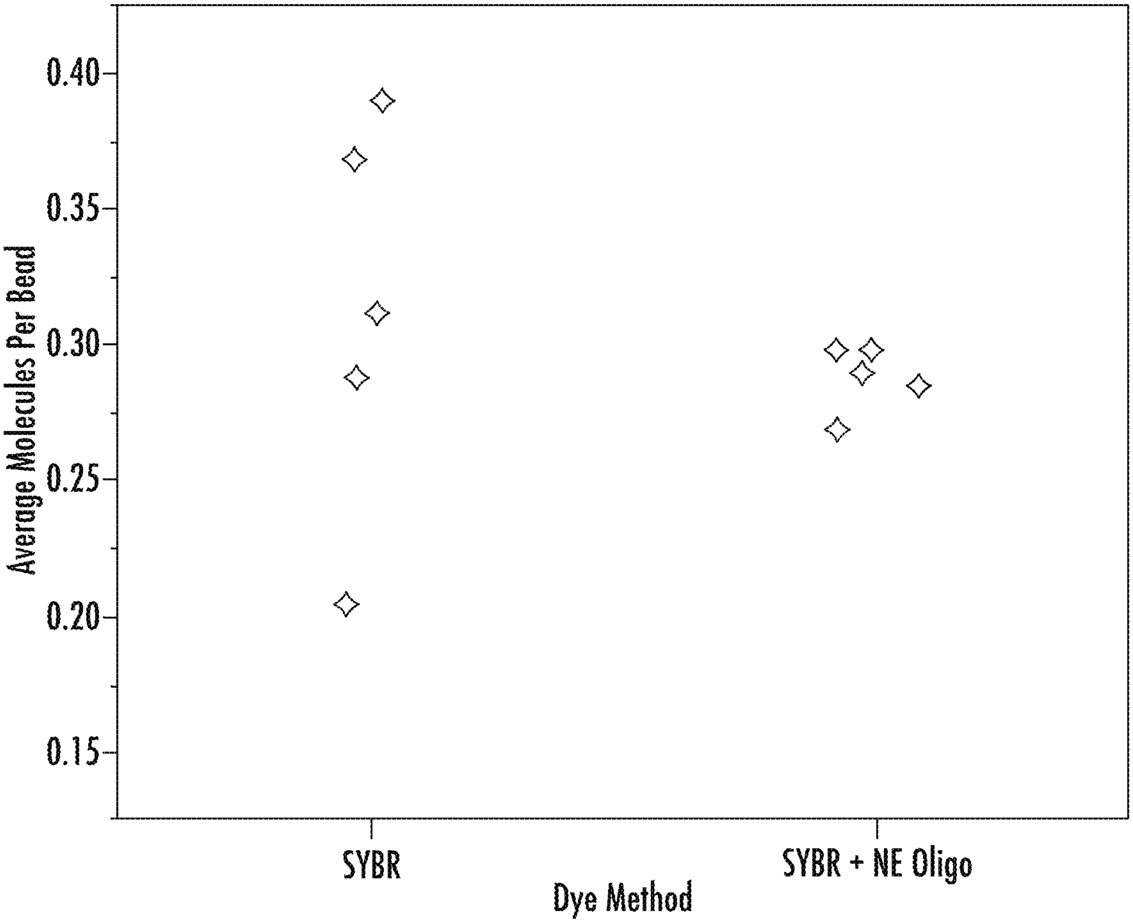
FIG. 23 is a graph of average molecules per bead (digital positive signal) for mycoplasma within a 12 plex respiratory panel assay (although associated with a digital positive signal it can be a combination of digital and analog). Each dot represents results from one of five arrays in a single lane of an 8-channel microchip with each array loaded with beads from the same sample according to embodiments of the present invention.

For example, an oligonucleotide (oligo) such as, for example, a non-extendable oligo (NE oligo) optionally comprising biotin (e.g., comprising biotin at the 3' end), can modify (e.g., reduce) dye (e.g., SYBR) binding during master mix addition. In some embodiments, a dye uniformity agent may comprise a ssDNA molecule with a 3' attachment of a biotin linked by a six carbon chain, although other modifications and/or linkers (e.g., a C1-C20 hydrocarbon chain such as, e.g., a C1-C20 alkyl branched or unbranched chain) may also work. In some embodiments, a non-extendable oligo may be used as a dye uniformity agent as it may be less likely to negatively impact PCR than an additional primer capable of forming dimers. As shown in FIG. 22, it can been seen that adding a NE oligo into the SYBR Green I-containing master mix reduces variation in the mean initial bead fluorescence (CV 0.7%) as compared to SYBR alone (CV 4.8%). As changes in SYBR absorption (and thus SYBR's concentration in the PCR reaction) can modify target amplification and fluorescence signal, variation in SYBR absorption between arrays results in a variation in the number of positive reactions (i.e. the digital PCR signal). In FIG. 23, the average number of molecules of target per bead for a mycoplasma target sequence was compared between 5 subarrays in a channel of a chip with either SYBR alone in the master mix (CV 23%) or with SYBR plus NE oligo (CV 4%). The reduced variation can result in a more accurate determination of average molecules per bead, and thus a more accurately determined concentration of mycoplasma. Additionally, control of intercalating dye concentration across the whole array can potentially lead to less variation of dsDNA melting temperature and thus may enable more accurate determination of amplicon melting point.

Figure 24:
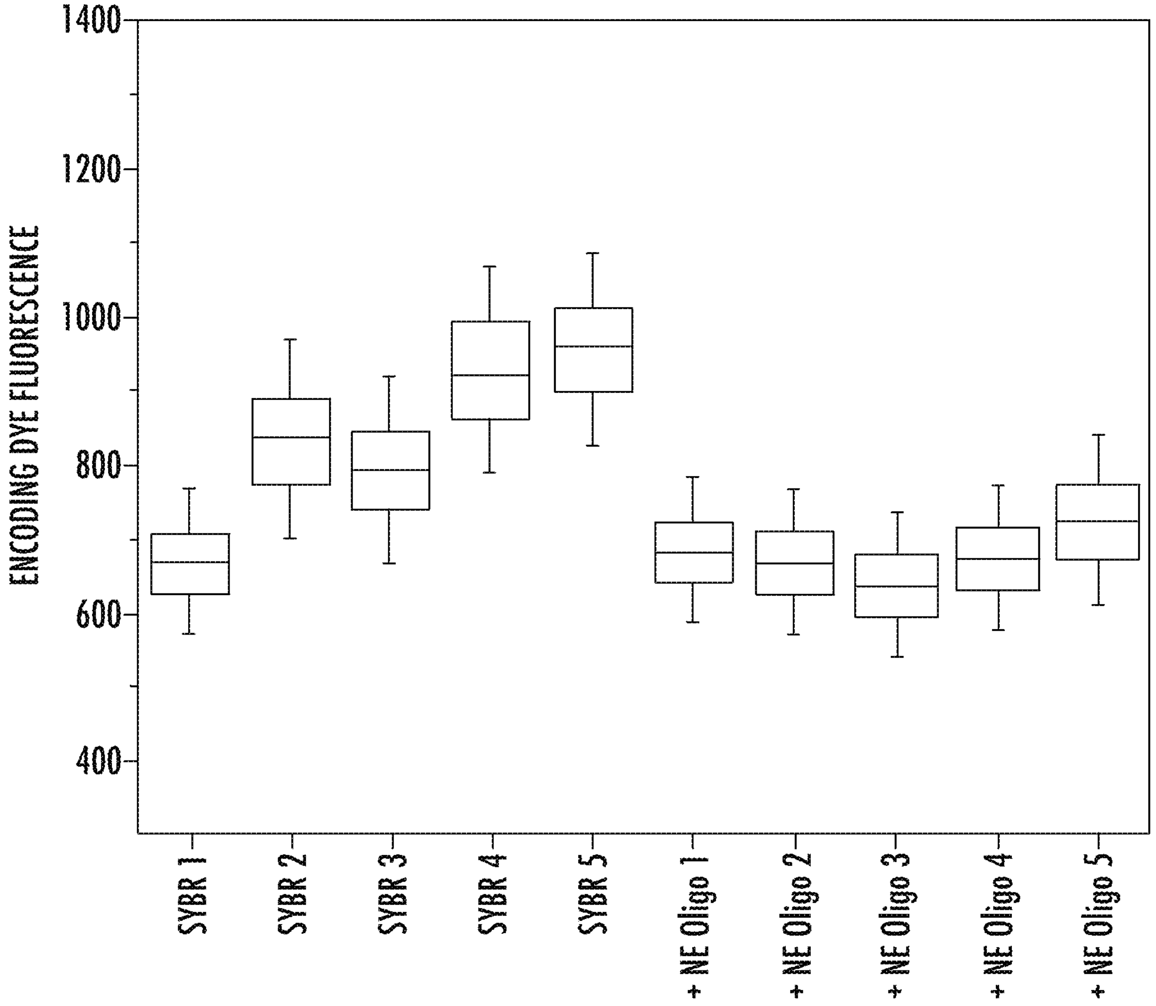
FIG. 24 is a box plot of encoding dye fluorescence signal from a mycoplasma population in the 12-plex respiratory panel associated with each bead in 5 arrays of a microchip treated with SYBR or +NE Oligo and SYBR according to embodiments of the present invention.

In some embodiments, the fluorescence signal from an encoding dye may be impacted by the concentration of an intercalating dye, and when there are large differences in the dye absorption by the beads it can become difficult to decode the array (e.g., assign beads to clusters during the encoding analysis). In FIG. 24, samples with SYBR alone in the master mix showed shifts in the fluorescence signal observed in the encoding dye fluorescence channel between different subarrays (CV 14%). There was less variance in the apparent encoding dye fluorescence signal when a non-extendable oligo was added in solution (CV 5%).

Alternatively or in addition, differences in dye absorption during loading of the array with master mix may be addressed by other means. For example, in some embodiments, beads may be soaked in an intercalating dye-containing buffer before loading the beads into a microwell array. The beads may be soaked before, during, and/or after incubation with the sample. Alternatively or in addition, a surface of a bead may be functionalized to modify the absorption of the dye. For example, when more primers are bound to a surface of a bead, the absorbance of the dye is increased compared to when less primers are bound. A partially double stranded oligonucleotide (pdsDNA), optionally linked to the bead via a biotin-TEG linking chemistry available from IDT, may be used, as dsDNA associates more strongly with intercalating dyes than ssDNA. In some embodiments, beads with a pdsDNA oligo are soaked in an intercalating dye-containing buffer before an assay. The beads are then incubated with a sample in hybridization buffer, washed, and loaded into a microwell array. In some embodiments, a master mix containing all the reagents needed for PCR, except primers and intercalating dye, and optionally including a dye uniformity agent may be introduced into the channels of a microwell array before sealing the reaction wells from one another, optionally with animmiscible sealing oil. An example of pdsDNA is shown in FIG. 25.

Figure 25:
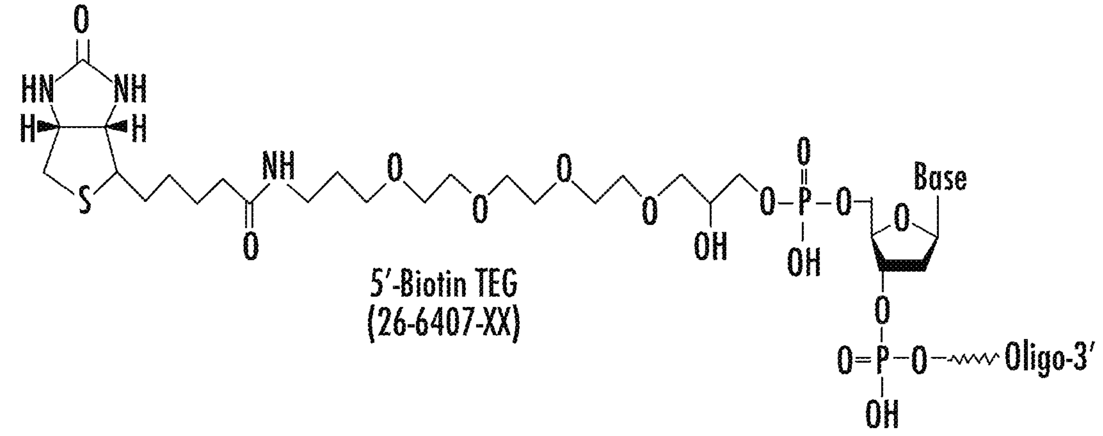
FIG. 25 is a schematic of an example of pdsDNA of a bead according to embodiments of the present invention.

FIG. 25 shows a 5' biotin TEG linkage from IDT (top). An example of a partially double stranded DNA primer is shown (bottom). The DNA primer shown has a first strand with a sequence of SEQ ID NO:1; and a second strand having a sequence of SEQ ID NO:2.

The melting point of a pdsDNA, which may be used to modify absorption of a dye, may be optimized so that under storage and/or hybridization conditions, the pdsDNA may remain partially double stranded; however, during PCR the pdsDNA can dissociate to yield a ssDNA primer with low background fluorescence as it is not as strongly associated with the intercalating dye. In some embodiments, a linker (e.g., a carbon chain, optionally a C1-C20 hydrocarbon) that attaches a primer to a biotin functional group may be modified to tune its hydrophobicity and/or ionic charge and thus its absorptive properties regarding dyes or other reagents.

Figure 21:
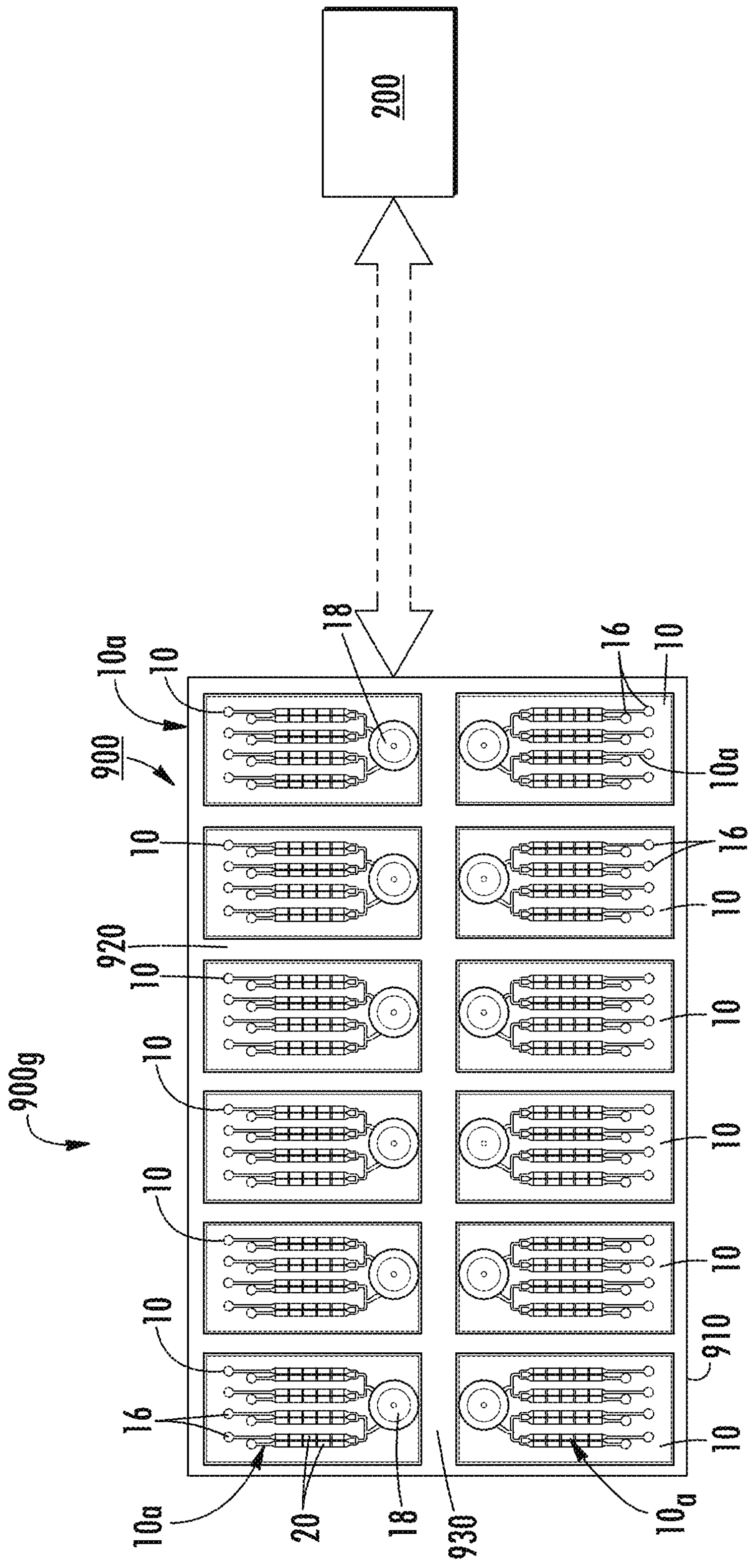
FIG. 21 is a top view of a plurality of microchips held by a thermally insulating holder according to embodiments of the present invention.

In some embodiments, a device 10 of the present invention may be made using a holder 900 that holds a plurality of microchips 10 or devices, optionally configured in a grid 900*g* as shown in FIG. 21. The holder 900 can comprise an outer perimeter 910 that encloses the grid 900*g* and can define lateral and longitudinal thermally insulating barrier regions 920, 930 between sides and ends of adjacent devices 10. The master mix port 18 can reside facing each other across a barrier segment 930. The input ports 16 can reside facing the outer perimeter 910 of the holder 900. In some embodiments, the holder 900 is made from a thermally insulating material and the chip 10 can comprise a thermally conductive substrate. Each one of the smaller microarray chips/devices 10 in the grid 900*g* can be thermocycled independently. Thermocycling and/or imaging of the microarray chips/devices 10 in the grid 900*g* can be synchronized by the test system 200 so that each microarray chip/device 10 is imaged in a defined sequence.

In some embodiments, a device 10 of the present invention may be fabricated from a substrate that is a thermal insulator such as, e.g., plastic, and optionally different zones, areas or locations of the same substrate can be thermocycled and/or imaged in a defined sequence.

A device 10 of the present invention may be used with a commercially available automated sample preparation (e.g., a pipetting robot and/or bead washing robot such as a Tecan, Hamilton, Beckman, or other automation system), or it can be operated using a customized and dedicated reader apparatus or platform. Readers utilized with the invention may include large format designs appropriate for high-volume in vitro testing, benchtop formats appropriate for a clinical laboratory or physician's office, held-held formats optimized for production floor or consumer or forensic testing, or formats incorporated into other systems.

Optical systems 220 (FIG. 8) that can be utilized include, but are not limited to, dual or multi-optic imaging systems where the entire array portion of the device 10 (or a large portion of it) may be imaged at low resolution and a smaller portion of selected ones of the sub-sets 20 of microwells at high resolution, or a lens system that allows for rapid changes of the field of view such as a zoom lens. Alternatively, other detection systems can be used including electrochemical, absorbance, and/or chemiluminescence detection.

Devices and/or methods of the present invention may be used for immunoPCR, reverse-transcriptase PCR, Protein Singleplex Reactions in a Compact Array (Protein-SiRCA), as well as many other variants of PCR or nucleic amplification. A different means of detecting the amplicons may be used, for example molecular beacons or hydrolysis probes (e.g. TaqMan probes), or any such means known to those skilled in the art. The decoding images used to determine the identity of each bead can be taken before, during, and/or after the thermocycling images.

According to some embodiments, the methods for obtaining high-resolution real-time PCR data can be carried out while reducing the effects of photobleaching on the assay signal in Singleplex Reactions in a Compact Array (SiRCA). A device 10 of the present invention may comprise two or more fluid channels 15 each with sets of microwells 20, optionally for one or more samples, and the array 10 may be imaged using sub-sets of the sets of microwells 20. The sub-sets of the different sets of microwells 20 may be imaged in a sequence where one segment is imaged after each cycle of amplification. For each image, the average signal for each type of reaction may be calculated for each sample. By plotting the average signal from each reaction type for each cycle of amplification, a cycle threshold may be determined for each reaction type with single-cycle resolution without requiring the time to image the entire array after every PCR cycle. For example, a 14 mm long by 1.25 mm wide fluid device 10 with channels 15 can be divided into five (rows) segments A, B, C, D, and E. After cycle 1 of PCR, segment A is imaged. Segment B is imaged after cycle 2 of PCR and so on. Each row/segment can be imaged six times after 30 cycles of PCR. Although signal from each bead type can/will be obtained for every PCR cycle, each row/segment (and thus each reaction) will only receive ⅕ of the dose of excitation energy used to record fluorescence data. This approach therefore reduces the impact of photobleaching while maintaining signal cycle real-time PCR resolution. Additionally, by narrowing the sets of microwells 20 in a respective sample fluid channel 15 to one dimension, two or more channels 15 with respective sub-sets of microwells 20 can be placed in close enough proximity that they can be rapidly imaged (e.g., one frame can contain more than one array) facilitating the ability to collect real-time PCR data at single-cycle resolution for multiple samples with reasonable imaging times.

A method of the present invention may be applied to any array of reactions encoded such that the identity of the reaction can be determined, typically in real time.

In some embodiments, a device of the present invention may be used in place of any multiplexed PCR or immunoassay panel. Applications of embodiments of the present invention include, but are not limited to, biomedical or biologic research, diagnostics for disease (including infectious disease and/or oncology) by nucleic acid or protein biomarkers, veterinary applications, forensic analysis or genotyping, environmental monitoring, counterfeit goods detection, and/or biopharma production or quality control applications.

Figure 8:
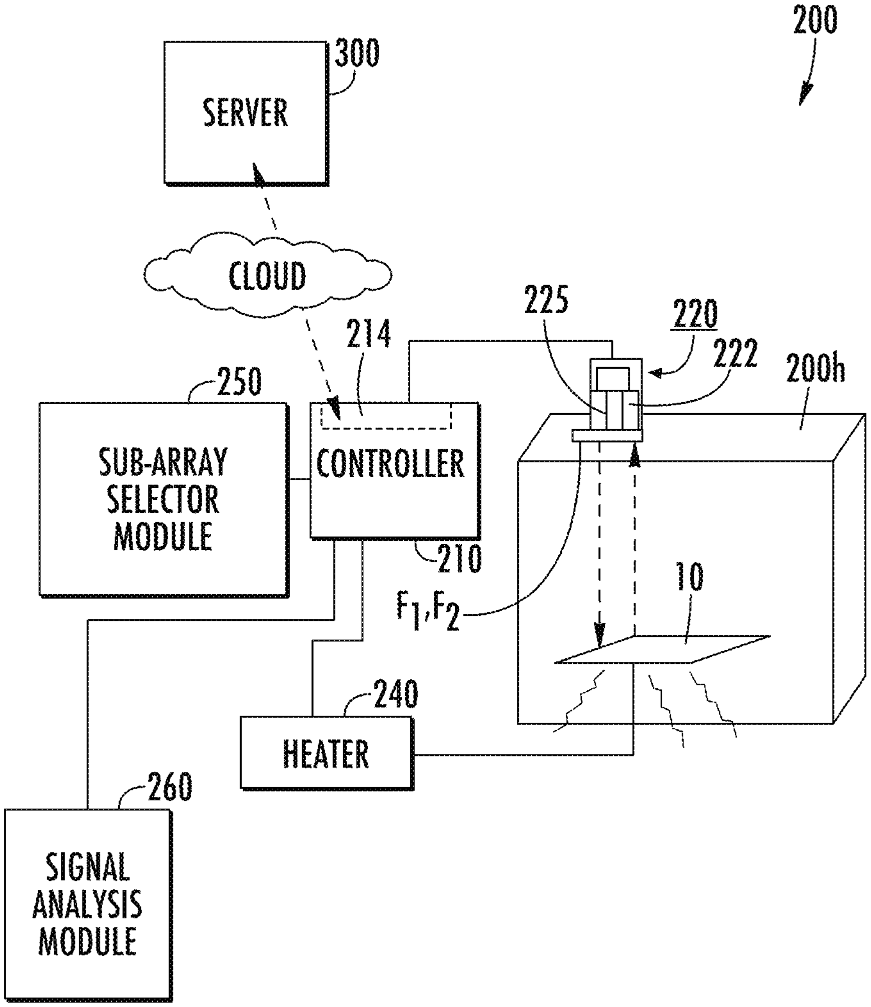
FIG. 8 is an example analysis system according to embodiments of the present invention.

FIG. 8 is a schematic illustration of an example analysis system 200. The system 200 can include at least one controller 210 (typically comprising at least one processor) in communication with an optic system 220 that includes an electronic signal detector 222 such as an optical detector comprising a camera or other imaging device or other signal detection device. The system 200 can also include a housing 200*h*, a heat source 240 for applying heat to one or more fluidic device 10 during assay cycles.

The optic system 220 can optionally include an excitation source 225 and one or more filters, that can comprise different filters (or filter sets) $F_1$, $F_2$ or even more filters, such as, by way of example 2-100 filters, each or some capable of providing a different encoding wavelength for exciting beads held in one or more sets of microwells 20. The optic system 220 can include a sub-array selection module 250 to detect signal and/or image sub-sets or sub-arrays 10*s* of the microwell array 10*a* of a respective fluidic device 10 (optionally in response to directing the optic system to selectively only the sub-set or sub-sets). The imaging and/or excitation can be carried out serially for defined sub-sets or in parallel. In some embodiments, optical excitation is not required. For example, in some embodiments, an assay (e.g. a protein assay) can generate a chemiluminescent signal that can be detected and/or imaged without optical excitation.

The system 200 can also include a signal analysis module 260. The signal analysis module 260 can analyze assay signal data from the different sets of microwells.

The system 200 can obtain an analog signal that defines a threshold cycle or cycle threshold "Ct" that identifies a PCR reaction for a target species and/or type of molecule as positive when the fluorescence signal is greater than a threshold value or negative when the fluorescence signal does not rise above the threshold value. That is, the Ct is the cycle where Si>>Bs, where >> is at least 5-10% greater, optionally a factor of two greater, than Bs, and where Si is fluorescence signal intensity and Bs is background fluorescence signal. The Ct of a sample of unknown concentration can be compared to the Ct of a sample of known concentration to calculate the initial target concentration.

The controller 210 can be in communication with the subarray selection module 250 (i.e., comprising computer program code) configured to select different sets of microwells during different assay cycles. The module 250 and/or 260 can be totally or partially onboard or remote from the controller and/or optic system 220. The analysis system 200 can include at least one processor (i.e., digital signal processor) and can include a transceiver 214.

The sub-array selection module 250 can be configured to identify sub-sets of (aligned) microwells in two, three, four, five or more adjacent fluid sample channels to provide location data, optionally the identified sub-sets comprise neighbor sets (i.e., corner sets) of microwells in two or more adjacent fluid channels. The module 250 can use that information with known spacing dimensions and array configuration to define the locations of the other sets of microwells 20. Alignment indicia 27 (FIG. 1) at one or more locations of the device 10 can alternatively or additionally be used for this location data.

The module 250 or 260 can be onboard the analysis system 200 or distributed in one or more servers 300. The server 300 may be embodied as a standalone server or may be contained as part of other computing infrastructures. The server 300 may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server 300 may also communicate with the network via wired or wireless connections, and may include various types of tangible, non-transitory computer-readable media.

The server 300, where used, can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud". Cloud storage may include a model of networked computer data storage where data is stored on multiple virtual servers, rather than being hosted on one or more dedicated servers.

The controller 210 can communicate with the server 410 or computer via a transceiver 214 and/or a computer network or cellular network. For the computer network, this can comprise one or more of local area networks (LAN), wide area networks (WAN) and can include a private intranet and/or the public Internet (also known as the World Wide Web or "the web" or "the Internet."

Figure 18:
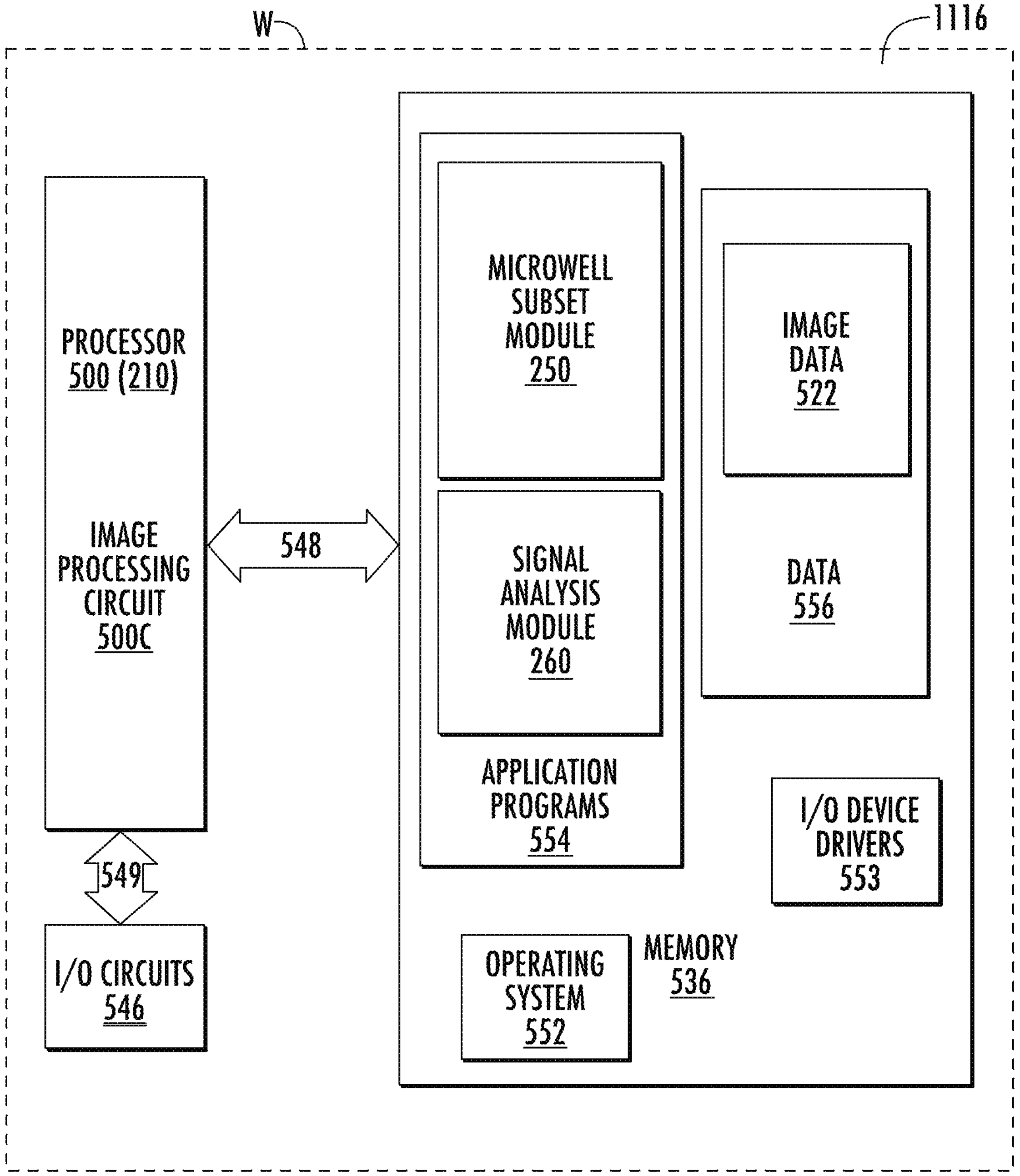
FIG. 18 is a data processing system according to embodiments of the present invention.
Figure 19:
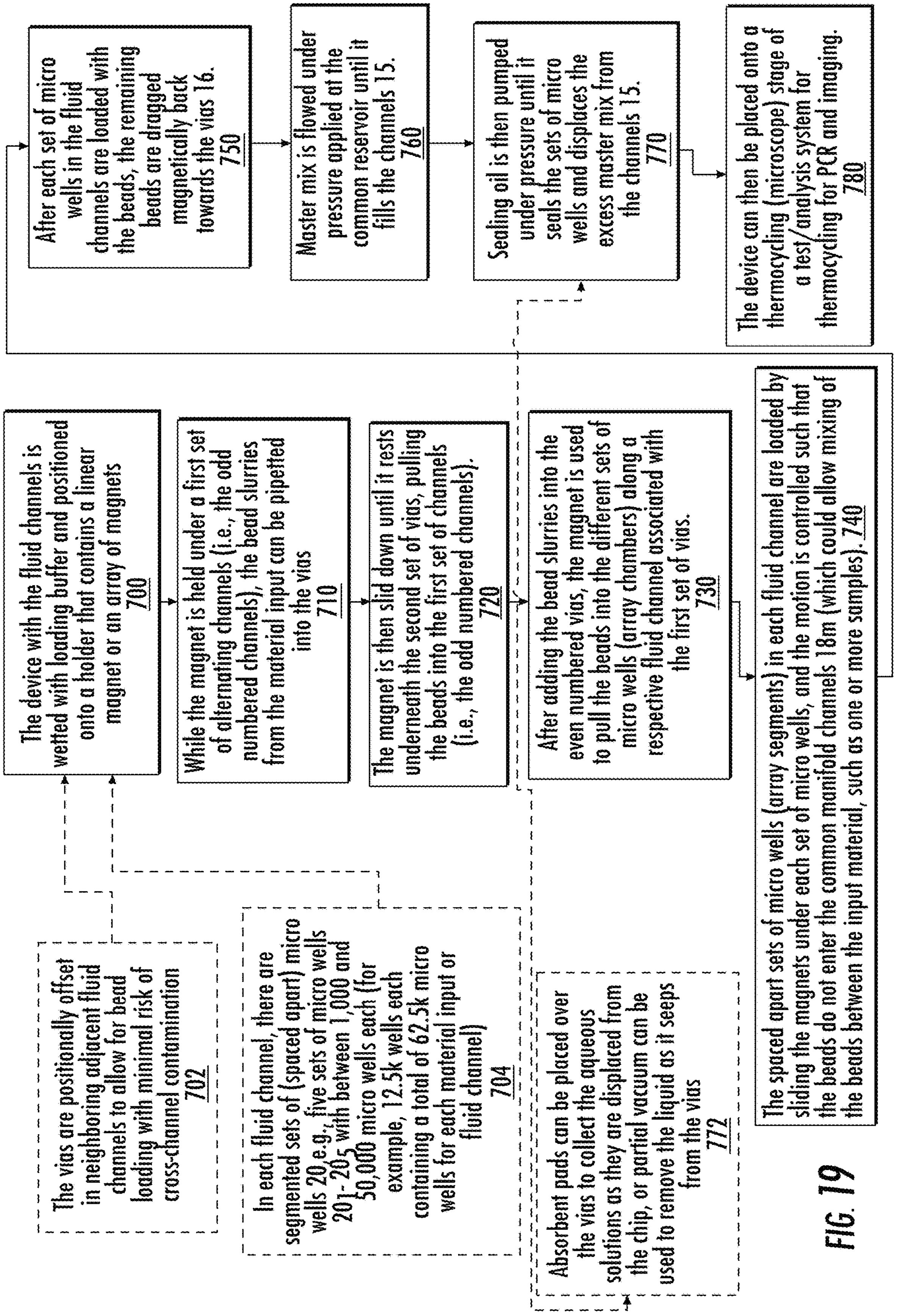
FIG. 19 is a flow chart of actions' that can be carried out to load a fluid device with beads, then thermocycle after loading according to embodiments of the present invention.
Figure 20A:
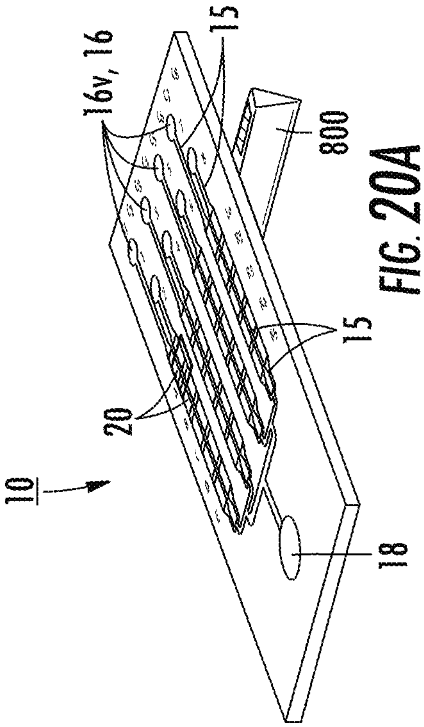
FIGS. 20A-20D are enlarged side perspective views of example loading operations of a microchip using a magnet according to embodiments of the present invention.
Figure 20B:
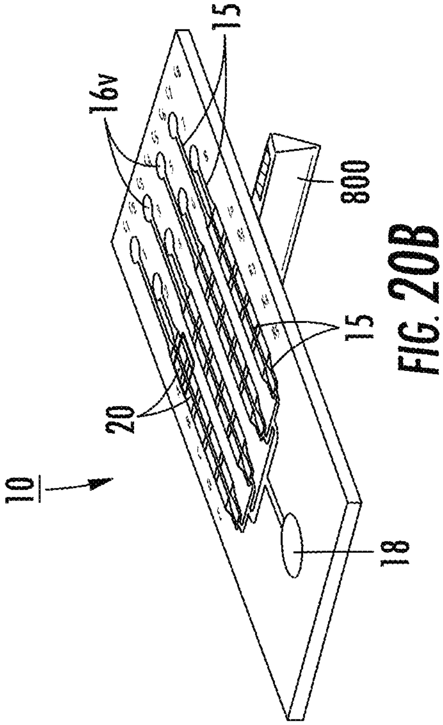
Figure 20C:
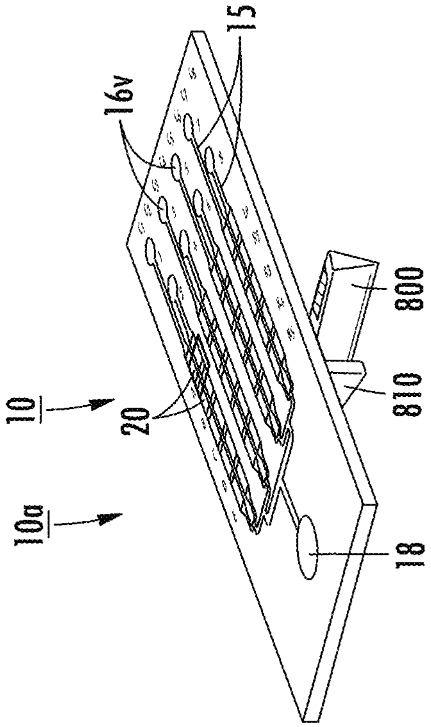
Figure 20D:
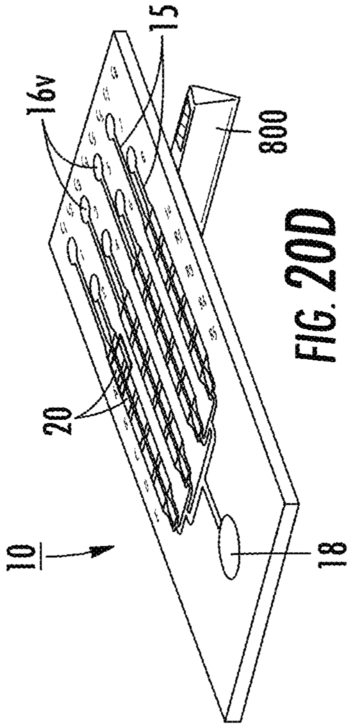

As illustrated in FIG. 18, embodiments of the invention may be configured as a data processing system 1116, which can include a (one or more) processors 500, a memory 536 and input/output circuits 546. The one or more processors 500 can be part of the image processing circuit 500*c*. The data processing system may be incorporated in, for example, one or more of a personal computer, database, workstation W, server, router or the like. The system 1116 can reside on one machine or be distributed over a plurality of machines. The processor 500 communicates with the memory 536 via an address/data bus 548 and communicates with the input/output circuits 546 via an address/data bus 549. The input/output circuits 546 can be used to transfer information between the memory (memory and/or storage media) 536 and another computer system or a network using, for example, an Internet protocol (IP) connection. These components may be conventional components such as those used in many conventional data processing systems, which may be configured to operate as described herein.

In particular, the processor 500 (which can be incorporated into the controller 210, FIG. 8) can be commercially available or custom microprocessor, microcontroller, digital signal processor or the like. The memory 536 may include any memory devices and/or storage media containing the software and data used to implement the functionality circuits or modules used in accordance with embodiments of the present invention. The memory 536 can include, but is not limited to, the following types of devices: ROM, PROM, EPROM, EEPROM, flash memory, SRAM, DRAM and magnetic disk. In some embodiments of the present invention, the memory 536 may be a content addressable memory (CAM).

As further illustrated in FIG. 18, the memory (and/or storage media) 536 may include several categories of software and data used in the data processing system: an operating system 552; application programs 554; input/output device drivers 558; and data 556. As will be appreciated by those of skill in the art, the operating system 552 may be any operating system suitable for use with a data processing system, such as IBM®, OS/2®, AIX® or zOS® operating systems or Microsoft® Windows®95, Windows98, Windows2000 or WindowsXP operating systems, Unix or Linux™, IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 558 typically include software routines accessed through the operating system 552 by the application programs 554 to communicate with devices such as the input/output circuits 546 and certain memory 536 components. The application programs 554 are illustrative of the programs that implement the various features of the circuits and modules according to some embodiments of the present invention. Finally, the data 556 represents the static and dynamic data used by the application programs 554 the operating system 552, the input/output device drivers 558 and other software programs that may reside in the memory 536.

The data 556 may include (archived or stored) digital image data sets 522. As further illustrated in FIG. 18, according to some embodiments of the present invention, the application programs 554 include a microwell sub-set selection module 250 and a signal analysis module 260. The application program 554 may be located in a local server (or processor) and/or database or a remote server (or processor) and/or database, or combinations of local and remote databases and/or servers.

While the present invention is illustrated with reference to the application programs 554, and modules 250 and 260 in FIG. 18, as will be appreciated by those of skill in the art, other configurations fall within the scope of the present invention. For example, rather than being application programs 554 these circuits and modules may also be incorporated into the operating system 552 or other such logical division of the data processing system. Furthermore, while the application programs or modules 250, 260 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 18 but may be provided by other arrangements and/or divisions of functions between data processing systems. For example, although FIG. 18 is illustrated as having various circuits and modules, one or more of these circuits or modules may be combined or separated without departing from the scope of the present invention.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. Some modules or routines may also be written in a scripting language, including an open-source scripting language. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one (e.g., a workstation) computer, partly on one computer, as a stand-alone software package, partly on the workstation's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

In particular, the controller 210 (FIG. 8) and/or processor 500 (FIG. 18) can include any commercially available or custom microprocessor, microcontroller, digital signal processor or the like. Memory may include any memory devices and/or storage media containing the software and data used to implement the functionality circuits or modules used in accordance with embodiments of the present invention. The memory can include, but is not limited to, the following types of devices: ROM, PROM, EPROM, EEPROM, flash memory, SRAM, DRAM and magnetic disk. In some embodiments of the present invention, the memory may be a content addressable memory (CAM).

The foregoing is illustrative of the present invention and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A method of identifying a target species and/or a target molecule in a microfluidic device configured to conduct PCR reactions in a plurality of sets of microwells, comprising:

exciting a defined sub-array of the plurality of sets of microwells in the microfluidic device, wherein the microfluidic device comprises at least a first fluid channel with some of the plurality of sets of microwells positioned along the first fluid channel;

obtaining signal intensity data from only the defined sub-array of the plurality of sets of microwells, wherein the obtaining signal intensity data comprises obtaining an analog signal that can provide real-time PCR data as amplitude changes versus a PCR cycle number for an input material in the plurality of sets of microwells and concentration of molecules of a defined type is about, equal to, or greater than one molecule per microwell, and wherein the analog signal defines a threshold cycle or cycle threshold, Ct, that identifies a microwell reaction as positive and a number of target molecules/concentration of the target molecule for a target species and/or type of molecule when fluorescence signal intensity (Si) is greater than a threshold value or negative if the fluorescence signal intensity (Si) is always less than the threshold value for a given number of PCR cycles;

scanning part or all of the plurality of sets of microwells after, before, or before and after the PCR reactions to obtain images of the plurality of sets of microwells for identifying positive and negative PCR reactions associated with digital PCR; and electronically identifying microwells in the plurality of sets of microwells that are positive for one or more target analyte molecules.

2. The method of claim 1, further comprising, fluidly loading a bead slurry pre-exposed to a respective sample for analysis, then sealing the plurality of sets of microwells along the first fluid channel before the obtaining step so that after sealing, each microwell of the plurality of sets of microwells is in fluid isolation from the others, wherein the plurality of sets of microwells along the first fluid channel are in fluid communication only during the loading, prior to the sealing step.

3. The method of claim 1, further comprising changing the defined sub-array of the plurality of sets of microwells to a different defined sub-array after each of a plurality of successive reaction steps of an assay whereby some microwells of the plurality of sets of microwells are not imaged after each reaction step.

4. The method of claim 1, wherein the microfluidic device further comprises:

a second fluid channel with a plurality of sets of microwells positioned along the second fluid channel;

a third fluid channel with a plurality of sets of microwells positioned along the third fluid channel; and a fourth second fluid channel with a plurality of sets of microwells positioned along the fourth fluid channel, wherein a first set of microwells of the plurality of sets of microwells of each of the first, second, third and fourth fluid channels are aligned in a first row, wherein a second set of microwells of the plurality of sets of microwells of each of the first, second, third and fourth fluid channels are aligned in a second row, wherein a third set of microwells of the plurality of sets of microwells of each of the first, second, third and fourth fluid channels are aligned in a third row, and wherein a fourth set of microwells of the plurality of sets of microwells of each of the first, second, third and fourth fluid channels are aligned in a fourth row.

5. The method of claim 4, wherein the first, second, third and fourth fluid channels comprise straight or arcuate segments that are substantially parallel with each other.

6. The method of claim 4, wherein the defined sub-array of the plurality of sets of microwells is a single one of the first, second, third and fourth rows.

7. The method of claim 1, wherein the microfluidic device further comprises a second fluid channel adjacent to the first fluid channel.

8. The method of claim 1, wherein the microfluidic device is configured with a plurality of spaced apart fluid channels, with the first fluid channel being one of the plurality of spaced apart fluid channels, wherein each of the plurality of spaced apart fluid channels comprises a plurality of sets of microwells, wherein the fluid channels are in fluid isolation.

9. The method of claim 8, wherein the defined sub-array of the plurality of sets of microwells reside in at least two adjacent fluid channels of the plurality of spaced apart fluid channels.

10. The method of claim 1, further comprising electronically identifying a location of one or more sets of microwells of the plurality of sets of microwells residing in one or more positions in the microfluidic device before the exciting and obtaining steps and defining positions of others of the sets of microwells based at least in part on the identified location.

11. The method of claim 1, further comprising before the obtaining step, and before the exciting, selecting a filter to provide an encoding wavelength for the exciting step.

12. The method of claim 1, wherein the Ct is a cycle number where Si>>Bs, where >>is at least a 5-10% greater than Bs and/or 5-10 times a standard deviation of Bs, and where Bs is background fluorescence signal.

13. The method of claim 12, wherein >>is a factor of two greater than Bs.

14. The method of claim 12, where Bs is background fluorescence signal as measured at a PCR negative reaction.

15. The method of claim 1, wherein the microfluidic device comprises a plurality of fluid channels with the first fluid channel being one of the plurality of fluid channels, wherein the plurality of fluid channels are arranged with respective microwells thereof aligned in different rows, wherein the analog signal is obtained for each defined sub-array of the plurality of sets of microwells in one row that changes after every other or each of a plurality of different reaction steps of an assay.

16. The method of claim 15, wherein each defined sub-array of the plurality of sets of microwells comprises two sets of microwells.

17. The method of claim 1, wherein the analog signal comprises an average, median, mode, or weighted value of Si.

18. The method of claim 1, wherein the obtained signal intensity data is carried out by using a camera with a field of view (FOV) that covers only a defined sub-array of the plurality of sets of microwells of the microfluidic device at any one time.

19. The method of claim 1, wherein the microfluidic device with the first fluid channel with the plurality of sets of microwells spaced apart along the first fluid channel comprises a plurality of additional fluid channels, each comprising a respective plurality of sets of microwells spaced apart along its respective length, and wherein the microfluidic device further comprises a separate material input port for each of the first and the plurality of additional fluid channels and at least some of the fluid channels share a common opposing port, the method further comprising before the obtaining step:

fluidly loading a bead slurry pre-exposed to a respective sample for analysis into the respective input ports;

magnetically directing the bead slurries to enter into different sets of the plurality of sets of microwells along the fluid channels;

flowing a fluid master mix comprising a dye from the opposing port into the fluid channels toward the material input ports; and then flowing a sealing oil from the opposing port into the fluid channels toward the material input ports thereby sealing the microwells and the fluid channels from each other.

20. The method of claim 19, further comprising placing a magnet adjacent the microfluidic device chip and translating the magnet toward the opposing port before flowing the fluid master mix and sealing oil.

21. The method of claim 1, wherein the defined sub-array of the plurality of sets of microwells comprises microwells in a range of 1 thousand and 1 million respective microwells.

22. The method of claim 1, wherein at least some of the microwells of each set of the plurality of sets of microwells contain a single bead.

* * * * *